US007814416B2

(12) United States Patent
Shinkai

(10) Patent No.: US 7,814,416 B2
(45) Date of Patent: Oct. 12, 2010

(54) INFORMATION PROCESSING APPARATUS, METHOD, PROGRAM, AND SYSTEM FOR DATA SEARCHING USING LINKING INFORMATION

(75) Inventor: Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 11/034,178

(22) Filed: Jan. 12, 2005

(65) Prior Publication Data
US 2005/0188319 A1  Aug. 25, 2005

(30) Foreign Application Priority Data
Jan. 13, 2004  (JP) ............................. 2004-005777

(51) Int. Cl.
*G06F 17/24* (2006.01)
(52) U.S. Cl. ...................... 715/255; 715/200; 715/209; 715/229; 715/230
(58) Field of Classification Search .................. 715/200, 715/209, 229, 230, 243, 255
See application file for complete search history.

(56) References Cited

U.S. PATENT DOCUMENTS

| 5,008,853 | A | * | 4/1991 | Bly et al. ..................... 715/751 |
| 5,671,428 | A | * | 9/1997 | Muranaga et al. ........... 715/751 |
| 5,991,760 | A | * | 11/1999 | Gauvin et al. ................. 707/10 |
| 6,119,136 | A | * | 9/2000 | Takata et al. ................ 715/205 |
| 7,249,314 | B2 | * | 7/2007 | Walker et al. ............... 715/205 |
| 2002/0073125 | A1 | * | 6/2002 | Bier ........................... 707/530 |
| 2002/0188638 | A1 | * | 12/2002 | Hamscher .................... 707/530 |
| 2004/0088332 | A1 | * | 5/2004 | Lee et al. ..................... 707/200 |
| 2004/0217985 | A9 | * | 11/2004 | Ries et al. ................... 345/740 |
| 2005/0138554 | A1 | * | 6/2005 | Bell et al. .................... 715/530 |

FOREIGN PATENT DOCUMENTS

| JP | 10 98677 | 4/1998 |
| JP | 2000 92419 | 3/2000 |
| JP | 2001-169218 | 6/2001 |
| JP | 2002-300523 | 10/2002 |
| JP | 2002-351878 | 12/2002 |
| JP | 2003 256432 | 9/2003 |

* cited by examiner

*Primary Examiner*—Joshua D Campbell
(74) *Attorney, Agent, or Firm*—Frommer Lawrence & Haug LLP; William S. Frommer; Thomas F. Presson

(57) ABSTRACT

An image processing apparatus facilitating an edit process and a check process of data. A UMID of material data is added to a composition table. A UMID of the composition table and the UMID of the material data are added to an edit list. The UMID of the material data and the UMID of the original edit list are added to an effect-added edit list. Each terminal references data of the other terminals by tracking these UMIDs. A metadata server produces and manages a reverse reference-related table of UMIDs in order. Each terminal references data using the table. The image processing apparatus is applicable to a network system.

7 Claims, 42 Drawing Sheets

FIG. 11A — COMPOSITION TABLE (381)

| PROGRAM | EPISODE | | SCENE NOTE | | CUT NOTE | | TAKE | | |
|---|---|---|---|---|---|---|---|---|---|
| | EPISODE INSTRUCTION | EPISODE NOTE | SCENE INSTRUCTION | CUT INSTRUCTION | TC | TAKE DATA | | OK/NG | UMID |
| [ID] P2002-10 [Ttl] SOBA SOUP DIFFERENCE BETWEEN EAST JAPAN AND WEST JAPAN [UMID] PPPPPPPP | [ID] E2002-1001 [Ttl] SOUP IN NAGOYA [Dsc] REPORTING THAT IN NAGOYA, NOODLE SOUP IS BASED ON SOUP STOCK | | [No]1 [Ttl] EXTERNAL APPEARANCE OF RESTAURANT | [[No]1 [Ttl] ENTIRE RESTAURANT | | | | | |
| | | | | [No]2 [Ttl] ENTRANCE OF RESTAURANT | | | | | |
| | | | [No]2 [Ttl] INTERNAL VIEW OF RESTAURANT [Dsc] SHOWING THAT SOBA SOUP IN NAGOYA IS LIGHT-COLORED | [No]1 [Ttl] ASKING OWNER OF RESTAURANT ABOUT COLOR OF SOBA SOUP | | | | | |
| | | | | [No]2 [Ttl] SOBA SOUP COLOR IS LIGHT | | | | | |
| | | | | [No]3 [Ttl] REPORTER EATING NOODLE | | | | | |

FIG. 11B — TAKE METADATA (382)

| TAKE METADATA | | |
|---|---|---|
| UMID | LOW-RESOLUTION FILE | GENERAL METADATA |
| | | |
| | | |
| | | |
| | | |
| | | |
| | | |

METADATA

FIG. 11C — MATERIAL DATA (383)

| VIDEO FILE | UMID |
|---|---|
| | |
| | |
| | |
| | |
| | |
| | |

MATERIAL DATA

FIG. 12

| EXAMPLE OF GENERAL METADATA |
|---|
| [Dsc] HEAVY TRAFFIC<br>[Date] 2002/4/15<br>[Time] 12:35:14<br>[Pos] N35° 40' 23", E135° 35' 50"<br>[Machine]<br>XXX-100 (123456)<br>[Setup]<br>filter:1-2<br>white:switch A<br>gain:0<br>dco:off<br>shutter:of<br>extender:off |

FIG. 15A

COMPOSITION TABLE 381

| PROGRAM | EPISODE | | SCENE NOTE | | CUT NOTE | | TAKE | | |
|---|---|---|---|---|---|---|---|---|---|
| | EPISODE INSTRUCTION | EPISODE NOTE | SCENE INSTRUCTION | SCENE | CUT INSTRUCTION | TC | TAKE DATA | OK/NG | UMID |
| [Ttl] SOBA SOUP DIFFERENCE BETWEEN EAST JAPAN AND WEST JAPAN [UMID] PPPPPPPP | [ID] P2002-10 | [ID] E2002-1001 [Ttl] SOUP IN NAGOYA [Dsc] REPORTING THAT IN NAGOYA, NOODLE SOUP IS BASED ON SOUP STOCK | [Dsc] MANY NOODLE RESTAURANTS IN NAGOYA USE MISO SOUP. WE ARE NOT REPORTING SUCH RESTAURANTS THIS TIME, BUT IT MAY BE BETTER TO REPORT SUCH A RESTAURANT IN FUTURE | [No.]1 [Ttl] EXTERNAL APPEARANCE OF RESTAURANT | [No.]1 [Ttl] ENTIRE RESTAURANT | | | | |
| | | | | [No.]2 [Ttl] INTERNAL VIEW OF RESTAURANT [Dsc] SHOWING THAT SOBA SOUP IN NAGOYA IS LIGHT-COLORED | [No.]1 [Ttl] ENTRANCE OF RESTAURANT | | | | |
| | | | | | [No.]1 [Ttl] ASKING OWNER OF RESTAURANT ABOUT COLOR OF SOBA SOUP | | | | |
| | | | | | [No.]2 [Ttl] SOBA SOUP COLOR IS LIGHT | | | | |
| | | | | | [No.]3 [Ttl] REPORTER EATING NOODLEE | | | | |

FIG. 15B

TAKE METADATA 382

| UMID | LOW-RESOLUTION FILE | GENERAL METADATA |
|---|---|---|
| AAAA-AAAA | LORES-1.mpg | |
| BBBB-BBBB | LORES-2.mpg | |
| CCCC-CCCC | LORES-3.mpg | |
| DDDD-DDDD | LORES-4.mpg | |
| EEEE-EEEE | LORES-5.mpg | |
| FFFF-FFFF | LORES-6.mpg | |

METADATA

| VIDEO FILE UMID |
|---|
| AAAA-AAAA |
| BBBB-BBBB |
| CCCC-CCCC |
| DDDD-DDDD |
| EEEE-EEEE |
| FFFF-FFFF |

MATERIAL DATA

FIG. 18

| REFERENCE DESTINATION UMID | REFERENCE SOURCE UMID |
|---|---|
| PPPPPPPP | AAAAAAAA |
| | BBBBBBBB |
| | CCCCCCCC |
| | DDDDDDDD |
| | EEEEEEEE |
| | FFFFFFFF |

COMPOSITION TABLE (381)

| PROGRAM | EPISODE | | SCENE | | CUT | | TAKE | | | |
|---|---|---|---|---|---|---|---|---|---|---|
| | EPISODE INSTRUCTION | EPISODE NOTE | SCENE INSTRUCTION | SCENE NOTE | CUT INSTRUCTION | CUT NOTE TC | TAKE DATA | OK/NG | UMID | |
| [Ttl] SOBA SOUP DIFFERENCE BETWEEN EAST JAPAN AND WEST JAPAN [UMID] PPPPPPPP | [ID] E2002-1001 [Ttl] SOUP IN NAGOYA [Dsc] REPORTING THAT IN NAGOYA, NOODLE SOUP IS BASED ON SOUP STOCK | [Dsc] MANY NOODLE RESTAURANTS IN NAGOYA USE MISO SOUP. WE ARE NOT REPORTING SUCH RESTAURANTS THIS TIME, BUT IT MAY BE BETTER TO REPORT SUCH A RESTAURANT IN FUTURE | [Ttl] EXTERNAL APPEARANCE OF RESTAURANT | | [No.]1 [Ttl] ENTIRE RESTAURANT | 00:00:00:00 | [No.]1 [In]00:00:10:00 [Out]00:01:40:20 | OK | EEEE-EEEE | |
| [ID] P2002-10 | | | | | | | [No.]2 | NG | FFFF-FFFF | |
| | | | [No.]2 [Ttl] INTERNAL VIEW OF RESTAURANT [Dsc] SHOWING THAT SOBA SOUP IN NAGOYA IS LIGHT-COLORED | | [No.]2 [Ttl] ENTRANCE OF RESTAURANT | 00:01:30:20 | [No.]3 [In]00:00:15:10 [Out]00:01:00:00 | | AAAA-AAAA | |
| | | | | | [No.]1 [Ttl] ASKING OWNER OF RESTAURANT ABOUT COLOR OF SOBA SOUP | 00:02:15:00 | [No.]4 [In]00:00:15:05 [Out]00:01:10:10 | | BBBB-BBBB | |
| | | | | | [No.]2 [Ttl] SOBA SOUP COLOR IS LIGHT | 00:03:10:05 | [No.]5 [In]00:00:03:08 [Out]00:00:23:28 | | CCCC-CCCC | |
| | | | | | [No.]3 [Ttl] REPORTER EATING NOODLE CUT NOTE | 00:03:30:25 | [No.]6 [In]00:00:20:00 [Out]00:00:35:00 | | DDDD-DDDD | |

FIG. 21C

MATERIAL DATA (383)

| VIDEO FILE UMID |
|---|
| AAAA-AAAA |
| BBBB-BBBB |
| CCCC-CCCC |
| DDDD-DDDD |
| EEEE-EEEE |
| FFFF-FFFF |

FIG. 21B

TAKE METADATA (382)

| UMID | LOW-RESOLUTION FILE | GENERAL METADATA |
|---|---|---|
| AAAA-AAAA | LORES-1.mpg | |
| BBBB-BBBB | LORES-2.mpg | |
| CCCC-CCCC | LORES-3.mpg | |
| DDDD-DDDD | LORES-4.mpg | |
| EEEE-EEEE | LORES-5.mpg | |
| FFFF-FFFF | LORES-6.mpg | |

FIG. 23

| REFERENCE DESTINATION UMID | REFERENCE SOURCE UMID |
|---|---|
| MMMMMMMM | AAAAAAAA |
| | BBBBBBBB |
| | CCCCCCCC |
| | DDDDDDDD |
| | EEEEEEEE |
| | FFFFFFFF |
| | PPPPPPPP |

```
1   <?xml version="1.0" encoding="UTF-8"?>
2   <smil xmlns="urn:schemas-professionalDisc:edl:editList"
3   umid="MMMMMMMM"
4   xmlns:xsi="http://www.w3.org/2001/XMLSchema-instance"
5   xsi:schemaLocation="urn:schemas-professionalDisc:edl:editList
6   edl_editlist.xsd">
7     <Source Planning Meta   umidRef="PPPPPPPP"/>
8       <body>
9         <par>
10          <!-- Clip1 -->
11          <ref src="urn:smpte:umid:EEEEEEEE"
12            begin="smpte-30=00:00:00:00"
13            clipBegin="smpte-30=00:00:10:00" clipEnd="smpte-30=00:01:40:20"
14            type="PD-EDL"/>
15
16          <!-- Clip2 -->
17          <ref src="urn:smpte:umid:AAAAAAAA"
18            begin="smpte-30=00:01:30:20"
19            clipBegin="smpte-30=00:00:15:10" clipEnd="smpte-30=00:01:00:00"
20            type="PD-EDL"/>
21
22          <!-- Clip3 -->
23          <ref src="urn:smpte:umid:BBBBBBBB"
24            begin="smpte-30=00:02:15:00"
25            clipBegin="smpte-30=00:00:15:05" clipEnd="smpte-30=00:01:10:10"
26            type="PD-EDL"/>
27
28          <!-- Clip4 -->
29          <ref src="urn:smpte:umid:CCCCCCCC"
30            begin="smpte-30=00:03:10:05"
31            clipBegin="smpte-30=00:00:03:08" clipEnd="smpte-30=00:00:23:28"
32            type="PD-EDL"/>
33
34          <!-- Clip5 -->
35          <ref src="urn:smpte:umid:DDDDDDDD"
36            begin="smpte-30=00:03:30:25"
37            clipBegin="smpte-30=00:00:20:00" clipEnd="smpte-30=00:00:35:00"
38            type="PD-EDL"/>
39        </par>
40      </body>
41  </smil>
```

FIG. 26

| REFERENCE DESTINATION UMID | REFERENCE SOURCE UMID |
|---|---|
| LLLLLLLL | AAAAAAAA |
| | BBBBBBBB |
| | CCCCCCCC |
| | DDDDDDDD |
| | EEEEEEEE |
| | FFFFFFFF |
| | MMMMMMMM |

```
1   <?xml version="1.0" encoding="UTF-8"?>
2   <smil xmlns="urn:schemas-professionalDisc:edl:editList"
3   umid="LLLLLLLL"
4   xmlns:xsi="http://www.w3.org/2001/XMLSchema-instance"
5   xsi:schemaLocation="urn:schemas-professionalDisc:edl:editList
6   edl_editlist.xsd">
7   <SourceEditList umidRef="MMMMMMMM"/>
8       <head>
9           <transition id="wipe" dur="00:00:06:00" type="Wipe" subtype="leftToRight"/>
10      </head>
11      <body>
12          <par>
13              <!-- Clip1 -->
14              <ref src="urn:smpte:umid:EEEEEEEE"
15              begin="smpte-30=00:00:00:00"
16              clipBegin="smpte-30=00:00:10:00" clipEnd="smpte-30=00:01:43:20"
17              type="PD-EDL"/>
18
19              <!-- Clip2 -->
20              <ref src="urn:smpte:umid:AAAAAAAA"
21              begin="smpte-30=00:01:27:20"
22              clipBegin="smpte-30=00:00:12:10" clipEnd="smpte-30=00:01:00:00"
23              type="PD-EDL"/>
24
25              <!-- Clip3 -->
26              <ref src="urn:smpte:umid:BBBBBBBB"
27              begin="smpte-30=00:02:15:00"
28              clipBegin="smpte-30=00:00:15:05" clipEnd="smpte-30=00:01:10:10"
29              type="PD-EDL"/>
30
31              <!-- Clip4 -->
32              <ref src="urn:smpte:umid:CCCCCCCC"
33              begin="smpte-30=00:03:10:05"
34              clipBegin="smpte-30=00:00:03:08" clipEnd="smpte-30=00:00:23:28"
35              type="PD-EDL"/>
36
37              <!-- Clip5 -->
38              <ref src="urn:smpte:umid:DDDDDDDD"
39              begin="smpte-30=00:03:30:25"
40              clipBegin="smpte-30=00:00:20:00" clipEnd="smpte-30=00:00:35:00"
41              type="PD-EDL"/>
42          </par>
43      </body>
44  </smil>
```

FIG. 31

| REFERENCE DESTINATION UMID | REFERENCE SOURCE UMID |
|---|---|
| ZZZZZZZZ | LLLLLLLL |

411 (pointing to the table)

FIG. 36

| REFERENCE DESTINATION UMID | REFERENCE SOURCE UMID |
|---|---|
| PPPPPPPP | AAAAAAAA |
| | BBBBBBBB |
| | CCCCCCCC |
| | DDDDDDDD |
| | EEEEEEEE |
| | FFFFFFFF |
| MMMMMMMM | AAAAAAAA |
| | BBBBBBBB |
| | CCCCCCCC |
| | DDDDDDDD |
| | EEEEEEEE |
| | FFFFFFFF |
| | PPPPPPPP |
| LLLLLLLL | AAAAAAAA |
| | BBBBBBBB |
| | CCCCCCCC |
| | DDDDDDDD |
| | EEEEEEEE |
| | FFFFFFFF |
| | MMMMMMMM |
| ZZZZZZZZ | LLLLLLLL | ized. The edited data is concatenated, text is superimposed on the video data, music is added, and data is thus finalized as a television program in a complete packet.

INFORMATION PROCESSING APPARATUS, METHOD, PROGRAM, AND SYSTEM FOR DATA SEARCHING USING LINKING INFORMATION

BACKGROUND OF THE INVENTION

1. Field of the Invention

The present invention relates to an information processing apparatus, an information processing method, and a computer program, and, in particular, to an information processing apparatus, an information processing method, and a computer program for enhancing the ease of data handling in the editing and checking process of data.

2. Description of the Related Art

In the production of television programs, a series of production steps are performed systematically, efficiently, and precisely. A scenario is first created, material gathering is performed based on the scenario, and material data, such as video data and audio data, is produced. The material data is then edited. The edited data is concatenated, text is superimposed on the video data, music is added, and data is thus finalized as a television program in a complete packet.

The scenario, the material data, the complete packet, etc. were conventionally produced and managed as separate data.

For example, the scenario is printed on sheets and printed sheets are then bound into a wordbook. The video data and audio data (both the video data and the audio data are collectively referred to as material data) are produced as separate data from material gathering process to material gathering process, and are then stored in different media (such as video tapes). The complete packet is also produced as new data different from the material data, and is recorded, as a material to be shipped, on a medium (such as a video tape) different from the media of the material data.

In such a program production work, data needs to be shared by a plurality of persons. Japanese Unexamined Patent Application Publication No. 2001-290731 discloses one technique. In the disclosed technique, when an operator edits material data, a still image of a scene (edit image) serving as a key in an editing process and a captured timecode corresponding to the edit image are registered as a web page in a server. The server then provides the web page to terminals as a bulletin board, and then transfers an edit image to a terminal in response to a request from that terminal. The transferred edit image contains the timecode corresponding to the edit image. A user of the terminal learns a location of the still image in the material data based on the timecode.

In the disclosed technique, however, the location of the previously registered edit image of one piece of material data can be found, but other related data cannot be referenced. More specifically, if data to be referenced is identified by a user, searching can be performed at a reference location based on registered information. However, if a plurality of mutually related data are managed independently, it is difficult to trace back to pre-edit material data used in the production of a complete packet (the material data produced as a result of a material gathering operation), and the scenario.

For example, when an editor references a portion of the complete packet, the editor may wish to reference an image of the pre-edit material data corresponding to that portion. The editor then replays the pre-edit material data together with the complete packet, and visually searches for the same portion based on the displayed image. Such a process inconveniences the editor.

Similarly, the editor may wish to reference the scenario corresponding to the complete packet. The editor compares the image of the complete packet with the scenario to search for the corresponding portion of the scenario.

A similar inconvenience occurs when data is referenced from data other than the complete packet. Operators frequently reference one data based on another data. Each time operators are forced to perform the above-mentioned complex job.

A complex job is performed to search for the pre-edit material data and the scenario from the complete packet. The editor has difficulty in a check process and an edit process. The check process is performed to check whether the complete packet has been produced in accordance with the scenario and to confirm in the pre-edit material data what the editor is aware of about the complete packet. The edit process requires the pre-edit material data and the scenario in accordance with the complete packet to modify an edit content of the complete packet and to produce another complete packet using the current complete packet.

SUMMARY OF THE INVENTION

Accordingly, it is an object of the present invention to provide an information processing apparatus that enhances the ease of data handling in the editing and checking process of data by facilitating linking of data and searching for one data from another data.

According to a first aspect of the present invention, an information processing apparatus includes an adding unit for adding, to second information, first linking information linking first information, and a generating unit for generating second linking information that links the second information to the first information.

The first linking information may contain identification information of the first information, and the second linking information may contain linking information that links identification information of the second information to the identification information of the first information.

The information processing apparatus may further include a storage unit for storing the linking information generated by the generating unit, a first acquisition unit for acquiring the identification information of the first information, and a supplying unit for extracting the identification information of the second information from the linking information stored in the storage unit, based on the identification information of the first information acquired by the first acquisition unit, and supplying the identification information of the second information.

The information processing apparatus may further include a second acquisition unit for acquiring the linking information, and an updating unit for updating the linking information stored in the storage unit using the linking information acquired by the second acquisition unit.

The first information may contain edit information containing an edit content of material data forming the content data, and the second information may contain data of the content data in the completed form thereof, generated and edited from the material data based on the edit content contained in the edit information.

The second information may contain second edit information containing an edit content relating to material data that is edited based on an edit content contained in first edit information containing an edit content of material data forming the content data, and the first information may contain the first edit information.

The first information may contain a composition table containing a plan of a composition of the content data, and the second information may contain edit information containing an edit content of material data forming the content data.

The second information may contain edit information containing an edit content of material data forming the content data, and the first information may contain material data, prior to editing, to be edited in accordance with the edit information.

The second information may contain a composition table containing a plan of a composition of the content data, and the first information may contain material data forming the content data.

According to a second aspect of the present invention, an information processing method includes a step of adding, to the second information, first linking information linking the first information, and a step of generating second linking information that links the second information to the first information.

According to a third aspect of the present invention, a computer program includes program code for performing a step of adding, to the second information, first linking information linking the first information, and a step of generating second linking information that links the second information to the first information.

According to a fourth aspect of the present invention, an information processing apparatus includes a storage unit for storing second linking information that links, to the first information, the second information with first linking information for linking the first information added thereto, a first acquisition unit for acquiring information relating to the second information from another information processing apparatus, an extracting unit for extracting, from the second linking information stored in the storage unit, information relating to the first information, corresponding to the information relating to the second information acquired by the first acquisition unit, and a supply unit for supplying, to the other information processing apparatus, the information relating to the first information extracted by the extracting unit.

The first linking information may contain identification information of the first information, and the second linking information may contain linking information that links identification information identifying the second information to the identification information identifying the first information.

The information processing apparatus may further include a second acquisition unit for acquiring the second linking information, and an updating unit for updating the second linking information stored in the storage unit using the second linking information acquired by the second acquisition unit.

The first information may contain edit information containing an edit content of material data forming the content data, and the second information may contain data of the content data in the completed form thereof, generated and edited from the material data based on the edit content contained in the edit information.

The first information may contain a composition table containing a plan of a composition of the content data, and the second information may contain edit information containing an edit content of material data forming the content data.

The second information may contain edit information containing an edit content of material data forming the content data, and the first information may contain material data, prior to editing, to be edited in accordance with the edit information.

The second information may contain a composition table containing a plan of a composition of the content data, and the first information may contain material data forming the content data.

According to a fifth aspect of the present invention, an information processing method includes a step of extracting information relating to the first information corresponding to information relating to the second information, acquired from another information processing apparatus, from second linking information that is stored in a storage unit and links, to the first information, the second information with first linking information for linking the first information added thereto, and a step of controlling supplying the information relating to the first information extracted in the extracting step to the other information processing apparatus.

According to a sixth aspect of the present invention, a computer program includes program code for performing a step of extracting information relating to the first information corresponding to information relating to the second information, acquired from the other information processing apparatus, from second linking information that is stored in a storage unit and links, to the first information, the second information with first linking information for linking the first information added thereto, and a step of controlling supplying the information relating to the first information extracted in the extracting step to the other information processing apparatus.

According to a seventh aspect of the present invention, an information processing apparatus includes a first acquisition unit for acquiring identification information of edit information containing an edit content of material data forming the content data, using identification information of data completed as the content data, the edit information accounted for in the completed data, and a second acquisition unit for acquiring the edit information accounted for in the completed data using the identification information of the edit information acquired by the first acquisition unit.

The information processing apparatus may further include a designation receiving unit for receiving a designation of a timecode in the completed data, an identifying unit for identifying identification information of the material data corresponding to the timecode received by the designation receiving unit, and the timecode in the material data, based on the edit information acquired by the second acquisition unit, a third acquisition unit for acquiring the material data using the identification information of the material data identified by the identifying unit, and an output unit for outputting data corresponding to the timecode, identified by the identifying unit, of the material data acquired by the third acquisition unit.

The information processing apparatus may further include a third acquisition unit for acquiring a composition table using identification information of the composition table serving as information relating to a plan of a production of the content data, the identification information corresponding to the edit information, based on the edit information acquired by the second acquisition unit.

The information processing apparatus may further include a designation receiving unit for receiving a designation of a timecode in the completed data, an identifying unit for identifying a cut in the composition table acquired by the third acquisition unit, the cut corresponding to the timecode received by the designation receiving unit, based on the edit information acquired by the second acquisition unit, and an output unit for outputting the cut in the composition table identified by the identifying unit.

According to an eighth aspect of the present invention, an information processing method includes a first acquisition control step of controlling acquiring identification information of edit information containing an edit content of material data forming the content data, using identification information of data completed as the content data, the edit information accounted for in the completed data, and a second acquisition control step of controlling acquiring the edit information accounted for in the completed data using the identification information of the edit information acquired in the first acquisition control step.

According to a ninth aspect of the present invention, a program includes program code for performing a first acquisition control step of controlling acquiring identification information of edit information containing an edit content of material data forming the content data, using identification information of data completed as the content data, the edit information accounted for in the completed data, and a second acquisition control step of controlling acquiring the edit information accounted for in the completed data using the identification information of the edit information acquired in the first acquisition control step.

In accordance with embodiments of the present invention, the first linking information for linking the first information is added to the second information, and the second linking information for linking the second information to the first information is thus generated.

In accordance with the embodiments of the present invention, the second linking information for linking, to the first information, the second information with the first linking information added thereto, is stored, the information relating to the second information is acquired from the other information processing apparatus, and the information relating to the first information corresponding to the information relating to the acquired second information is extracted from the stored second linking information. The information relating to the extracted first information is supplied to the other information processing apparatus.

The identification information of the edit information containing the edit content of the material data forming the content data is acquired using the identification information of the data completed as the content data. The edit information is accounted for in the completed data.

In accordance with the embodiments of the present invention, the edit process and the check process of the data are easily performed, and the ease of handling the data is enhanced.

BRIEF DESCRIPTION OF THE DRAWINGS

FIGS. 11A-11C illustrate the structure of the composition table;

FIG. 12 illustrates general metadata;

FIGS. 15A-15C illustrate a generated video file and take metadata;

FIG. 18 illustrates the structure of a reference-related table;

FIGS. 21A, 21B and 21C illustrate a pre-edited composition table;

FIG. 23 illustrates another reference-related table;

FIG. 24 illustrates an example of an edit description;

FIG. 26 illustrates another reference-related table;

FIG. 27 illustrates an example of an edit description;

FIG. 31 illustrates another reference related table;

FIG. 36 illustrates the structure of the reference-related table managed in the metadata server;

DESCRIPTION OF THE PREFERRED EMBODIMENTS

Figure 1:
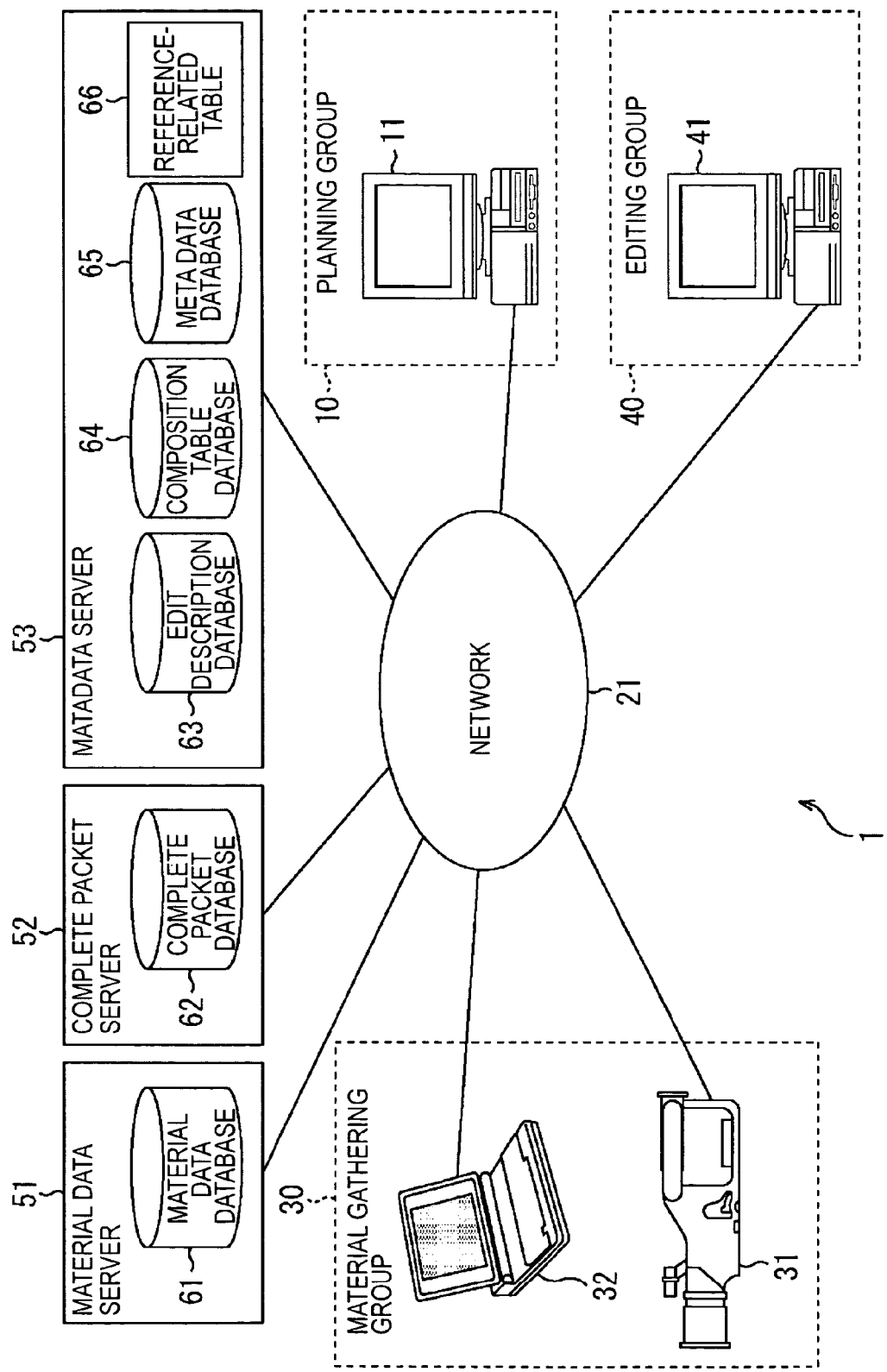
FIG. 1 is a block diagram of a network system implementing one embodiment of the present invention.

An information processing apparatus (one of a planning terminal 11, an image pickup device 31, a field PC 32, and an editing terminal 41 shown in FIG. 1) of the present invention processes first information and second information, each information generated in a production of content data and containing information relating to the content data. The information processing apparatus includes an adding unit (for example, a CPU 151 of FIG. 4 performing a process in step S114 of FIG. 16) for adding, to the second information, first linking information (for example, a UMID of FIG. 35) linking the first information, and a generating unit (the CPU 151 of FIG. 4 performing a process in step S120 of FIG. 16) for generating second linking information (a reference-related table 391 of FIG. 18) that links the second information to the first information.

The first linking information contains identification information (for example, the UMID of FIG. 35) of the first information, and the second linking information contains linking information (for example, the reference-related table 391 of FIG. 18) that links identification information of the second information to the identification information of the first information.

The information processing apparatus further includes a storage unit (for example, a storage unit 363 of FIG. 8) for storing the linking information generated by the generating unit, a first acquisition unit (for example, a CPU 351 of FIG. 8 performing a process in step S281) for acquiring the identification information of the first information, and a supplying unit (for example, the CPU 351 of FIG. 8 performing a process in step S284 of FIG. 37) for extracting the identification information of the second information from the linking information stored in the storage unit, based on the identification information of the first information acquired by the first acquisition unit, and supplying the identification information of the second information.

The information processing further includes a second acquisition unit (for example, the CPU 351 of FIG. 8 performing a process in step S151 of FIG. 19) for acquiring the linking information, and an updating unit (for example, the CPU 351 of FIG. 8 performing a process in step S162 of FIG. 19) for updating the linking information stored in the storage unit using the linking information acquired by the second acquisition unit.

The first information contains edit information (for example, an effect-added edit list 454 of FIG. 35) containing an edit content of material data (for example, material data 452 of FIG. 35) forming the content data, and the second information contains data (for example, a complete packet 455 of FIG. 35) of the content data in the completed form thereof, generated and edited from the material data based on the edit content contained in the edit information.

The second information contains second edit information (the effect-added edit list 454 of FIG. 35) containing an edit content relating to material data that is edited based on an edit content contained in first edit information (for example, an edit list 453 of FIG. 35) containing an edit content of material data (for example, the material data 452 of FIG. 35) forming the content data, and the first information contains the first edit information.

The first information contains a composition table (for example, a composition table 451 of FIG. 35) containing a plan of a composition of the content data, and the second information contains edit information (for example, the edit list 453 of FIG. 35) containing an edit content of material data (for example, the material data 452 of FIG. 35) forming the content data.

Figure 35:
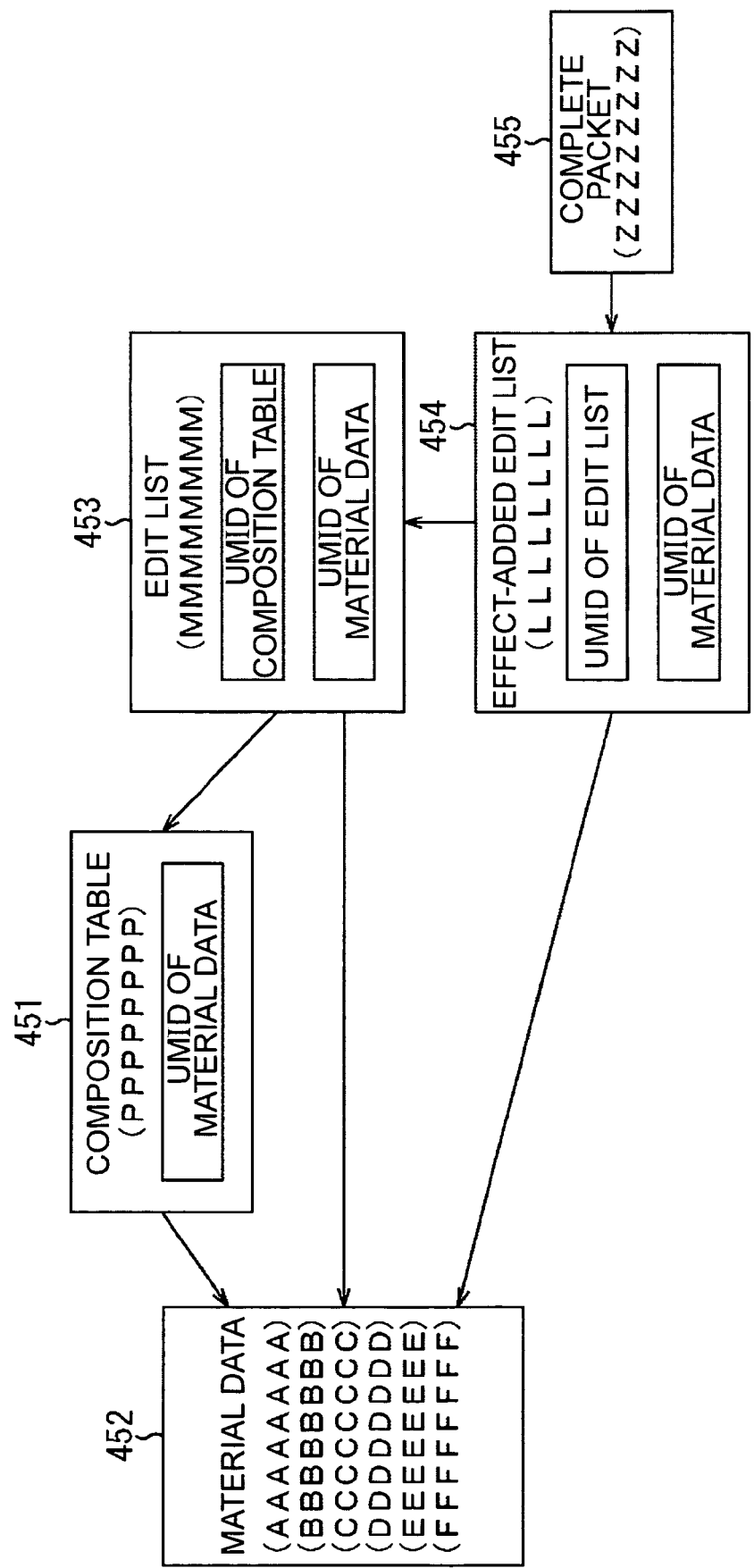
FIG. 35 illustrates a tied relationship of each data.

The second information contains edit information (for example, one of the edit list 453 and the effect-added edit list 454 of FIG. 35) containing an edit content of material data (for example, the material data 452 of FIG. 35) forming the content data, and the first information contains the material data, prior to editing, to be edited in accordance with the edit information.

The second information contains a composition table (for example, the composition table 451 of FIG. 35) containing a plan of a composition of the content data, and the first information contains material data (for example, the material data 452 of FIG. 35) forming the content data.

The present invention provides an information processing method of an information processing apparatus (one of the planning terminal 11, the image pickup device 31, the field PC 32, and the editing terminal 41 shown in FIG. 1) for processing first information and second information, each information generated in a production of content data and containing information relating to the content data. The information processing method includes a step (for example, step S114 of FIG. 16) of adding, to the second information, first linking information (for example, the UMID of FIG. 35) linking the first information, and a step (for example, step S120 of FIG. 20) of generating second linking information (for example, the reference-related table 391 of FIG. 18) that links the second information to the first information.

The present invention provides an information processing apparatus (for example, a metadata server 53 of FIG. 1) for processing first information and second information, each information generated in a production of content data. The information processing apparatus includes a storage unit (for example, the storage unit 363 of FIG. 8) for storing second linking information (for example, a reference-related table 66 of FIG. 1) that links, to the first information, the second information with first linking information (for example, the UMID of FIG. 35) for linking the first information added thereto, a first acquisition unit (the CPU 351 performing a process in step S281 of FIG. 37) for acquiring information relating to the second information from another information processing apparatus (for example, one of the planning terminal 11, the image pickup device 31, the field PC 32, and the editing terminal 41 shown in FIG. 1), an extracting unit (the CPU 351 of FIG. 8 performing a process in step S293 of FIG. 37) for extracting, from the second linking information stored in the storage unit, information relating to the first information, corresponding to the information relating to the second information acquired by the first acquisition unit, and a supply unit (the CPU 351 of FIG. 8 performing a process in step S284 of FIG. 37) for supplying, to the other information processing apparatus, the information relating to the first information extracted by the extracting unit.

The first linking information contains identification information (for example, the UMID of FIG. 35) of the first information, and the second linking information contains linking information (for example, the reference-related table 66 of FIG. 1) that links identification information identifying the second information to the identification information identifying the first information.

The information processing apparatus further includes a second acquisition unit (for example, the CPU 351 of FIG. 8 performing a process in step S151 of FIG. 19) for acquiring the second linking information, and an updating unit (for example, the CPU 351 of FIG. 8 performing a process in step S162 of FIG. 19) for updating the second linking information stored in the storage unit using the second linking information acquired by the second acquisition unit.

The first information contains edit information (for example, the effect-added edit list 454 of FIG. 35) containing an edit content of material data (for example, the material data 452 of FIG. 35) forming the content data, and the second information contains data (for example, the complete packet 455 of FIG. 35) of the content data in the completed form thereof, generated and edited from the material data based on the edit content contained in the edit information.

The first information contains a composition table (for example, the composition table 451 of FIG. 35) containing a plan of a composition of the content data, and the second information contains edit information (for example, the edit list 453 of FIG. 35) containing an edit content of material data (for example, the material data 452 of FIG. 35) forming the content data.

The second information contains edit information (for example, one of the edit list 453 and the effect-added edit list 454 of FIG. 35) containing an edit content of material data (for example, the material data 452 of FIG. 35) forming the content data, and the first information contains material data, prior to editing, to be edited in accordance with the edit information.

The second information contains a composition table (for example, the composition table 451 of FIG. 35) containing a plan of a composition of the content data, and the first information contains material data (for example, the material data 452 of FIG. 35) forming the content data.

The present invention provides an information processing method of an information processing apparatus (for example, the metadata server 53 of FIG. 1) for processing first information and second information, each information generated in a production of content data. The information processing method includes a step (for example, step S293 of FIG. 37) of extracting information relating to the first information corresponding to information relating to the second information acquired from another information processing apparatus (for example, one of the planning terminal 11, the image pickup device 31, the field PC 32, and the editing terminal 41 shown in FIG. 1), from second linking information (for example, the reference-related table 66 of FIG. 1) that is stored in a storage unit (for example, a storage unit 363 of FIG. 8) and links, to the first information, the second information with first linking information (the UMID of FIG. 35) for linking the first information added thereto, and a step (for example, step S284 of FIG. 37) of controlling supplying the information relating to the first information extracted in the extracting step to the other information processing apparatus.

The present invention provides an information processing apparatus (for example, the editing terminal 41 of FIG. 1) for processing information relating to content data. The information processing apparatus includes a first acquisition unit (for example, a CPU 201 of FIG. 5 performing a process in step S314 of FIG. 40) for acquiring identification information of edit information (for example, the effect-added edit list 454 of FIG. 35) containing an edit content of material data (for example, the material data 452 of FIG. 35) forming the content data, using identification information (for example, the UMID 423 of FIG. 32) of data completed as the content data, the edit information accounted for in the completed data (for example, the complete packet 455 of FIG. 35), and a second acquisition unit (for example, the CPU 201 of FIG. 5 performing a process in step S316 of FIG. 40) for acquiring the edit information accounted for in the completed data using the identification information of the edit information acquired by the first acquisition unit.

The information processing apparatus further includes a designation receiving unit (for example, the CPU 201 of FIG. 5 performing a process in step S312 of FIG. 40) for receiving a designation of a timecode in the completed data, an identifying unit (for example, the CPU 201 of FIG. 5 performing a process in step S317 of FIG. 40) for identifying identification information of the material data corresponding to the timecode received by the designation receiving unit, and the timecode in the material data, based on the edit information acquired by the second acquisition unit, a third acquisition unit (for example, the CPU 201 of FIG. 5 performing a process in step S319 of FIG. 40) for acquiring the material data using the identification information of the material data identified by the identifying unit, and an output unit (for example, the CPU 201 of FIG. 5 performing a process in step S320 of FIG. 40) for outputting data corresponding to the timecode, identified by the identifying unit, of the material data acquired by the third acquisition unit.

The information processing apparatus further includes a third acquisition unit (for example, the CPU 201 of FIG. 5 performing a process in step S349) for acquiring a composition table (for example, the composition table 451 of FIG. 35) using identification information of the composition table serving as information relating to a plan of a production of the content data, the identification information corresponding to the edit information, based on the edit information acquired by the second acquisition unit.

Figure 41:
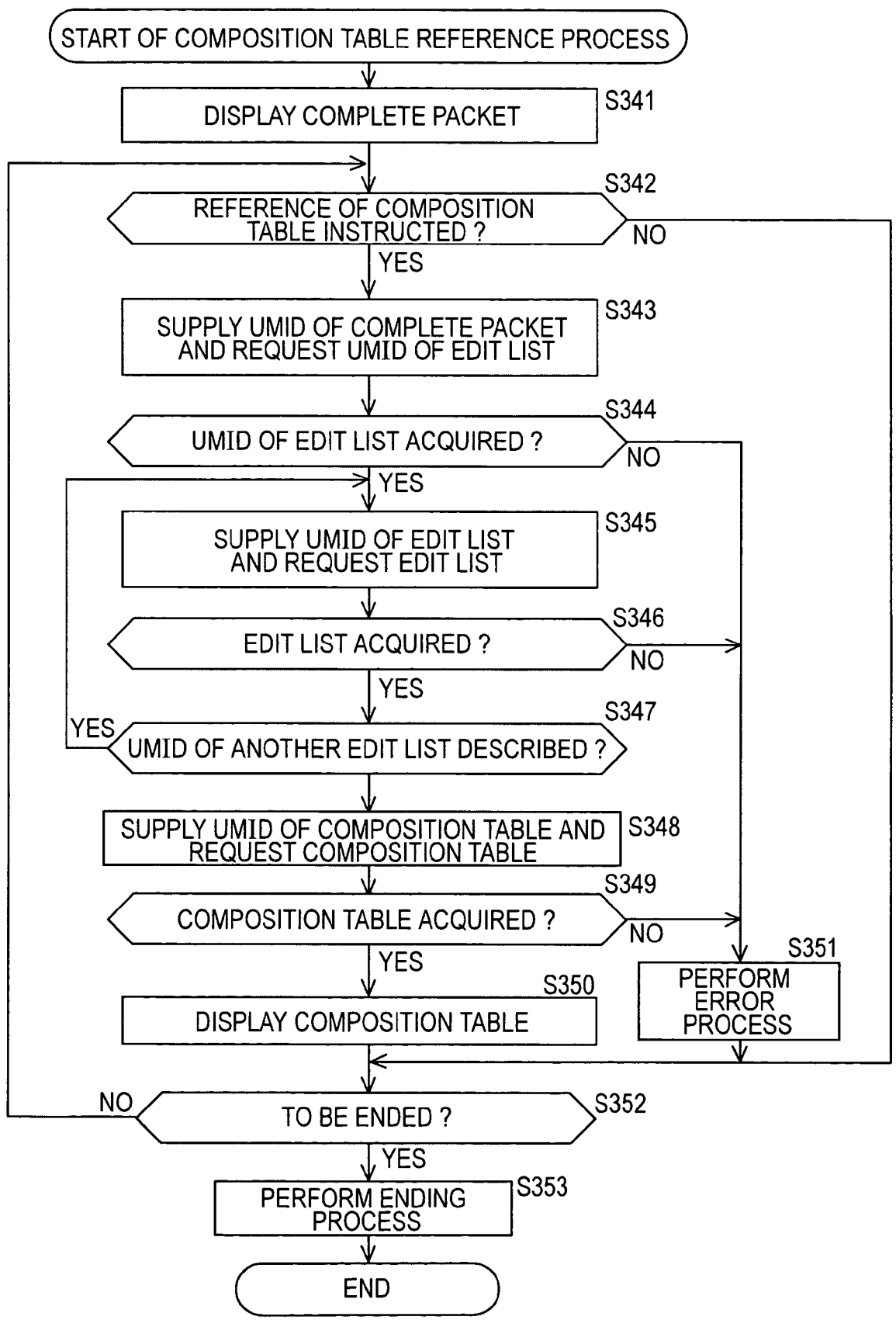
FIG. 41 is a flowchart of a composition table reference process.

The information processing apparatus further includes a designation receiving unit (for example, the CPU 201 of FIG. 5 performing a process in step S342 of FIG. 41) for receiving a designation of a timecode in the completed data, an identifying unit (for example, the CPU 201 of FIG. 5 performing a process in step S348 of FIG. 41) for identifying a cut (a cut 1 including a frame "W" of a composition table of FIG. 39) in the composition table acquired by the third acquisition unit, the cut corresponding to the timecode received by the designation receiving unit, based on the edit information acquired by the second acquisition unit, and an output unit (for example, the CPU 201 of FIG. 5 performing a process in step S350 of FIG. 41) for outputting the cut in the composition table identified by the identifying unit.

The present invention provides an information processing method of an information processing apparatus (for example, the editing terminal 41 of FIG. 1) for processing information relating to content data. The information processing method includes a first acquisition control step (for example, step S314 of FIG. 40) of controlling acquiring identification information of edit information (for example, the effect-added edit list 454 of FIG. 35) containing an edit content of material data (for example, the material data 452 of FIG. 35) forming the content data, using identification information (for example, the UMID 423 of FIG. 32) of data (for example, the complete packet 455 of FIG. 35) completed as the content data, the edit information accounted for in the completed data, and a second acquisition control step (for example, step S316 of FIG. 40) of controlling acquiring the edit information accounted for in the completed data using the identification information of the edit information acquired in the first acquisition control step.

The embodiments of the present invention are described below with reference to the drawings.

FIG. 1 illustrates a network system 1 of one embodiment of the present invention.

The network system 1 is a program production assisting system for use in a production of content data such as a television program. The production of the content data is basically divided into a planning and composition process, a material gathering process, and an editing and production process. In the planning (composition) process, the entire production process of a video program is controlled. A concept of the video program is developed, and the video program is planned to create a scenario of the video program. In the material gathering process, a material gathering operation is performed in a field in accordance with a production instruction and the scenario. Each scene of a video forming the video program is taken and video taking conditions are also recorded. In the editing (production) process, video data and audio data obtained in the material gathering operation are edited in accordance with the production instruction, the scenario, etc. Other information (including computer graphics/superimpose (CG/SI) information, narration, library video, music, etc.) is added to the video data and audio data obtained in the material gathering operation or the edited video data and audio data. Completed data (content data) thus results as a complete packet.

These production steps are basically performed by different persons. One step is typically performed by a plurality of persons. In the following discussion, all persons performing the one production step are referred to as a group. For example, all persons performing the planning (composition) process are referred to as a planning group, all persons performing the material gathering operation are referred to as a material gathering group, and all persons performing the editing (production) process are referred to as an editing group.

The network system 1 of FIG. 1 is the program production assisting system for assisting the persons in each production process. The network system 1 includes, as terminals, a planning terminal 11 of a planning group 10, an image pickup device 31 and a field PC 32 of the material gathering group 30, and an editing terminal 41 of an editing group 40. The terminals, connected to a network 21, can access each other via the network 21.

The image pickup device 31 of the material gathering group 30 is a video camera such as a Camcorder® and is used to gather materials for news broadcasting, and capture a video content (including picking up an audio) of sporting events and movies, for example. The image pickup device 31 captures video and audio data from an object, and records the video and audio data onto a recording medium, such as an optical disk like a DVD (digital versatile disk), and transmits the video and audio data to another device, such as the editing terminal 41. In cooperation with the field PC 32, the image pickup device 31 can acquire information relating to video taking (such as date setting and weather conditions), associates the information with the video and audio data, and records the resulting data onto the recording medium and transmits the resulting data. Conversely, the image pickup device 31 can supply information to the field PC 32.

The field PC 32 includes a mobile information processing apparatus, such as a notebook computer or a PDA (personal digital assistant), and a peripheral device. The field PC 32 shares the video data and the audio data, and metadata thereof with the image pickup device 31. In response to an input from a person in charge of the material gathering group, the field PC 32 produces information, such as the one relating to material gathering and video taking operations, useful in a subsequent edit process. The field PC 32 thus links the information to the video data and the audio data obtained in the image pickup device 31.

Each of the planning terminal 11 and the editing terminal 41 includes an information processing apparatus, such as a personal computer, and a peripheral device. Persons in charge uses each of the planning terminal 11 and the editing terminal 41 in corresponding process steps.

The network system 1 includes a material data server 51, a complete packet server 52, and a metadata server 53, each connected to the network 21, and using, as terminals connected thereto, the planning terminal 11, the image pickup device 31, the field PC 32, the editing terminal 41, etc.

The material data server 51, including a material data server 61, stores material data (such as the video data and the audio data) obtained by the image pickup device 31 of the material gathering group 30, onto the material data server 61, while transferring the material data to each terminal.

The complete packet server 52, including a complete packet database 62, stores a complete packet of the completed data produced as a content (video program) by the editing terminal 41 of the editing group 40, onto the complete packet database 62, while transferring the complete packet to each terminal.

The metadata server 53, including an edit description database 63, a composition table database 64, and a metadata database 65, stores an edit description (a description of an edit content of the material data) produced by the editing terminal 41 of the editing group 40, onto the edit description database 63, while transferring the edit description to each terminal. The metadata server 53 also stores a composition table (scenario data containing a plan of a production of content data) produced by the planning terminal 11 of the planning group 10, onto the composition table database 64, while transferring the composition table to each terminal. The metadata server 53 also stores the metadata of the material data produced by one of the image pickup device 31 and the field PC 32 of the material gathering group 30 onto the metadata database 65, while transferring the metadata to each terminal.

As will be discussed later, the metadata server 53 includes a reference-related table 66 that manages the reference relationship of data using an UMID (Unique Material IDentifier). The metadata server 53 uses the reference-related table 66 to manage information of the reference relationship supplied from each terminal and represented by a UMID. The UMID is identification information identifying each data. The metadata server 53 provides the UMID information of data to each terminal in response to a request from the terminal using the reference-related table 66.

The UMID is an identifier specified in Standards of SMPTE (Society of Motion Picture and Television Engineers), and globally and uniquely identifies an audio-visual (AV) object. The material data is identified by a UMID in any directory. If the correspondence between the directory managing the material data and the UMID is managed, target material data can be designated regardless of the directory.

The network system 1 of FIG. 1 is a server and client system including, as the servers thereof, the material data server 51, the complete packet server 52, and the metadata server 53, and as the clients thereof, the planning terminal 11, the image pickup device 31, the field PC 32, and the editing terminal 41.

The composition table (scenario), serving a design for the production of a program, is metadata of the produced program (content data). The job of each process step is basically performed in accordance with the composition table. In a planning phase of the program, the planning group 10 creates the composition table using the planning terminal 11, and uploads the composition table to the metadata server 53 via the network 21, while storing the metadata in the composition table database 64 at the same time.

The material data is composed of the video data and the audio data, collected by the image pickup device 31 of the material gathering group 30. The material data is produced in the material gathering process, and uploaded to the material data server 51 via the network 21 to be stored and registered in the material data server 61. The material data also contains information, such as a timecode, directly attached to the video data and the audio data.

The metadata is information linked to and related to the material data. The metadata, which is useful in the subsequent editing process, includes a date and time, a location, and a conditions of material gathering and video taking operations, for example. The metadata is created by one of the image pickup device 31 and the field PC 32 of the material gathering group 30, and is linked to the material data. The metadata is uploaded to the metadata server 53 via the network 21 to be registered and stored in the metadata database 65.

The edit description is a description of information containing an edit content and generated in the edit process of the material data, and is described in XML (extensible Markup Language). More specifically, when the editing terminal 41 of the editing group 40 performs an edit process (non-destructive edit process) on the material data, an edit description results. In the edit process, the editing terminal 41 does not directly process the material data to be processed (the material data left intact), but produces an edit list as edit results, generates the edit description containing the edit content, and contains the edit description in the edit list. For example, to combine a plurality of material data into a single piece of data in the edit process, the editing terminal 41 creates an edit description, as information for the edit list, representing how the material data is combined, with the material data to be edited left intact. The edit description (edit list) thus produced is uploaded to the metadata server 53 via the network 21 to be stored and registered in the edit description database 63.

The complete packet is data completed as a program (namely, the content data). The completed packet is produced in the edit process by the editing terminal 41 of the editing group 40. The editing terminal 41 produces the complete packet based on the above-referenced edit description using the material data. More specifically, the complete packet is content data composed of the video data and the audio data as the material data is. The complete packet is uploaded to the complete packet server 52 via the network 21 to be stored and registered in the complete packet database 62.

These pieces of data are delivered to each terminal via the network 21 by the respective server in response to a request from the terminal. The data contains information of the UMID of another related data as will be discussed later. Each terminal can thus reference another data using a description of the UMID of the other data.

The metadata server 53 manages, as the reference-related table 66, information for linking data to information containing the UMID of that data, namely, information for reverse referencing data containing own UMID from another data having that data containing own UMID. Table information representing the correspondence between data is produced in each terminal when the data is produced. The table information is uploaded to the metadata server 53 via the network 21 to be managed as the reference-related table 66.

The data produced in the production of the program is mutually linked to each other as necessary, and each terminal can reference one data based on another data. Each terminal easily links one data to another, and a user of each terminal can easily search for one data from another data. The network system 1 of FIG. 1 easily performs the edit process and the check process on the data, thereby enhancing the ease of handling data.

As shown in FIG. 1, one terminal is shown in each work group. Alternatively, a plurality of terminals may be arranged for each work group. If a plurality of groups are used in a single process step, a terminal may be assigned to a single group or a single person. For example, a plurality of material gathering groups 30 usually work in the material gathering process, and a plurality of image pickup devices 31 are used accordingly. The same is true of the other groups, and a plurality of terminals can be used.

In the above discussion, the production of the program is divided into the planning (composition) process, the material gathering process, and the editing (production) process. The production of the program can be divided in a manner different from the above-referenced manner. The assignment of the terminals can be different from that discussed above. For example, the same terminal can be shared by the planning group and the editing group.

Figure 2:
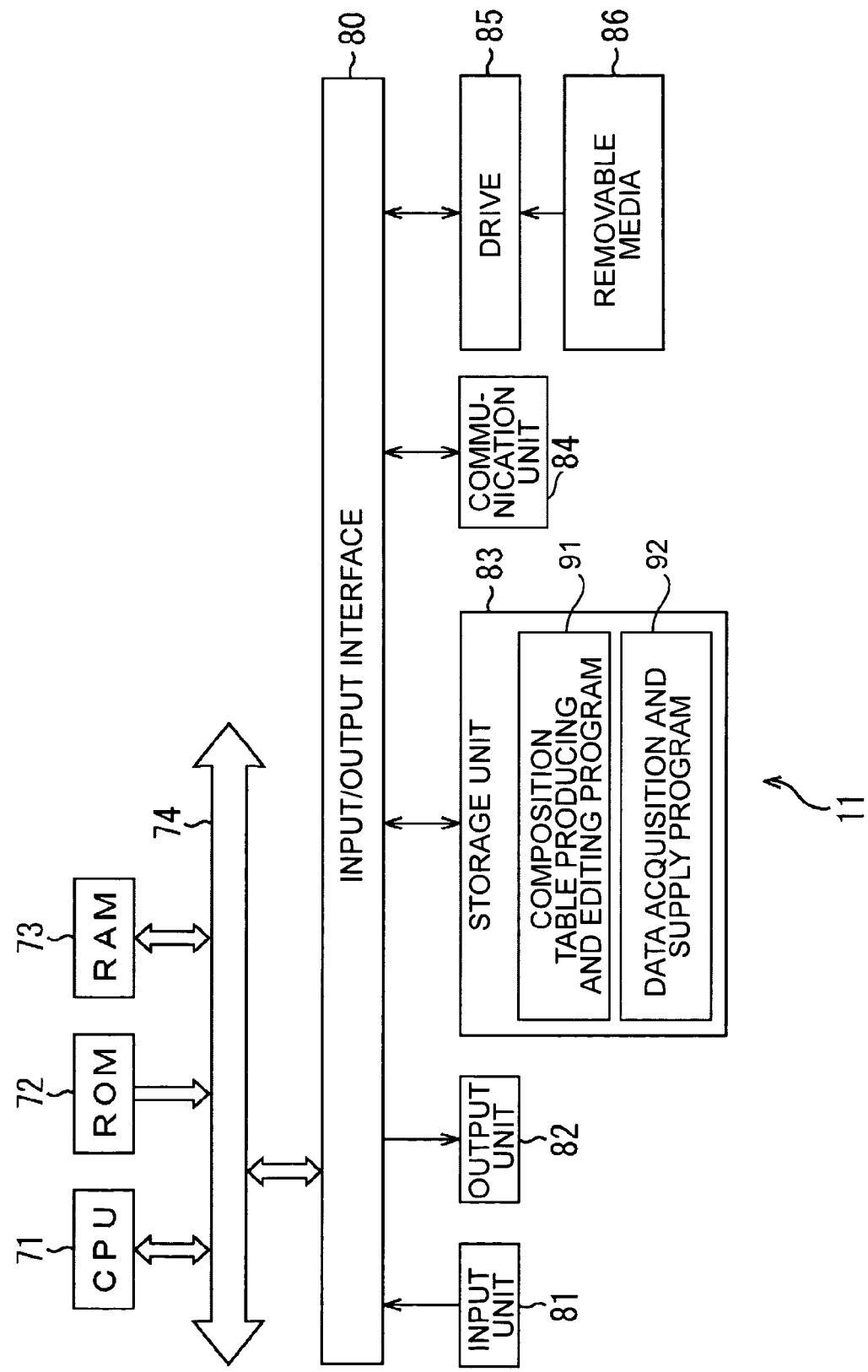
FIG. 2 is a block diagram of a planning terminal of FIG. 1.

FIG. 2 illustrates the structure of the planning terminal 11 of FIG. 1.

As shown in FIG. 2, a CPU 71 of the planning terminal 11 executes a variety of processes in accordance with a program stored in a ROM (read-only memory) 72 or a program loaded to a RAM (random-access memory) 73 from a storage unit 83. The RAM 73 stores, as necessary, data and programs required by the CPU 71 to perform the variety of processes.

The CPU 71, the ROM 72, and the RAM 73 are mutually connected to each other via a bus 74. Also, an input/output interface 80 is connected to the bus 74.

An input/output interface 80, connected to an input unit 81 composed of a keyboard and a mouse, outputs a signal inputted from the input unit 81 to the CPU 71. The input/output interface 80 is also connected to an output unit 82 composed of a display and a loudspeaker.

A storage unit 83, composed of a hard disk or the like, is connected to the input/output interface 80. The storage unit 83 stores a composition table producing and editing program 91, and a data acquisition and supply program 92. These programs are loaded to the RAM 73 and then executed by the CPU 71. By executing the programs, the CPU 71 performs a production process of the composition table, an editing process, and a data acquisition process and a data supply process to another device.

The input/output interface 80 is connected to a communication unit 84, which communicates with another server or another terminal via the network 21. A drive 85 is connected to the input/output interface 80, as necessary. The drive 85 is used to read data from or write data to a removable medium 86, such as a magnetic disk, an optical disk, a maneto-optical disk, or a semiconductor memory.

Figure 3:
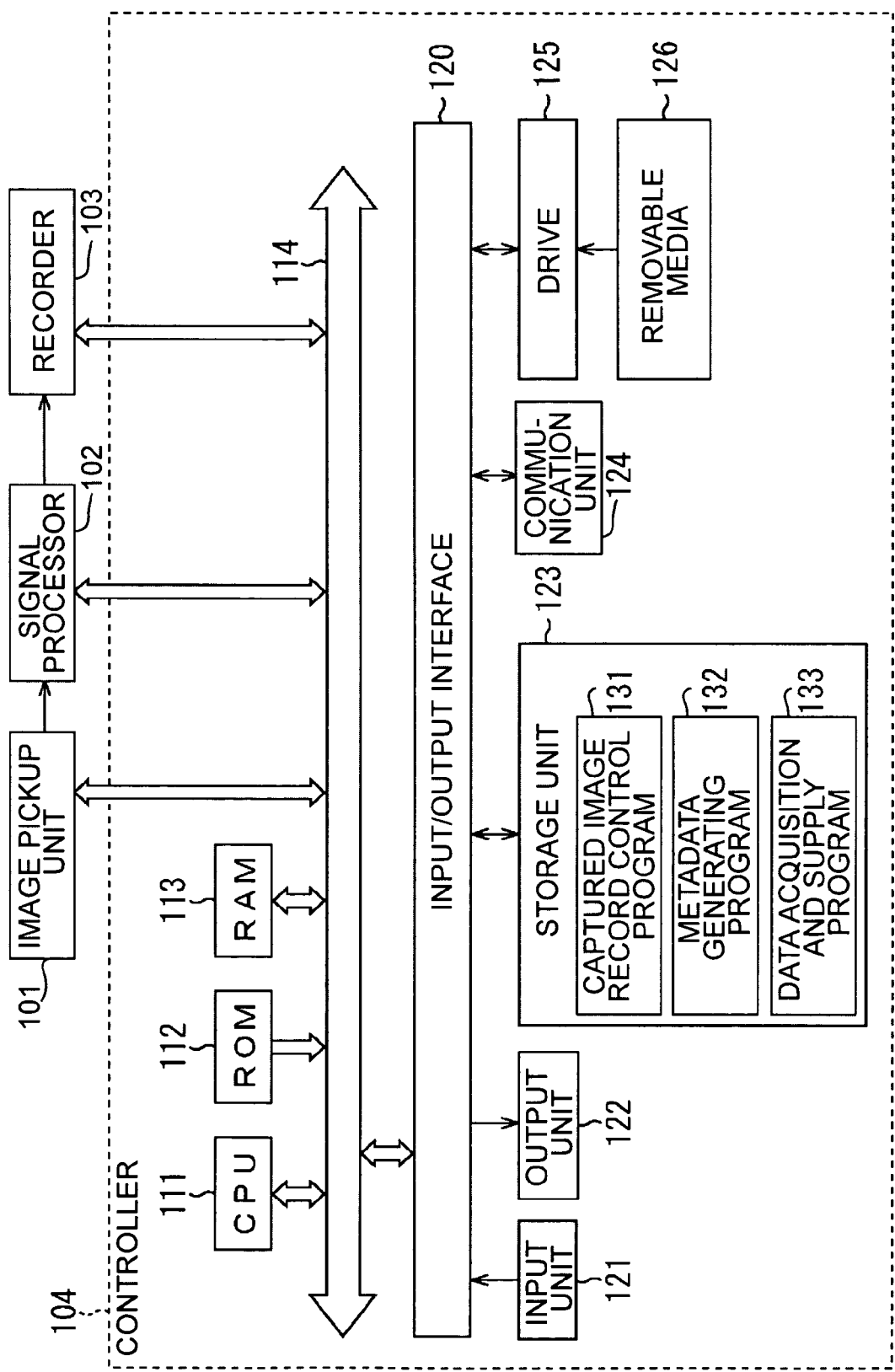
FIG. 3 is a block diagram of an image pickup device of FIG. 1.

FIG. 3 illustrates the structure of the image pickup device 31 in detail.

The image pickup device 31 includes an image pickup unit 101 for picking up an image and a sound of an object, a signal processor 102 for performing a variety of signal processings on the video data and the audio data obtained from the image pickup unit 101, a recorder 103 for recording the video data and the audio data, processed by the signal processor 102, onto a recording medium or the like, and a controller 104 for controlling the image pickup unit 101, the signal processor 102, and the recorder 103.

A CPU 111 of the controller 104 controls the image pickup device 31 in accordance with a program stored in a ROM 112 or a program loaded to a RAM 113 from a storage unit 123. The RAM 113 stores, as necessary, data and programs which the CPU 111 needs to execute a variety of processes.

The CPU 111, the ROM 112, and the RAM 113, mutually connected to each other via a bus 114, exchange information, such as data and programs, with each other. The image pickup unit 101, the signal processor 102, and the recorder 103 are also connected to the bus 114, and the CPU 111 controls these elements via the controller 104. An input/output interface 120 is also connected to the bus 114.

The input/output interface 120, connected to a input unit 121 composed of a keyboard and a mouse, outputs a signal from the input unit 121 to the CPU 111. An output unit 122, composed of a display and a loudspeaker, is connected to the input/output interface 120.

A storage unit 123, composed of a hard disk or the like, is connected to the input/output interface 120. The storage unit 123 stores a captured image record control program 131, a metadata generating program 132, and a data acquisition and supply program 133. These programs are loaded to the RAM 113 and then executed by the CPU 111. As will be discussed later, the CPU 111 controls the image pickup unit 101, the signal processor 102, and the recorder 103 to record a captured image by executing the captured image record control program 131. The CPU 111 generates the metadata of the video data and the audio data obtained in the captured image record process by executing the metadata generating program 132. The CPU 111 acquires data from and supplies data to another device by executing the data acquisition and supply program 133.

The input/output interface 120 is connected to a communication unit 124, which is in turn connected to the network 21 to communicate with another server and another terminal. A drive 125 is also connected to the input/output interface 120, as necessary. The drive 125 reads data from and writes data to a removable medium 126 as a recording medium, such as a magnetic disk, an optical disk, a magneto-optical disk, or a semiconductor memory.

Figure 4:
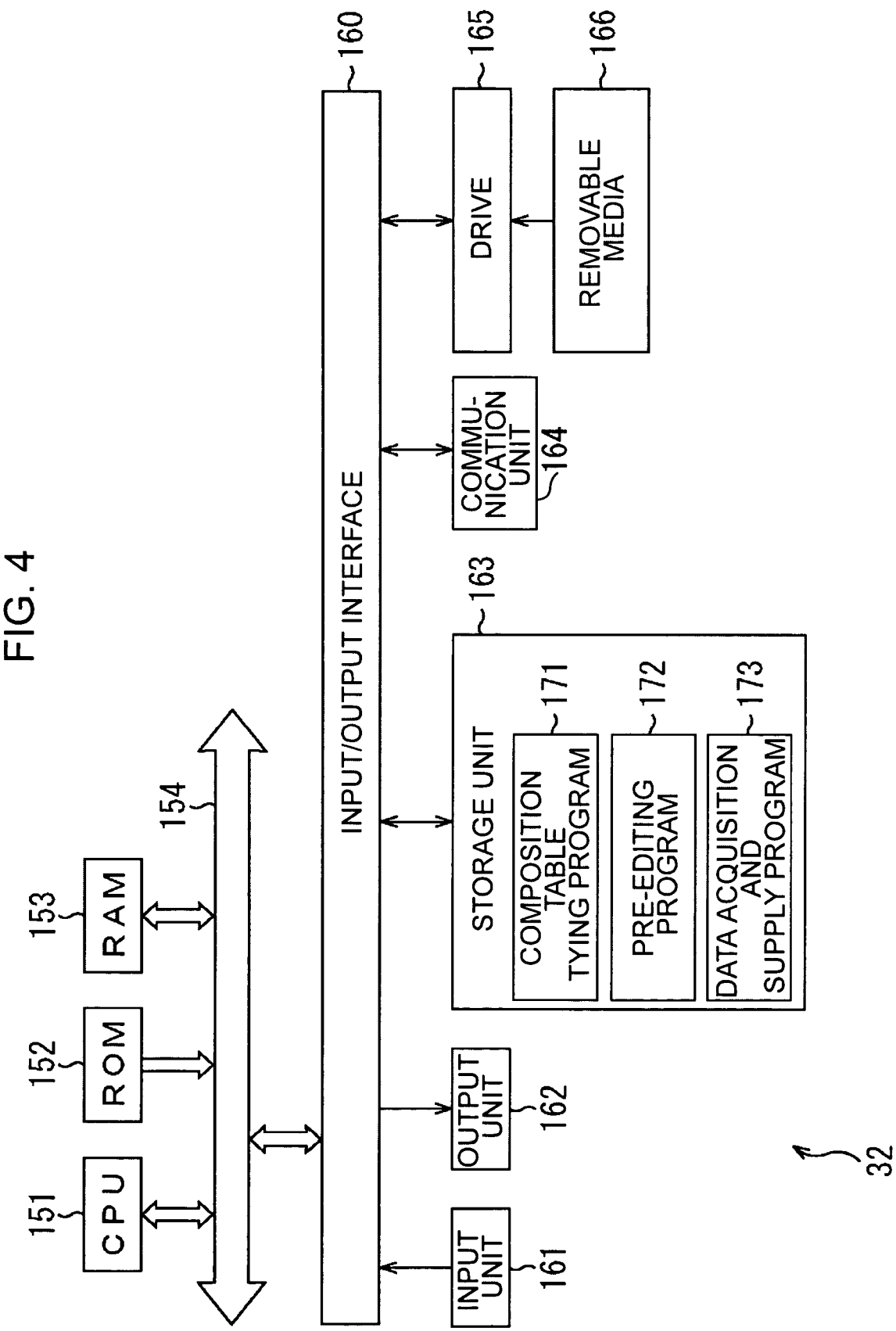
FIG. 4 is a block diagram of a field personal computer (PC) of FIG. 1.

FIG. 4 illustrates the structure of the field PC 32 of FIG. 1.

As the planning terminal 11 of FIG. 2, the field PC 32 also includes a CPU 151, a ROM 152, and a RAM 153. The CPU 151, the ROM 152, and the RAM 153 are mutually connected to each other via a bus 154. The CPU 151 corresponds to the CPU 71, the ROM 152 corresponds to the ROM 72, the RAM 153 corresponds to the RAM 73, and the bus 154 corresponds to the bus 74.

As in the planning terminal 11 of FIG. 2, an input/output interface 160 is connected to the bus 154 of the field PC 32. Each of an input unit 161, an output unit 162, a storage unit 163, a communication unit 164, and a drive 165 is connected to the input/output interface 160. The input/output interface 160 corresponds to the input/output interface 80, the input unit 161 corresponds to the input unit 81, the output unit 162 corresponds to the output unit 82, the storage unit 163 corresponds to the storage unit 83, the communication unit 164 corresponds to the communication unit 84, and the drive 165 corresponds to the drive 85. The removable medium 166, which the drive 165 reads and writes data and programs from and to, corresponds to the removable medium 86.

In other words, the field PC 32 is identical in structure to the planning terminal 11, and each element of the field PC 32 performs a process identical to the process of the counterpart element in the planning terminal 11.

The storage unit 163 stores a composition table tying program 171, a pre-editing program 172, and a data acquisition and supply program 173. These programs are loaded to the RAM 153 and then executed by the CPU 151. As will be discussed later, the CPU 151 links the material data to the composition table by executing the composition table tying program 171. The CPU 151 pre-edits the material data by executing the pre-editing program 172. The CPU 151 acquires data from and supplies data to another device by executing the data acquisition and supply program 173.

Figure 5:
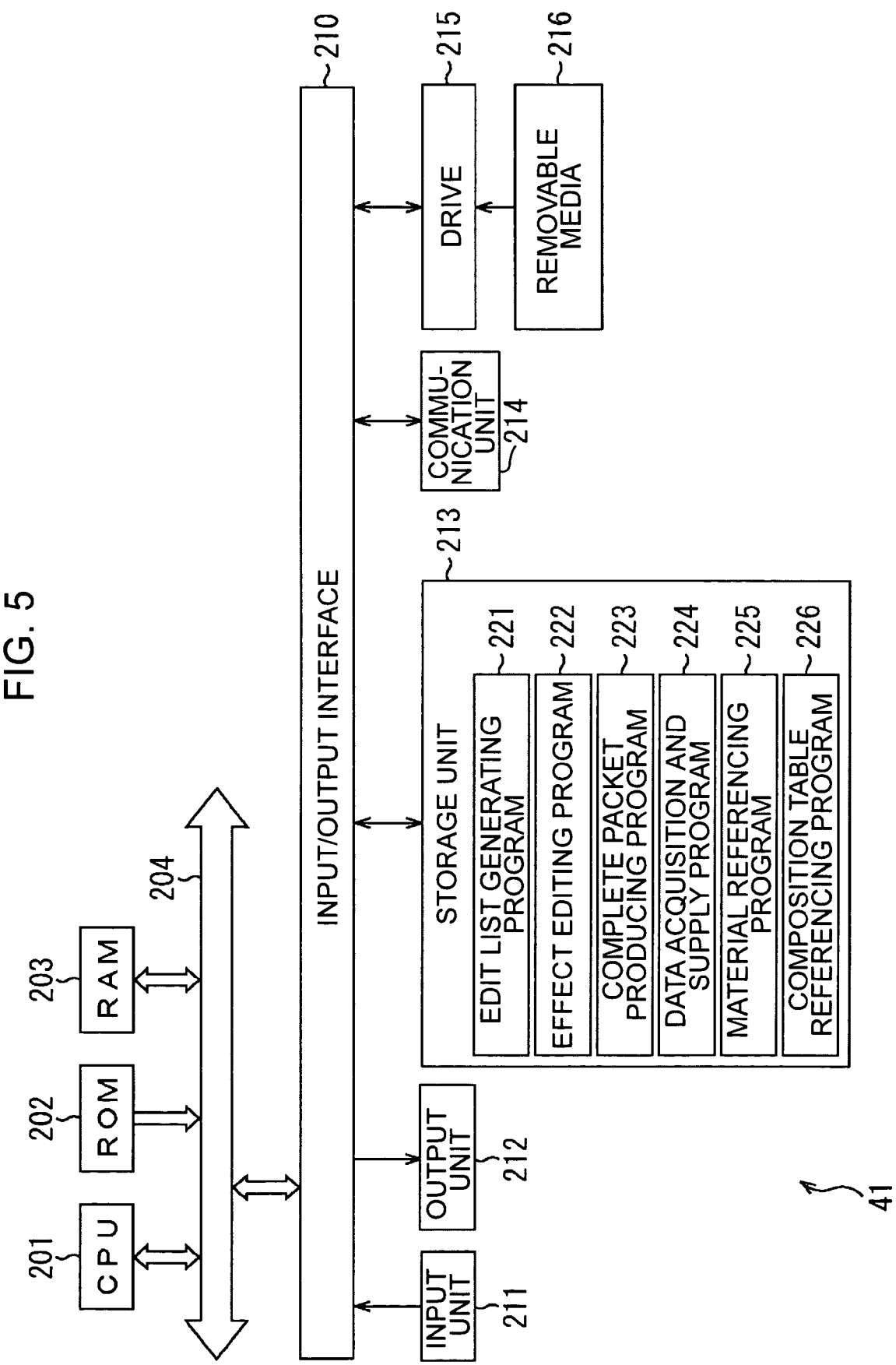
FIG. 5 is a block diagram of an editing terminal of FIG. 1.

FIG. 5 illustrates the structure of the editing terminal 41 of FIG. 1.

As the planning terminal 11 of FIG. 2, the editing terminal 41 also includes a CPU 201, a ROM 202, and a RAM 203. The CPU 201, the ROM 202, and the RAM 203 are mutually connected to each other via a bus 204. The CPU 201 corresponds to the CPU 71, the ROM 202 corresponds to the ROM 72, the RAM 203 corresponds to the RAM 73, and the bus 204 corresponds to the bus 74.

As in the planning terminal 11 of FIG. 2, an input/output interface 210 is connected to the bus 204 of the editing terminal 41. Each of an input unit 211, an output unit 212, a storage unit 213, a communication unit 214, and a drive 215 is connected to the input/output interface 210. The input/output interface 210 corresponds to the input/output interface 80, the input unit 211 corresponds to the input unit 81, the output unit 212 corresponds to the output unit 82, the storage unit 213 corresponds to the storage unit 83, the communication unit 214 corresponds to the communication unit 84, and the drive 215 corresponds to the drive 85. A removable medium 216, which the drive 215 reads and writes data and programs from and to, corresponds to the removable medium 86.

The editing terminal 41 is basically identical in structure to the planning terminal 11, and each element of the editing terminal 41 performs a process identical to the process of the counterpart element of the planning terminal 11.

The storage unit 213 stores an edit list generating unit 221, an effect editing program 222, a complete packet producing program 223, a data acquisition and supply program 224, a material referencing program 225, and a composition table referencing program 226. These programs are loaded to the RAM 203, and then executed by the CPU 201. The CPU 201 generates an edit list as a result of an edit process to the material data by executing the edit list generating unit 221. The CPU 201 adds effects to the edit list by executing the effect editing program 222. The CPU 201 generates the complete packet by executing the complete packet producing program 223. The CPU 201 acquires data from and supplies data to another terminal by executing the data acquisition and supply program 224.

The CPU 201 references, from the complete packet, the material data and the composition table corresponding to the complete packet by executing the material referencing program 225 and the composition table referencing program 226.

Figure 6:
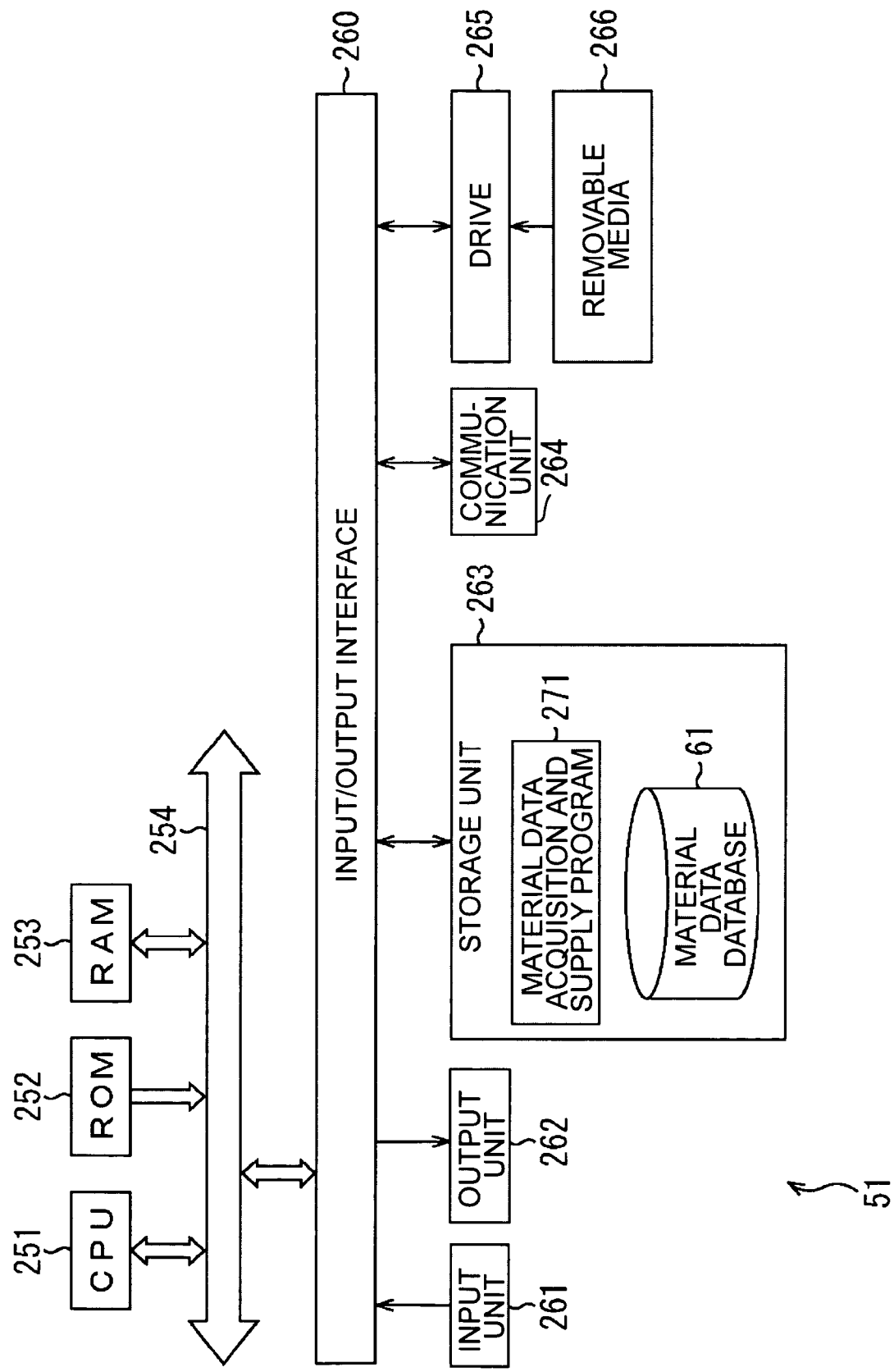
FIG. 6 is a block diagram of a material data server of FIG. 1.

FIG. 6 illustrates the structure of the material data server 51 in detail.

As the planning terminal 11 of FIG. 2, the material data server 51 also includes a CPU 251, a ROM 252, and a RAM 253. The CPU 251, the ROM 252, and the RAM 253 are mutually connected to each other via a bus 254. The CPU 251 corresponds to the CPU 71, the ROM 252 corresponds to the ROM 72, the RAM 253 corresponds to the RAM 73, and the bus 254 corresponds to the bus 74.

As in the planning terminal 11 of FIG. 2, an input/output interface 260 is connected to the bus 254 of the material data server 51. Each of an input unit 261, an output unit 262, a storage unit 263, a communication unit 264, and a drive 265 is connected to the input/output interface 260. The input/output interface 260 corresponds to the input/output interface 80, the input unit 261 corresponds to the input unit 81, the output unit 262 corresponds to the output unit 82, the storage unit 263 corresponds to the storage unit 83, the communication unit 264 corresponds to the communication unit 84, and the drive 265 corresponds to the drive 85. The removable medium 266, which the drive 265 reads and writes data and programs from and to, corresponds to the removable medium 86.

The material data server 51 is substantially identical in structure to the planning terminal 11, and each element of the material data server 51 performs a process identical to the process of the counterpart element in the planning terminal 11.

The storage unit 263 stores a material data acquisition and supply program 271. The storage unit 263 includes a material data database 61. The material data acquisition and supply program 271 is loaded to the RAM 253 and then executed by the CPU 251. As will be discussed later, the CPU 251 registers the material data, supplied from a terminal, onto the material data database 61, and supplies the material data, registered in the material data database 61, to a terminal by executing the material data acquisition and supply program 271.

Figure 7:
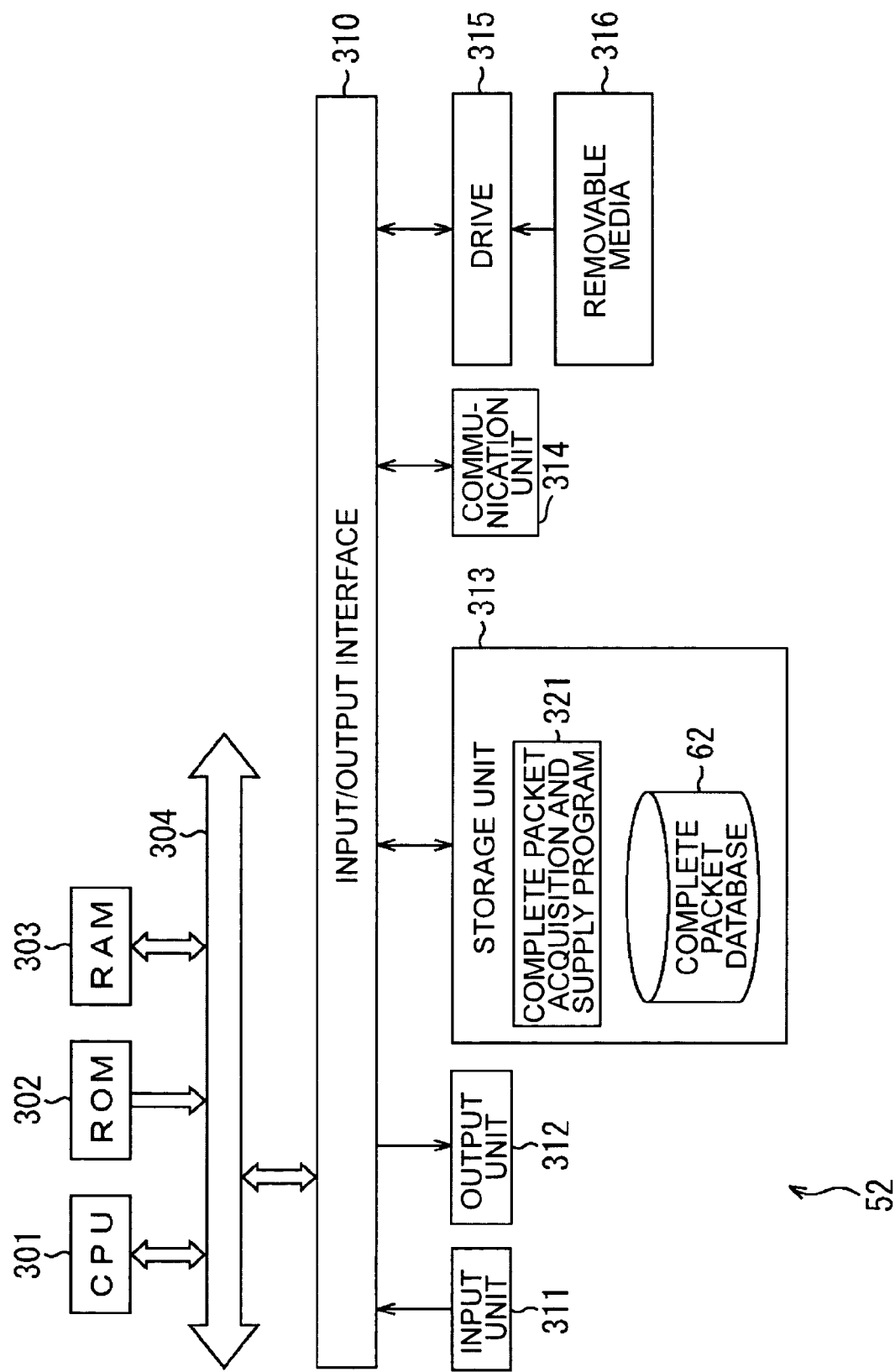
FIG. 7 is a block diagram of a complete packet server of FIG. 1.

FIG. 7 illustrates the structure of the complete packet server 52 in detail.

As the planning terminal 11 of FIG. 2, the complete packet server 52 also includes a CPU 301, a ROM 302, and a RAM 303. The CPU 301, the ROM 302, and the RAM 303 are mutually connected to each other via a bus 304. The CPU 301 corresponds to the CPU 71, the ROM 302 corresponds to the ROM 72, the RAM 303 corresponds to the RAM 73, and the bus 304 corresponds to the bus 74.

As in the planning terminal 11 of FIG. 2, an input/output unit 310 is connected to the bus 304 of the complete packet server 52. Each of an input unit 311, an output unit 312, a storage unit 313, a communication unit 314, and a drive 315 is connected to the input/output unit 310. The input/output unit 310 corresponds to the input/output interface 80, the input unit 311 corresponds to the input unit 81, the output unit 312 corresponds to the output unit 82, the storage unit 313 corresponds to the storage unit 83, the communication unit 314 corresponds to the communication unit 84, and the drive 315 corresponds to the drive 85. The removable medium 316, which the drive 315 reads and writes data and programs from and to, corresponds to the removable medium 86.

The complete packet server 52 is substantially identical in structure to the planning terminal 11, and each element of the complete packet server 52 performs a process identical to the process of the counterpart element in the planning terminal 11.

The storage unit 313 stores the complete packet acquisition and supply program 321. The storage unit 313 includes a complete packet database 62. The complete packet acquisition and supply program 321 is loaded to the RAM 303, and then executed by the CPU 301. By executing the complete packet acquisition and supply program 321, the CPU 301 registers a complete packet, supplied from a terminal, onto the complete packet database 62, and supplies a complete packet, registered in the complete packet database 62, to a terminal.

Figure 8:
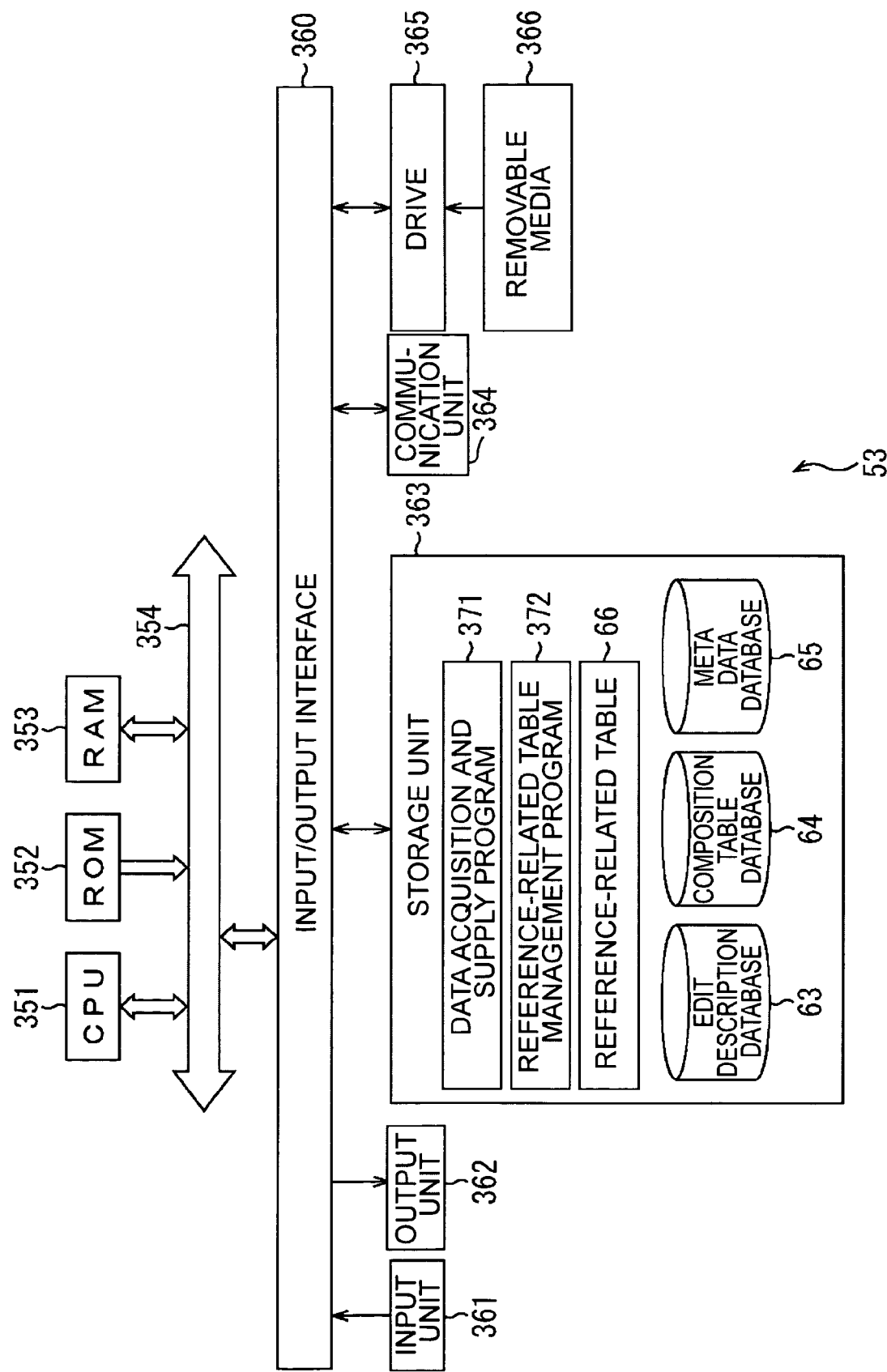
FIG. 8 is a block diagram of a metadata server of FIG. 1.

FIG. 8 illustrates the structure of the metadata server 53 of FIG. 1 in detail.

As the planning terminal 11 of FIG. 2, the metadata server 53 also includes a CPU 351, a ROM 352, and a RAM 353. The CPU 351, the ROM 352, and the RAM 353 are mutually connected to each other via a bus 354. The CPU 351 corresponds to the CPU 71, the ROM 352 corresponds to the ROM 72, the RAM 353 corresponds to the RAM 73, and the bus 354 corresponds to the bus 74.

As in the planning terminal 11 of FIG. 2, an input/output unit 360 is connected to the bus 354 of the metadata server 53. Each of an input unit 361, an output unit 362, a storage unit 363, a communication unit 364, and a drive 365 is connected to the input/output unit 360. The input/output unit 360 corresponds to the input/output interface 80, the input unit 311 corresponds to the input unit 81, the output unit 312 corresponds to the output unit 82, the storage unit 313 corresponds to the storage unit 83, the communication unit 314 corresponds to the communication unit 84, and the drive 315 corresponds to the drive 85. The removable medium 316, which the drive 315 reads and writes data and programs from and to, corresponds to the removable medium 86.

The metadata server 53 is substantially identical in structure to the planning terminal 11, and each element of the metadata server 53 performs a process identical to the process of the counterpart element in the planning terminal 11.

The storage unit 363 stores a data acquisition and supply program 371, a reference-related table management program 372, and a reference-related table 66. The storage unit 363 includes an edit description database 63, a composition table database 64, and a metadata database 65. The data acquisition and supply program 371 and the reference-related table management program 372 are loaded to the RAM 353, and then executed by the CPU 351. As will be discussed later, the CPU 351 acquires data from a terminal, and supplies data to a terminal by executing the data acquisition and supply program 371. By executing the reference-related table management program 372, the CPU 351 manages information in the reference-related table 66, updates the reference-related table 66, searches the reference-related table 66 for a UMID, requested by a terminal, and then supplies the UMID to the requesting terminal.

An entire process of a program production is described below with reference to a flowchart of FIG. 9. A work flow of the program production is shown on the left-most column of FIG. 9, names of groups performing assigned jobs are listed on a second column to the right hand of the left-most column, job contents of UMIDs (own UMIDs) of data produced in the jobs are listed on a third column to the right hand of the second column, and job contents of UMIDs (reference UMIDs) of data to which the data produced in the jobs are referenced (linked) are listed in the right-most column.

In step S1, as a first step in the program production, the planning terminal 11 of the planning group 10 produces a composition table serving as a plan of the program production in response to inputs from a user. The planning terminal 11 generates a UMID of the composition table as own UMID and describes the UMID in the composition table. In step S2, the image pickup device 31 of the material gathering group 30 gathers materials and generates material data (including video data and audio data). The image pickup device 31 (or the field PC 32) generates a UMID of the material data as own UMID, and adds the UMID to the material data.

In step S3, the field PC 32 links the composition table to the material data obtained by the image pickup device 31 when the material data is generated. Then, the field PC 32 (or the image pickup device 31) describes the UMID of the material data in the composition table.

When the composition table is linked to the material data, the editing terminal 41 pre-edits the data obtained by the image pickup device 31 in step S4, thereby determining an IN point and an OUT point, for example. The pre-edit results are described in the composition table. When the material data is prepared, the editing terminal 41 of the editing group 40 edits the material data in accordance with the composition table in step S5, thus generating an edit list from the composition table. The editing terminal 41 generates a UMID of the generated edit list, and describes the UMID in an edit description of the edit list while describing the UMID of the composition table in the generated edit list.

In step S6, the editing terminal 41 performs an edit process to add effects, for example, including superimposition, an addition of sound effects and background music (BGM), thus generating an effect-added edit list. The editing terminal 41 generates a UMID of the effect-added edit list, and describes the UMID of the original edit list in the effect-added edit list. The editing terminal 41, which has generated the effect-added edit list, generates a complete packet from the effect-added edit list in step S7. The editing terminal 41 also generates a UMID of the generated complete packet and adds the UMID to the generated complete packet.

Each terminal performs the job thereof in this way to generate data. As necessary, each terminal generates information for mutually linking data, for example, generates a UMID of each data, adds that UMID to another data, adds a UMID of another data to data generated by own terminal. In the network system 1 in this way, each terminal easily references target data from one data.

A process flow of each device is described below.

The production of the composition table by the planning group 10 is described first. An operator (planner) in the planning group 10 creates the composition table in the first step of the program production using the planning terminal 11. When the production of the composition table is started using the planning terminal 11, the CPU 71 in the planning terminal 11 starts the production process of the composition table by executing the composition table producing and editing program 91.

Figure 10:
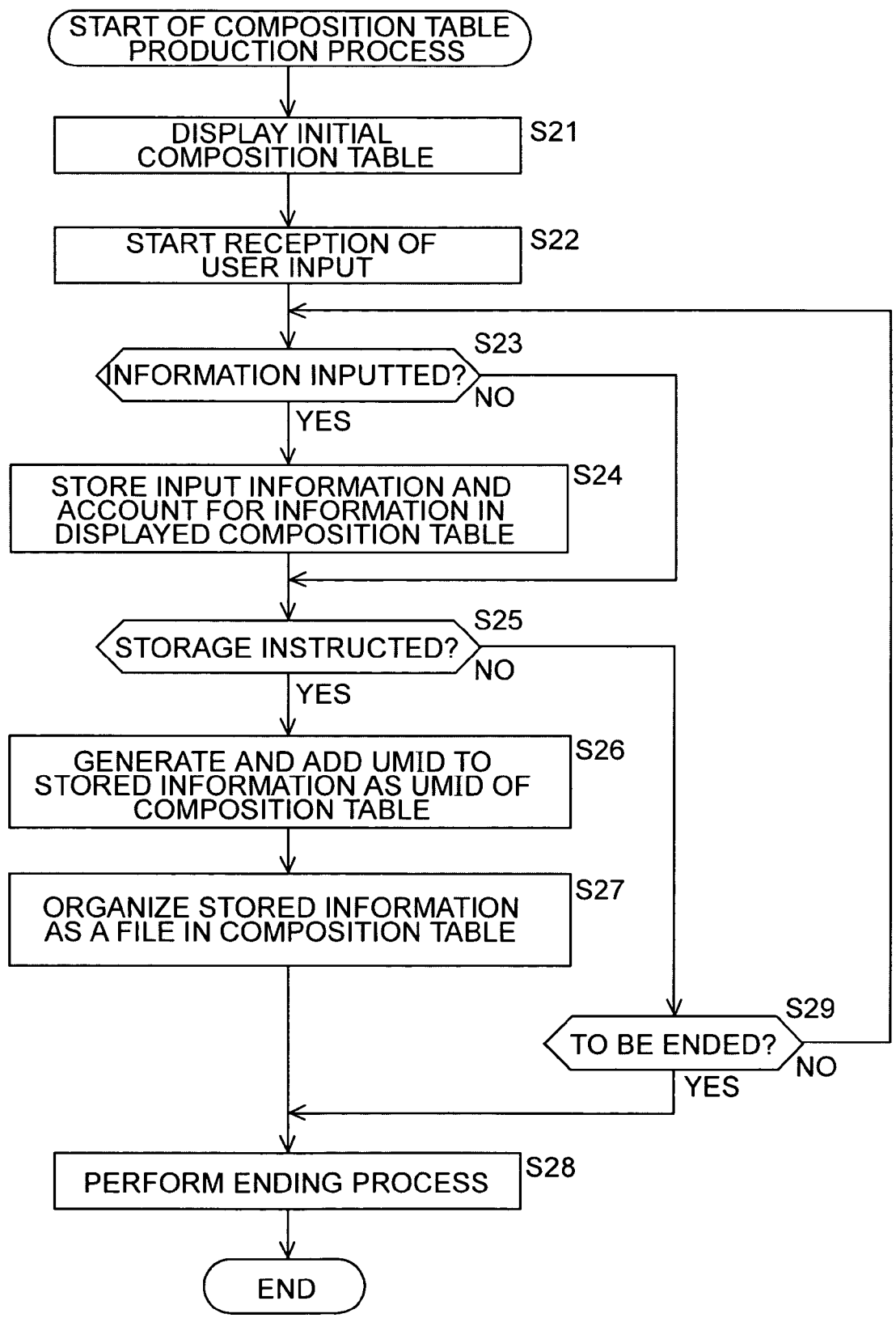
FIG. 10 is a flowchart illustrating a creation process of a composition table.

The composition table production process is described with reference to a flowchart of FIG. 10.

When the composition table production process starts, the CPU 71 for performing the composition table producing and editing program 91 supplies predetermined video data to a monitor of the output unit 82 in step S21. Upon receiving the video data, the monitor of the output unit 82 displays an initial composition table corresponding to the video data.

Upon completing step S21, the CPU 71 proceeds to step S22. The CPU 71 controls the input unit 81 to receive inputs from the user. In step S23, the CPU 71 determines whether information has been received from the input unit 81. If the CPU 71 determines that information has been received from the input unit 81 in response to the user input, the CPU 71 proceeds to step S24. The CPU 71 causes the RAM 73 to store the input information, and controls the output unit 82 to account for the input information in the composition table displayed on the monitor. More specifically, the CPU 71 stores the information inputted via the input unit 81 in the RAM 73, generates the video data that accounts for the input information, and then supplies the resulting video data to the monitor of the output unit 82. The monitor then displays the composition table that accounts for the input information.

Upon completing the process in step S24, the CPU 71 proceeds to step S25. If it is determined in step S23 that no information has been received from the input unit 81, the CPU 71 proceeds to step S25 without performing a process in step S25.

In step S25, the CPU 71 controls the input unit 81, thereby determining whether the user has issued a storage instruction. If it is determined that the user has issued a storage instruction, the CPU 71 proceeds to step S26. The 71 generates a UMID of the composition table and adds the UMID to information stored in the RAM 73. The CPU 71 proceeds to step S27 to organize the information stored in the RAM 73 into a file, and to store the file in the storage unit 83. After performing an ending process in step S28, the CPU 71 ends the composition table production process.

If it is determined in step S25 that the user has not issued the storage instruction, the CPU 71 proceeds to step S29 to determine whether to end the composition table production process. For example, if it is determined that the user has issued no instructions via the input unit 81 and that the composition table production process is incomplete, the CPU 71 returns to step S23 to repeat step S23 and subsequent steps. If it is determined in step S29 that the composition table production process ends in the middle thereof in response to a forced end instruction inputted by the user, the CPU 71 performs an ending process in step S28 to end the composition table production process.

The CPU 71 causes the monitor to display the initial composition table to start receiving the user input, repeat processes in step S23 through S25, and S29, and waits on standby until the user completes the composition table. When the user completes the composition table production process and instructs the CPU 71 to store an updated composition table, the CPU 71 performs processes in steps S26 through S28 to store the produced composition table, and then ends the composition table production process. When the user forces the CPU 71 to end the composition table production process in the middle thereof, the CPU 71 performs an ending process in step S28 to end the composition table production process.

FIGS. 11A-11C and 12 illustrate the composition table produced in the composition table production process. A composition table 381 of FIG. 11A lists information, such as a scenario of a program to be produced and a variety of instructions, required for the production of the composition table. The information includes a "program", an "episode", a "scene", a "cut", etc. arranged in a layered structure according to a level segment. In the layered structure, a plurality of components are divided into a plurality of levels. Lower level components are linked to a component one rank higher than the lower level components. A plurality of lower level components are thus grouped under a one rank higher component. Generally, as the level gets lower, the number of components increases. The "program", the "episode", the "scene", the "cut", etc. represents levels in the layered structure. The segment refers to the "component" rather than the "level". For example, the level (layer) of the "cut" includes a plurality of segments (for example, cut numbers 1, 2, 3, . . . ).

A "take" is arranged under the "cut" layer. As will be discussed later, the "take" is not a component contained in the concept of the composition table (scenario), and arranged at the level of the "cut".

The "program" refers to the level of the entire program, and represents a broad concept common to the whole program. In other words, the "program" level contains one segment. The "episode" is a level one rank lower than the "program", and the segments under the "episode" represents smaller components of the entire program. The "scene" is a level one rank lower than the "episode". The "scene" is typically composed of video data at the same location or at the same material gathering time. The "cut" refers to a portion of video data or audio data, free from scene switching caused by an edit process or an interruption of video taking. The "take" refers to a level representing the video data actually obtained in accordance with the "cut" in the composition table, and is video data lasting from the start to the end of the video taking.

The segments are arranged in a layered structure in the program. A segment of the "scene" is composed of at least one segment of the "cut", a segment of the "episode" is composed of at least one segment of the "scene", and a segment of the "program" is composed of at least one segment of the "episode". One of the "takes" adopted as the "cut" is referred to as an "OK take". Although the segments of the "take" belong to a level lower than the "cut" in the layered structure, the segments of the "take" are contained in the "cut" segments in the composition table.

A title of the program and an ID (identification) of the program are assigned to the "program" segments. The "program" segments also contain the UMID of the composition table 381 ("PPPPPPPP" in FIG. 11). The segments under the "episode" are composed of instructions relating to the production in each segment and notes describing particular remarks.

The UMID is 32 byte (or 64 byte) information, in practice, but is represented here by an 8-character string for simplicity. Hereinafter, the same is true of other UMIDs.

As will be discussed later, a video file 383 and metadata 382 are generated for the composition table in the course of material gathering. As shown in FIG. 12, the metadata 382 contains general metadata, such as date and time information, position information, device setting information, and a particular remark. The metadata 382 further contain a UMID of the video file 383, and low-resolution file information containing a low-resolution version of the video file 383. The general metadata is linked to these files. The video file 383 is the material data composed of the video data and the audio data, captured through the material gathering operation, and is tagged with own UMID.

In the composition table production process, only the composition table 381 is produced, and both the metadata 382 and the video file 383 do not exist, and are not linked to the composition table 381.

By executing the composition table production process, the CPU 71 not only newly produces the composition table in response to an instruction from the user, but also attaches own UMID to the composition table. The network system 1 establishes a link among data, and searches for one data from another. An edit process and a check process are thus easily performed on the data, and the ease of handling data is increased.

When the composition table is generated, a user of the planning terminal 11 uploads the produced composition table to the metadata server 53 using the planning terminal 11 to register the composition table in the composition table database 64.

Figure 13:
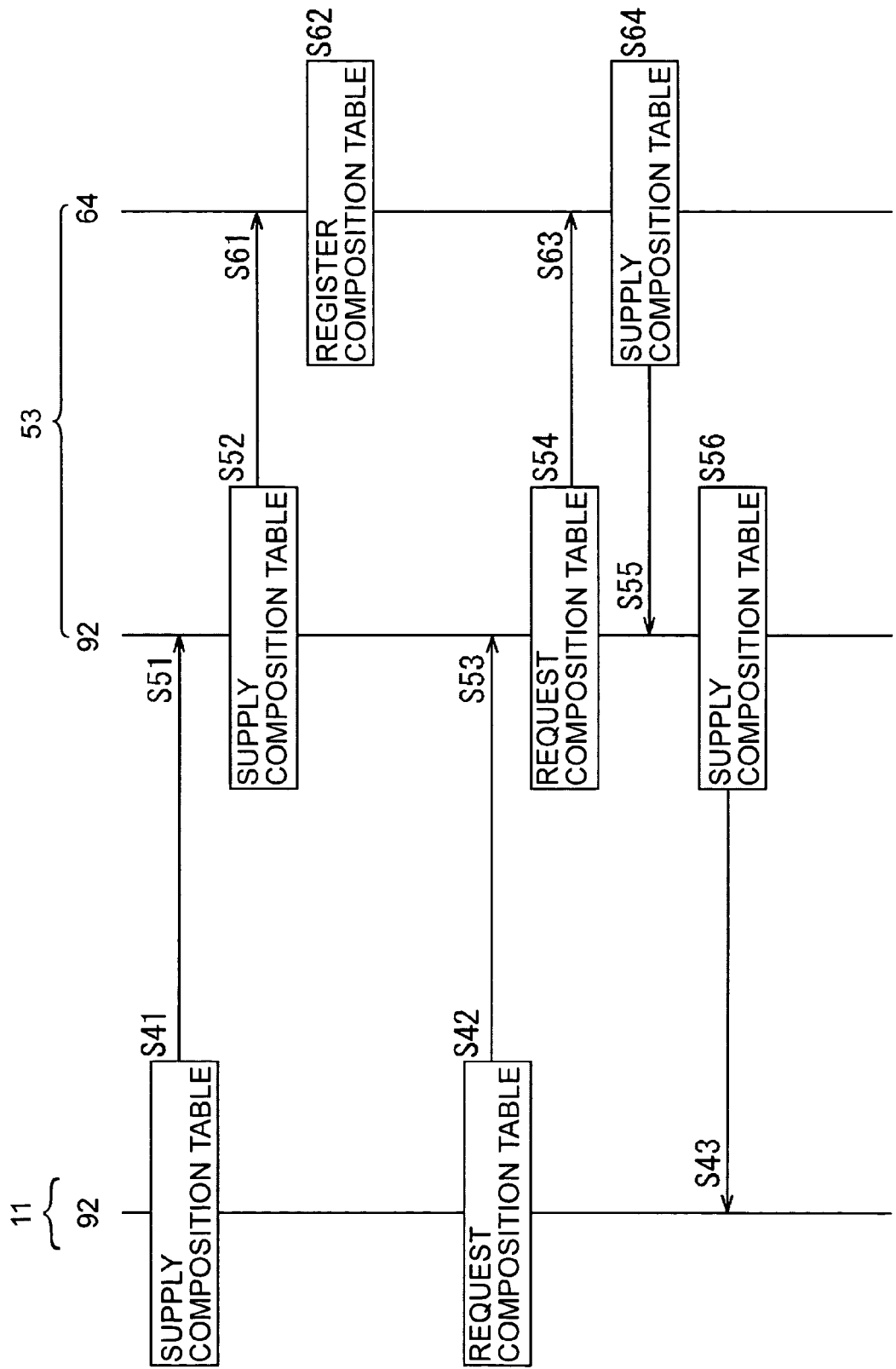
FIG. 13 is a flowchart illustrating a process flow of registering the composition table.

A process of registering the composition table is described below with reference to a flowchart of FIG. 13.

The CPU 71 for performing the data acquisition and supply program 92 of the planning terminal 11 in response to an instruction from the user controls the communication unit 84 in step S41 to supply the produced composition table to the metadata server 53 via the network 21.

The CPU 351 in the metadata server 53 for performing the data acquisition and supply program 371 controls the communication unit 364 in step S51 to acquire the supplied composition table. In step S52, the CPU 351 transfers the acquired composition table to the composition table database 64 in the storage unit 363. Upon acquiring the composition table in step S61, the composition table database 64 registers the composition table in step S62.

To acquire the registered composition table, the CPU 71 in the planning terminal 11 executes the data acquisition and supply program 92. In step S42, the CPU 71 controls the communication unit 84 to request the metadata server 53 to send the composition table. This requesting is performed using the UMID. The CPU 351 in the metadata server 53 for executing the data acquisition and supply program 371 controls the communication unit 364, thereby receiving the request in step S53. In step S54, the CPU 351 requests the composition table database 64 to supply the requested composition table. Upon receiving the request in step S63, the composition table database 64 searches for the requested composition table using the UMID in step S64, and supplies the CPU 351 with the requested composition table. When the CPU 351 for performing the data acquisition and supply program 371 acquires the composition table in step S55, the CPU 351 controls the communication unit 364 to supply the requesting planning terminal 11 with the acquired composition table via the network 21. In step S43, the CPU 71 for performing the data acquisition and supply program 92 controls the communication unit 84, thereby acquiring the composition table supplied from the metadata server 53.

The planning terminal 11 can request and acquire the composition table registered in the composition table database 64 as necessary. The same is true of the other terminals. By performing the above-referenced communication with the metadata server 53, any terminal can acquire the composition table registered in the composition table database 64 as necessary.

Generation of the material data is described below.

An operator in the material gathering group 30 performs a material gathering operation (for taking a video of an object and picking up sounds) using the image pickup device 31. Upon receiving a video taking (sound taking) instruction input by the operator, the image pickup device 31 starts the video taking process (step S2 of FIG. 9).

Figure 14:
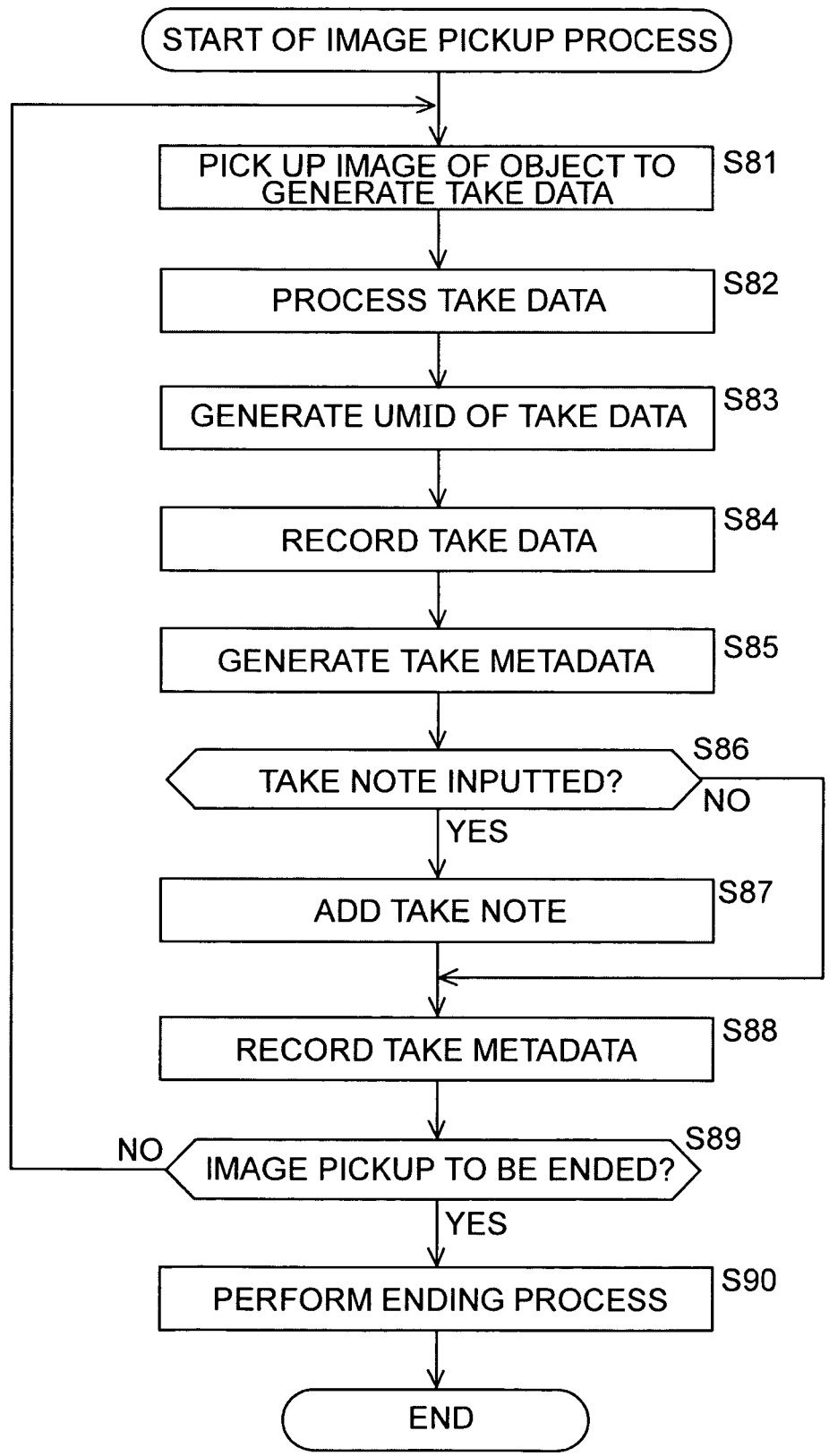
FIG. 14 is a flowchart illustrating an image pickup process.

The video taking process is described below with reference to a flowchart of FIG. 14.

The CPU 111 in the image pickup device 31 that has received the video taking instruction executes the captured image record control program 131 to control the image pickup unit 101 in step S81. Under the control of the CPU 111, the image pickup unit 101 captures the image of an object and outputs take data. The image pickup unit 101 supplies the signal processor 102 with the resulting take data.

In step S82, the CPU 111 for executing the captured image record control program 131 controls the signal processor 102, thereby processing the resulting take data. Under the control of the CPU 111, the signal processor 102 performs signal processing on the take data, and supplies the recorder 103 with the processed take data.

In step S83, the CPU 111 executes the captured image record control program 131 to generate a UMID of the take data, and supplies the UMID to the recorder 103. In step S84, the recorder 103 adds the UMID to the take data and records the resulting data onto a recording medium or the like under the control of the CPU 111.

In step S85, the CPU 111 further generates metadata (take metadata) corresponding to the generated take data by executing the metadata generating program 132 and stores the take metadata in the RAM 113 or the like. The CPU 111 adds a UMID of the take data corresponding to the take metadata to the take metadata. In accordance with the metadata generating program 132, the CPU 111 controls the input unit 121 to receive an input from the operator and determines in step S86 whether take note, as information such as the particular remark relating to the take data inputted from the operator, has been inputted. If it is determined that a take note has been inputted, the CPU 111 adds the input take note to the take data stored in the RAM 113 or the like in step S87, and proceeds to step S88.

If it is determined in step S86 that a take note has not been inputted, the CPU 111 proceeds to step S88 without performing a process in step S87.

In step S88, the CPU 111 for performing the metadata generating program 132 supplies the recorder 103 with the take data stored in the RAM 113 or the like via the bus 114, and controls the recorder 103 to record the take data on a recording medium or the like.

In accordance with the captured image record control program 131, the CPU 111 proceeds to step S89 to determine whether to end the video taking. If the CPU 111 determines that the video taking is not to be ended, the CPU 111 returns to step S81 to repeat step S81 and subsequent steps. If CPU 111 determines that the video taking is to be ended, the CPU 111 performs an ending process in step S90 to end the video taking process.

Through the video taking process, the video file (take data) 383 with the UMID attached thereto and the take metadata 382 with the UMID of the video file 383 attached thereto are generated as shown in FIG. 15. As shown in FIG. 15, six take data 383 respectively identified by UMIDs "AAAAAAAA" through "FFFFFFFF" and six take metadata 282 corresponding thereto are generated.

The image pickup device 31 generates the material data (take data) with own UMID attached thereto, thereby linking the video file 383 to the composition table 381 and other data. The network system 1 easily establishes a linking relationship among data so that one data is easily searched for from another data. The edit process and the check process are easily performed on data, and the ease of handling data is thus increased.

As the composition table is, the material data thus generated is supplied to the material data server 51 by the image pickup device 31 and then stored in the material data database 61. The process in such an operation is basically identical to that of the composition table discussed with reference to the flowchart of FIG. 13. For example, the CPU 111 in the image pickup device 31 executes the data acquisition and supply program 133, thereby controlling the communication unit 124. In response, the communication unit 124 supplies the material data stored in the recording medium in the recorder 103 to the material data server 51 via the network 21. In accordance with the material data acquisition and supply program 271, the CPU 251 in the material data server 51 controls the communication unit 264 to acquire the material data. The CPU 251 supplies the acquired material data to the material data database 61. The material data database 61 registers the supplied material data.

As the composition table is, the material data registered in the material data database 61 is acquired by each terminal as necessary. For example, to acquire the material data registered in the material data database 61, the CPU 111 in the image pickup device 31 executes the data acquisition and supply program 133, and controls the communication unit 124, thereby requesting the material data server 51 to send the material data. In this case, the CPU 111 requests the material data by supplying the UMID of the target material data to the material data database 61. Upon receiving the request, the CPU 251 in the material data server 51 for executing the material data acquisition and supply program 271 accesses the material data database 61 and supplies the UMID of the material data to request the material data. The material data database 61 searches for the material data responsive to the supplied UMID. If the corresponding material data is present, the material data database 61 supplies the material data to the requesting image pickup device 31 using the material data acquisition and supply program 271. The CPU 111 in the image pickup device 31 for performing the data acquisition and supply program 133 controls the communication unit 124, thereby acquiring the material data.

In this way, each terminal can acquire the material data registered in the material data database 61.

Likewise, the image pickup device 31 supplies the metadata to the metadata server 53 to be registered in the metadata database 65. Each terminal can acquire the metadata registered in the metadata database 65 as necessary. Such a process is identical to the process of the composition table already discussed with reference to the flowchart of FIG. 13 and the discussion thereof is omitted herein.

A process of linking (tying) the take data to the composition table is described below.

An operator in the material gathering group 30 performs the material gathering process and generates the material data in accordance with the composition table as previously discussed with reference to the flowchart of FIG. 13. For example, the operator performs the process of tying the material data (take data) to the composition table using the field PC 32 (step S3 of FIG. 9). In response, the field PC 32 executes the data tying process, thereby tying the take data to the designated composition table.

Figure 16:
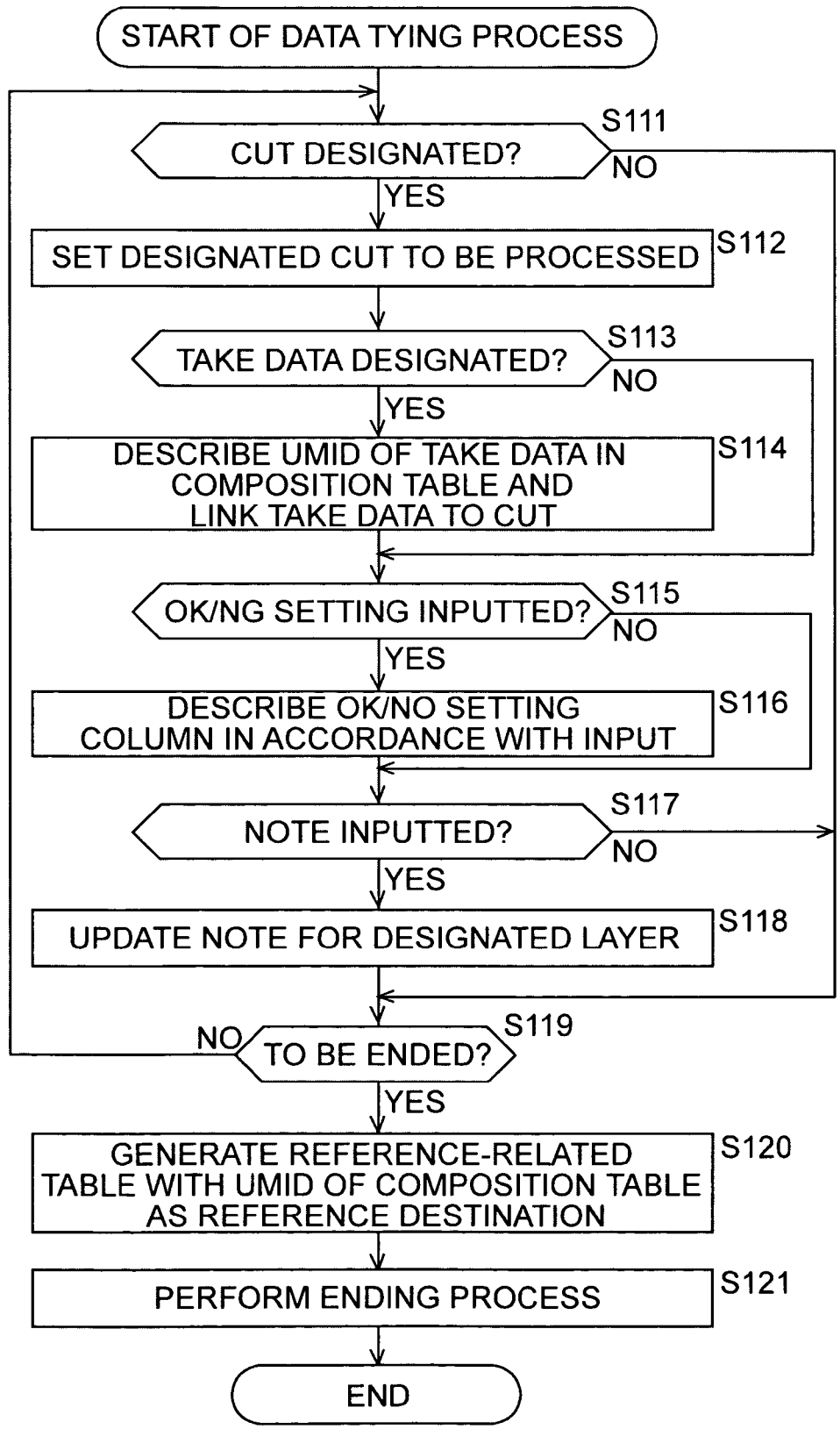
FIG. 16 is a flowchart illustrating a data tying process.

The take data tying process is described below with reference to a flowchart of FIG. 16.

In response to a take data tying instruction from the operator, the CPU 151 in the field PC 32 executes the composition table tying program 171. More specifically, the CPU 151 controls the input unit 161 to determine whether the operator has designated a cut of the composition table to be subjected to the tying process. The operator operates the input unit 161, thereby selecting a cut to be subjected to the tying process, from a "cut" column in the composition table 381 of FIG. 17A. If it is determined that the cut has been designated, the CPU 151 proceeds to step S112 to set the designated cut of the composition table to be processed.

Figure 17:
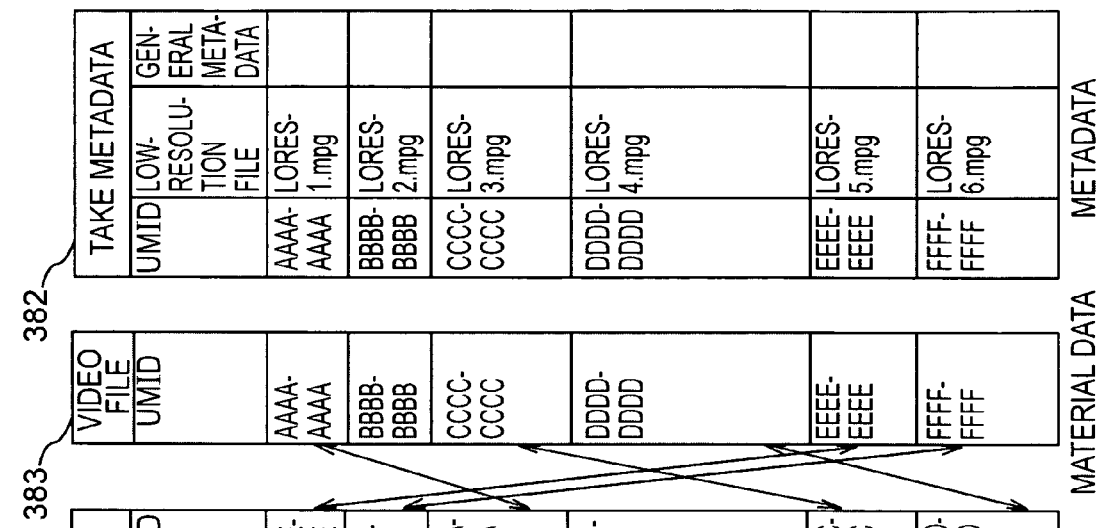
FIGS. 17A, 17B and 17C illustrate the data tying process.

In accordance with the composition table tying program 171, the CPU 151 proceeds to step S113 and controls the input unit 161 to determine whether data to be tied has been designated. If it is determined that the data to be tied has been designated, the CPU 151 proceeds to step S114. The CPU 151 describes the UMID of the take data in a column (UMID column) relating to a take belonging to the designated cut in the composition table to link the take data to the cut in the composition table. As shown in FIGS. 17A and 17C, the UMIDs "AAAAAAAA" through "FFFFFFFF" are described in the "UMID" column of the "take" in the composition table 381, and a linking process is performed as represented by arrow-headed lines. When the take data is linked, the CPU 151 proceeds to step S115. If it is determined in step S113 that no take data is designated, the CPU 151 proceeds to step S115 with a process in step S114 skipped.

In step S115, the CPU 151 controls the input unit 161 in accordance with the composition table tying program 171. More specifically, the CPU 151 determines whether the operator has inputted a setting OK/NG (no good) as to whether to adopt the take data (namely, a setting for identifying an OK take or an NG take). If it is determined that the OK/NG setting has been inputted, the CPU 151 proceeds to step S116. In response to the input, the CPU 151 describes the input setting in an OK/NG setting column arranged in the column of the take belonging to the tied cut. As shown in FIG. 17A, the take data linked to a take number "1" is set to be "OK", from among the two take data linked to a cut number "1" in the composition table 381 (take data having a take number "1" and take data having a take number "2"). Take data linked to a take number "2" is set to be "NG". After setting the OK/NG, the CPU 151 proceeds to step S117. If it is determined in step S115 that the OK/NG setting has not been inputted, the CPU 151 proceeds to step S117 with a process in step S116 skipped.

In step S117, the CPU 151 controls the input unit 161 in accordance with the composition table tying program 171. More specifically, the CPU 151 determines whether the operator has inputted a note relating to the tied take data. If it is determined that a note relating the tied take data has been inputted, the CPU 151 proceeds to step S118. In response to the input, the CPU 151 updates the note for a designated layer in the composition table. Upon updating the note, the CPU 151 proceeds to step S119. If it is determined in step S117 that no note has been inputted, the CPU 151 proceeds to step S119 with a process in step S118 skipped.

In step S119, the CPU 151 determines whether to end the data tying process. If the CPU 151 determines not to end the data typing process, the CPU 151 returns to step S111 to repeat step S111 and subsequent steps. If the CPU 151 determines in step S111 that the data tying process is to be ended, the CPU 151 proceeds to step S120. The CPU 151 generates a reference-related table having the UMID of the composition table as a reference destination, such as a reference-related table 391 of FIG. 18. The CPU 151 performs an ending process in step S121 to end the data tying process.

A UMID "PPPPPPPP" of the material data is described as a reference destination UMID and UMIDs "AAAAAAAA" through "FFFFFFFF" are described as a reference source UMID in the reference-related table 391 of FIG. 18. Te reference-related table 391 indicates a relationship between UMIDs to identify a reference destination UMID from a reference source UMID (or conversely, to identify a reference source UMID from a reference destination UMID).

In the data tying process, the field PC 32 describes the UMID of the video file 383 in the composition table 381. The field PC 32 can generate a reference-related table that permits reverse referencing in the UMID relationship. For example, the composition table 381 is searched from the video file 383. In this way, the network system 1 facilitates data linking to allow one data to be searched from another data. The edit process and the check process are easily preformed on data, and the ease of handling data is increased.

After producing the reference-related table 391, the field PC 32 uploads the generated reference-related table 391 to the metadata server 53 in response to an instruction from the operator.

Figure 19:
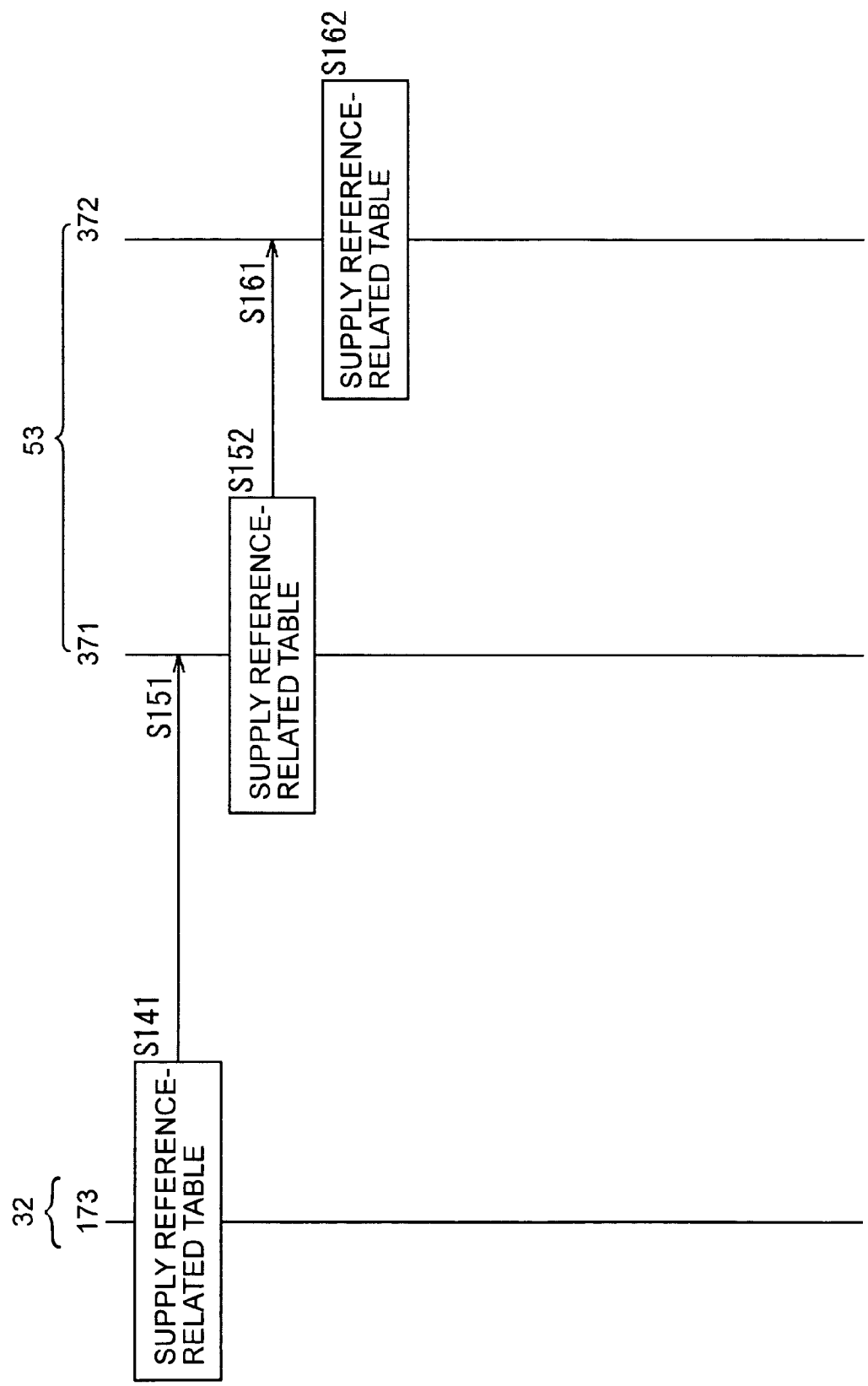
FIG. 19 is a flowchart illustrating an updating process of the reference-related table.

A process of uploading the reference-related table 391 is described with reference to a flowchart of FIG. 19.

The field PC 32 performs the data acquisition and supply program 173. More specifically, in step S141, the CPU 151 in the field PC 32 controls the communication unit 164 to supply the reference-related table 391 to the metadata server 53 via the network 21.

In accordance with the data acquisition and supply program 371, the CPU 351 in the metadata server 53 receives the reference-related table 391 in step S151. In step S152, the CPU 351 supplies the reference-related table 391 to the reference-related table management program 372. More specifically, the CPU 351 stores the acquired reference-related table 391 in the RAM 353 and processes the reference-related table 391 under the control of the reference-related table management program 372. The CPU 351 performs the reference-related table management program 372. Upon receiving the reference-related table 391 in step S161, the CPU 351 supplies the reference-related table 391 to the storage unit 363. The CPU 351 updates the reference-related table 66 stored in the storage unit 363 in accordance with the reference-related table 391.

The field PC 32 uploads the generated reference-related table 391 to the metadata server 53. The metadata server 53 updates the stored reference-related table 66 in accordance with the reference-related table 391. As will be discussed later, each terminal learns the reference relationship of the UMIDs, and can reference other data using data without the UMID of the other data attached thereto.

Figure 9:
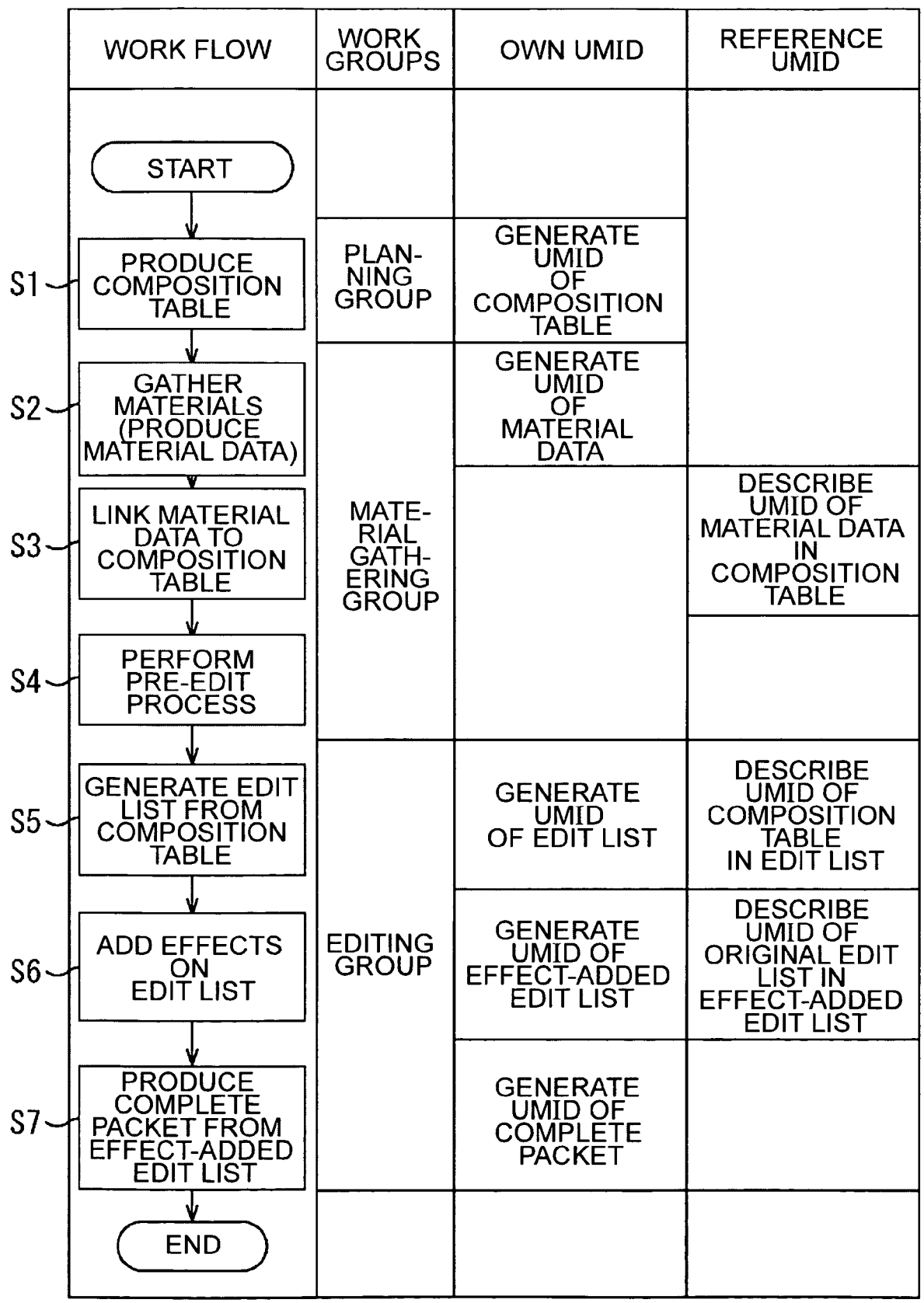
FIG. 9 is a flowchart illustrating a general process flow of a program production.

The field PC 32 performs a brief edit process (pre-edit process) on the tied material data (step S4 of FIG. 9). For example, the operator in the material gathering group 30 not only can designate the OK take in the composition table but also can designate a portion to be adopted as a take out of the material data adopted as the OK take.

The portion of the material data is designated by designating an IN point and an OUT point in the material data. The operator designates the portion of the material data to be adopted, by designating, as the IN point, a timecode of a first video frame and as the OUT point, a timecode of a last video frame. In other words, data between the IN point and the OUT point designated by the operator (namely, data subsequent to the IN point and prior the OUT point in the timecode) are set as being data to be adopted. The timecode of the IN point and the OUT point are described in the composition table.

Figure 20:
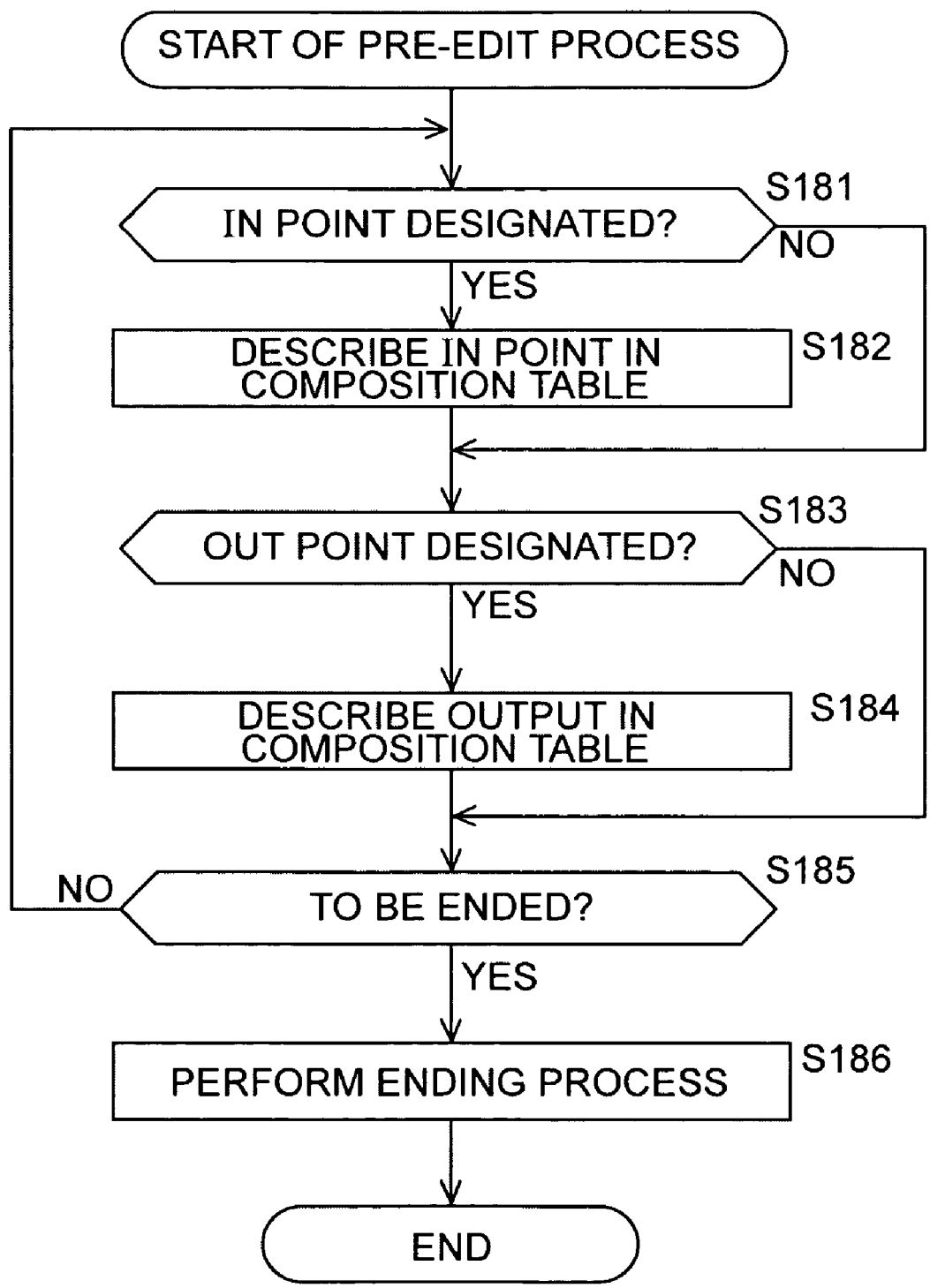
FIG. 20 is a flowchart illustrating a pre-edit process.

The pre-edit process of the field PC 32 is described below with reference to a flowchart of FIG. 20.

When the operator issues an instruction to start the pre-edit process, the CPU 151 in the field PC 32 executes the pre-editing program 172. More specifically, in step S181, the CPU 151 controls the input unit 161, thereby determining whether the operator has designated the IN point and the OUT point. If it is determined that the operator has designated the IN point and the OUT point, the CPU 151 proceeds to step S182 to describe the IN point in the composition table in accordance with the pre-editing program 172. As shown in FIGS. 21A-21C, a timecode is described in succession to a tag [In] in the "take data" column contained in the take column belonging to the cut in the composition table 381.

Upon completing step S182, the CPU 151 proceeds to step S183. If it is determined in step S181 that the IN point has not been designated, the CPU 151 proceeds to step S183 with a process in step S182 skipped.

In step S183, the CPU 151 for executing the pre-editing program 172 controls the input unit 161, thereby determining whether the operator has designated the OUT point. If it is determined that the operator has designated the OUT point by operating the input unit 161, the CPU 151 proceeds to step S184 to describe the OUT point in the composition table in accordance with the pre-editing program 172. As shown in FIGS. 21A-21C, a timecode of the OUT point is described in succession to a tag [Out] in the "take data" column in the take column belonging to the cut in the composition table 381.

Upon completing the process in step S184, the CPU 151 proceeds to step S185. If it is determined in step S183 that the OUT point has not been designated, the CPU 151 proceeds to step S185 without performing the process in step S184.

In step S185, the CPU 151 determines whether to end the pre-edit process. If it is determined that the pre-edit process is not to be ended, the CPU 151 returns to step S181 to repeat step S181 and subsequent steps. If it is determined in step S185 that the pre-edit process is to be ended in response to an end instruction from the operator, the CPU 151 performs an ending process in step S186 to end the pre-edit process.

A production of an edit list is described below.

When the material data and the metadata are produced based on the composition table and the composition table is tied, the operator in the editing group 40 performs an edit process on the material data, thereby producing an edit list as a result of the edit process (step S5 of FIG. 9).

The editing terminal 41 of the editing group 40, operated by the operator prior to the edit process, produces data required for the edit process, such as the composition table, the material data, and the metadata. In response to an edit list production instruction from the operator, the CPU 201 in the editing terminal 41 starts the edit list production process by executing the edit list generating program 221.

The edit list production process is described below with reference to a flowchart of FIG. 22.

In step S201, the CPU 201 in the editing terminal 41 for performing the edit list generating program 221 generates a UMID of an edit list to be generated. The CPU 201 generates an edit description based on the composition table in step S202, and describes the UMID of the composition table in the edit description. In accordance with the edit list generating program 221, the CPU 201 generates another data to be formed as an edit list in step S204, and stores the data and edit description as an edit list in the storage unit 213 or the like in step S205.

In step S206, the CPU 201 produces a reference-related table with the UMID of the edit list set as a reference destination in accordance with the edit list generating program 221.

Figure 22:
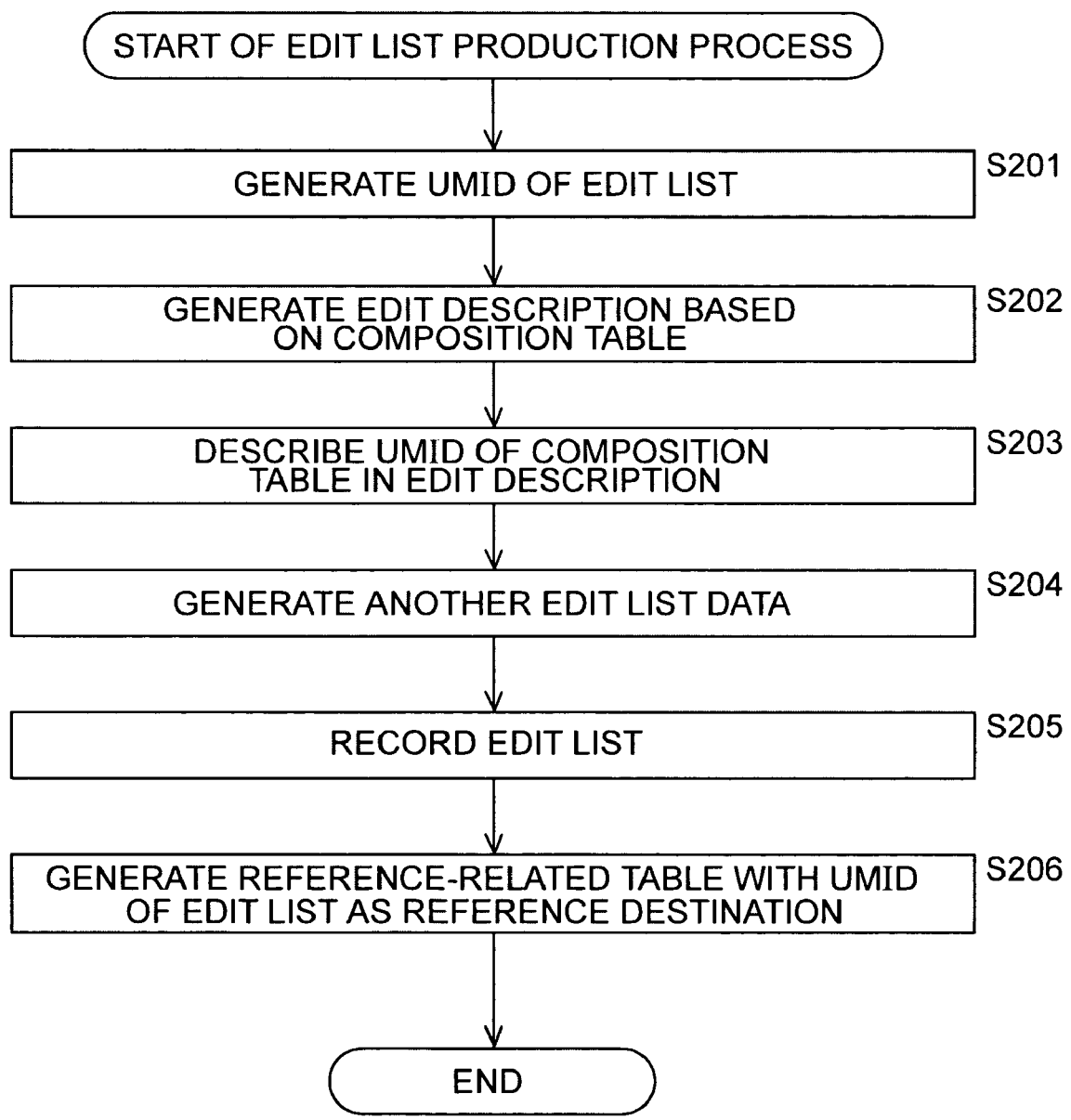
FIG. 22 is a flowchart illustrating an edit list production process.

FIG. 23 illustrates an example of the reference-related table produced in step S206 of FIG. 22.

As shown in FIG. 23, a reference-related table 393 lists a UMID "MMMMMMMM" of the edit list as a reference destination UMID, and UMIDs "AAAAAAAA" through "FFFFFFFF" of the material data and a UMID "PPPPPPPP" of the composition table as reference source UMIDs. The operator can reference the edit list from the material data and the composition table using the reference-related table 393.

The CPU 201 having produced the above-referenced reference-related table 393 ends the edit list production process.

FIG. 24 illustrates a description example 394 of the edit description produced in the edit list production process. As shown in FIG. 24, the description example 394 is described using the XML (extensible Markup Language). Line numbers are attached to a left-most column in the description example 394 for explanation. Lines 1 through 7 of the description example 394 is a header of the edit description, and have information relating to the setting of the entire edit process. For example, umid="MMMMMMMM" is described at line 3 to indicate that the UMID of the edit list is "MMMMMMMM". Line 7 has a description of "<SourcePlanningMeta umidRef="PPPPPPPP"/> to indicate that the UMID of the composition table corresponding to the edit list is "PPPPPPPP".

Line 8 through line 41 in the description example 394 are a body of an edit content, and contain an XML description of a edit content exactly described in the cut layer of the composition table. The body, described in accordance with the composition table as shown in FIG. 24, is on a per material data (clip) basis with the material data adopted as a take of each cut. Information of the material data includes the UMID of the material data. For example, in "Clip 1" information at line 10 through line 14, line 11 indicates that the UMID of the material data is "umid=EEEEEEEE".

The CPU 201 generates the reference-related table 393 of FIG. 23 based on the edit description.

The editing terminal 41 supplies the thus-constructed edit list to the metadata server 53 to register the edit description in the edit description database 63. Using the generated reference-related table 393, the editing terminal 41 updates the reference-related table 66. This process is performed in the same manner as the one previously discussed with reference to the flowchart of FIG. 13, and is not discussed again herein. The metadata server 53 supplies these pieces of data to each terminal. In this way, each terminal can reference other data using data without the UMID of the other data attached thereto.

By performing the edit list production process, the editing terminal 41 generates the edit list based on the composition table and the material data with the edit list linked to the composition table and the material data. The editing terminal 41 can also generate a reference-related table that allows reverse referencing in the UMID reference relationship. In the reverse referencing, the edit list is searched from the material data. In the network system 1, data linking is easily established to easily search for one data from another data. The edit process and the check process are easily performed on the data, and the ease of handling the data is increased.

The operator of the editing group 40 may perform a further edit process such as adding effects to the generated edit list (step S6 of FIG. 9). In such a case, the editing terminal 41 of the editing group 40, operated by the operator prior to the edit process, acquires beforehand the edit list for the edit process. When the operator issues an edit list production instruction, the CPU 201 in the editing terminal 41 starts the effect edit process by executing the effect editing program 222.

Figure 25:
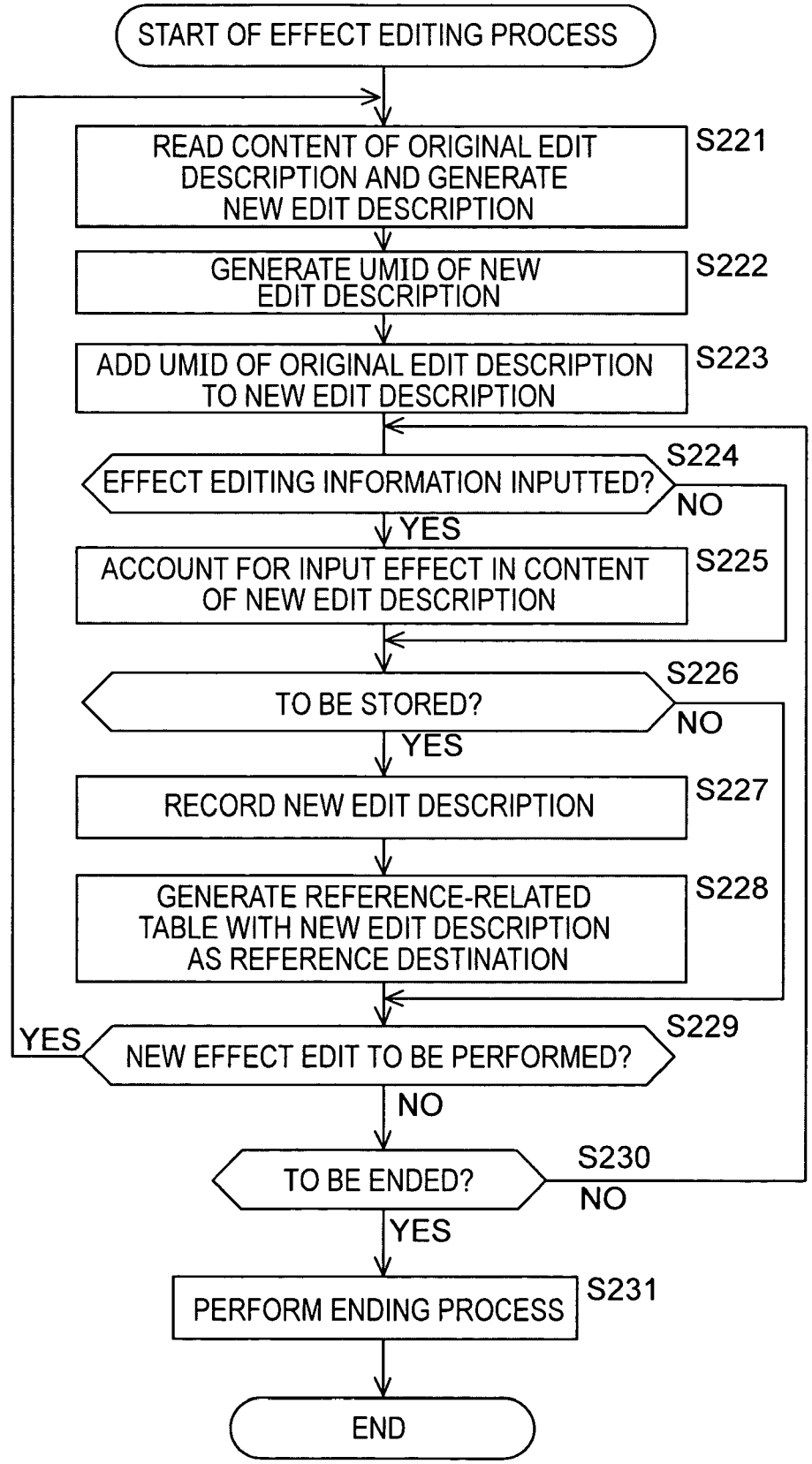
FIG. 25 is a flowchart illustrating an effect-edit process.

The effect edit process is described below with reference to a flowchart of FIG. 25.

The CPU 201 for performing the effect editing program 222 starts the effect edit process. In step S221, the CPU 201 reads the edit content of the original edit description in the edit list acquired beforehand, and generates a new edit description. The CPU 201 generates a UMID of the new edit description in step S222, and adds the UMID to the new edit description in step S223.

In step S224, the CPU 201 for performing the effect editing program 222 controls the input unit 211, thereby determining whether effect edit information has been inputted. If it is determined that the effect edit information has been inputted, the CPU 201 proceeds to step S225 to account for an input effect in the edit content of the edit description. The CPU 201 proceeds to step S226. If it is determined in step S224 that the effect edit information has not been inputted, the CPU 201 proceeds to step S226 without performing the process in step S225.

In step S226, the CPU 201 for performing the effect editing program 222 determines whether to store the newly generated edit description. If it is determined that the new edit description is to be stored, the CPU 201 proceeds to step S227 to store the newly produced edit description. In step S228, the CPU 201 generates a reference-related table 395 of FIG. 26 with the new edit description as a reference destination. As shown in FIG. 26, the reference-related table 395 lists, as reference source UMIDS, the UMID of the original edit description, and a group of UMIDs of the material data edited in the original edit description, and as a reference destination UMID, a UMID of the newly generated edit description. As previously discussed with reference to the flowchart of FIG. 19, the reference-related table 395 is uploaded to the metadata server 53 to update the reference-related table 66.

Returning to FIG. 25, if it is determined in step S226 that the newly generated edit description is not to be stored, the CPU 201 proceeds to step S229 without performing steps S227 and S228.

The CPU 201 determines in step S229 whether to newly perform an effect edit process. If it is determined that an effect edit process is to be newly performed, the CPU 201 returns to S221 to repeat step S221 and subsequent steps.

If it is determined in step S229 that the effect edit process is not to be newly performed, the CPU 201 proceeds to step S230 to determine whether to end the effect edit process. If it is determined that the effect edit process is not to be ended, the CPU 201 returns to step S224 to repeat step S224 and subsequent steps. If it is determined in step S230 that the effect edit process is to be ended, the CPU 201 proceeds to step S231, and performs an ending process to end the effect edit process.

FIG. 27 illustrates a new edit description 396 thus produced. As shown in FIG. 27, the edit description 396, described in the XML, shows the edit results of the edit process. Each line of the edit description 396 is tagged with a respective line number on the left-most column for reference. The content of the edit description 396 is substantially identical to the content of the description example 394 previously discussed with reference to FIG. 24. In the edit description 396, the UMID "LLLLLLLL" of the edit list is described as "umid="LLLLLLLL" at line 3. The difference of the edit description 396 from the description example 394 is that line 7 has no information about the composition table but bears information relating to the UMID of the original edit list as "<SourceEditlist umidRef="MMMMMMMM"/>. This UMID is the UMID of the edit list prior to the addition of effects.

Described at line 8 and subsequent lines is information of data to be edited, and information relating to the effects added to the data.

Figure 28:
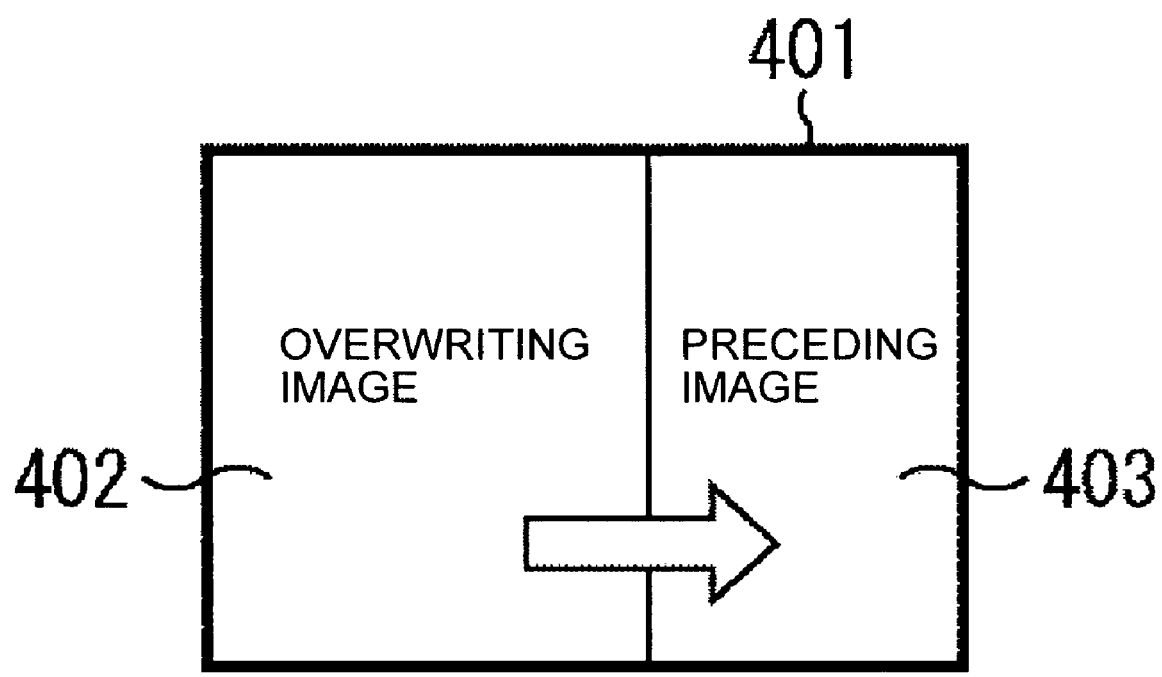
FIG. 28 illustrates the effect of a wipe process.

For example, "<transition id="wipe" dur="00:00:06:00" type="Wipe" subtype="leftToRight"/> is described at line 8. Line 8 means that the material data is coupled using an effect in which a screen is switched within 6 seconds with a new image wiping and replacing an old image from left to right on a display screen. More specifically, as shown in FIG. 28, a preceding image 403 of the original material data is first displayed on a display screen 401. An overwriting image 402 of next material data (take data of a next cut) starts appearing from the left side of the display screen 401, and gradually expands the area thereof toward the right, and finally overwrites the preceding image 403. The overwriting image 402 is thus shown on the entire display screen 401. Line 8 represents that such a wipe effect for switching the image is used at a junction of the material data.

Figure 29:
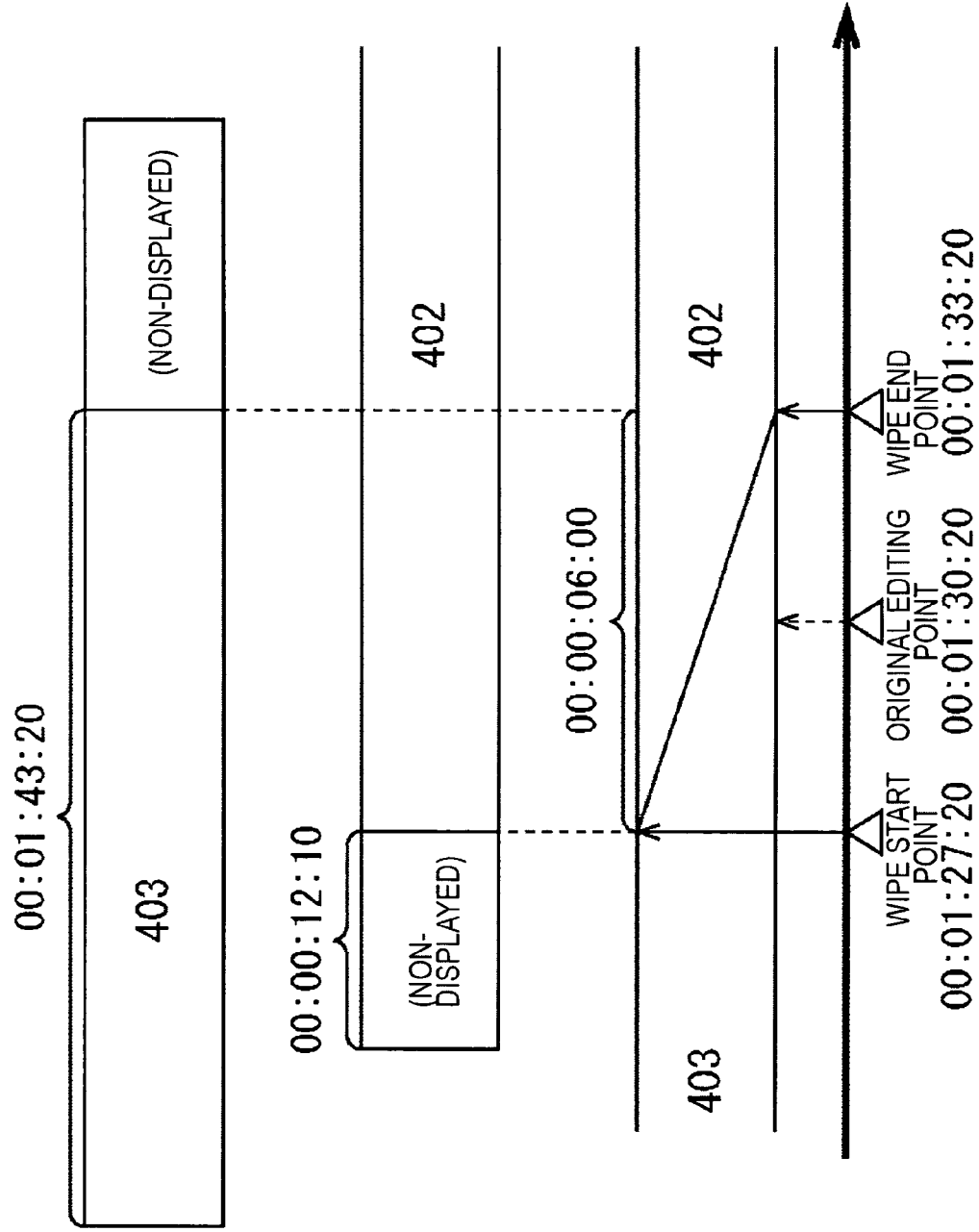
FIG. 29 illustrates the effect of a wipe process.

As shown in FIG. 29, for example, a wipe process is performed between a "Clip 1" described at lines 13 through 17 and a "Clip 2" described at lines 19 through 23.

As shown in FIG. 29, the preceding image 403 is an image of the "Clip 1" of the edit description 396 of FIG. 27 and the overwriting image 402 is an image of the "Clip 2" of the edit description 396 of FIG. 27. As shown in FIG. 27, a description of "clipEnd="smpte-30=00:01:43:20"" appears at line 16 of the edit description 396 of FIG. 27, and means that the displaying of the material data (having a UMID of "FFFFFFFF") of the "Clip 1" ends in a video frame at a timecode of "00: 01:43:20". A description "clipBegin="smpte-30=00:00:12: 10" appears at line 22 of the edit description 396 of FIG. 27, and means that the displaying of the material data (having a UMID of "AAAAAAAA") of the "Clip 2" starts in a video frame at a timecode of "00:00:12:10".

As described previously, within a wipe time of 6 seconds, the material data of the "Clip 1" and the material data of the "Clip 2" are connected so that the video frame of the material data (having the UMID of "AAAAAAAA") of the "Clip 2" at the timecode "00:00:12:10" as the overwriting image 402 is displayed 6 seconds earlier than the video frame of the material data (having the UMID of "EEEEEEEE") of the "Clip 1" at the timecode "00:01:43:20". More specifically, the wipe process starts at a timecode "00:01:27:20" (because the material data of the "Clip 1" remains undisplayed for the first 10 seconds from the start because of the edit description 396) and ends at a timecode "00:01:33:20" (the display screen is completely switched to the image of the material data of the "Clip 2") in the timecodes of the entire edit description (the timecodes in the edit results).

The edit list with the effect attached thereto is thus generated. The effects added to the edit list can be any of a picture in picture effect, a flash effect, a fade-out, a fade-in, a pan, a zooming effect, visual effects such as telop insertions, and audio effects such as insertions of background music (BGM) and narration.

As the composition table and the edit list are, the edit list with the effects added thereto is uploaded from the editing terminal 41 to the metadata server 53 via the network 21 to be registered in the edit description database 63. The edit description registered in the edit description database 63 is acquired and utilized by each terminal as the composition table and the edit list are acquired and utilized.

When an edit list is generated from another edit list, a UMID of the new edit list is added to the edit list of the new edit list. Also added to the new edit list are the UMID of the original edit list and the UMID of the material data corresponding to the original edit list. Information for referencing the new edit list (namely, information for reverse referencing the UMID) from the original edit list or the original material data is managed as the reference-related table 66 in the metadata server 53.

Each terminal uses the UMIDs of a variety of data corresponding to the edit list described in the edit description of the edit list to acquire the variety of data corresponding to the edit list. Using the reference-related table 66, each terminal searches and acquires the edit list in accordance with the UMIDs of the variety of data corresponding to the edit list.

The network system 1 easily establishes a linking relationship among data so that one data is easily searched for from another data. The edit process and the check process are easily performed on data, and the ease of handling data is increased.

A process of producing a new one edit list from another edit list can be repeated limitless times. An operator can produce a plurality of edit lists from a single edit list.

The edit process is thus performed on the material data, and the edit list is produced from the material data. When the edit process ends, the operator in the editing group 40 operates the editing terminal 41, and generates the complete packet as final content data using the edit description corresponding to the final edit results (step S7 of FIG. 9). In response to a complete packet production instruction, the editing terminal 41 acquires the edit description and the material data for use in the generation of the complete packet, and produces the complete packet by starting the complete packet producing program 223.

The complete packet production process is described below with reference to a flowchart of FIG. 30.

Figure 30:
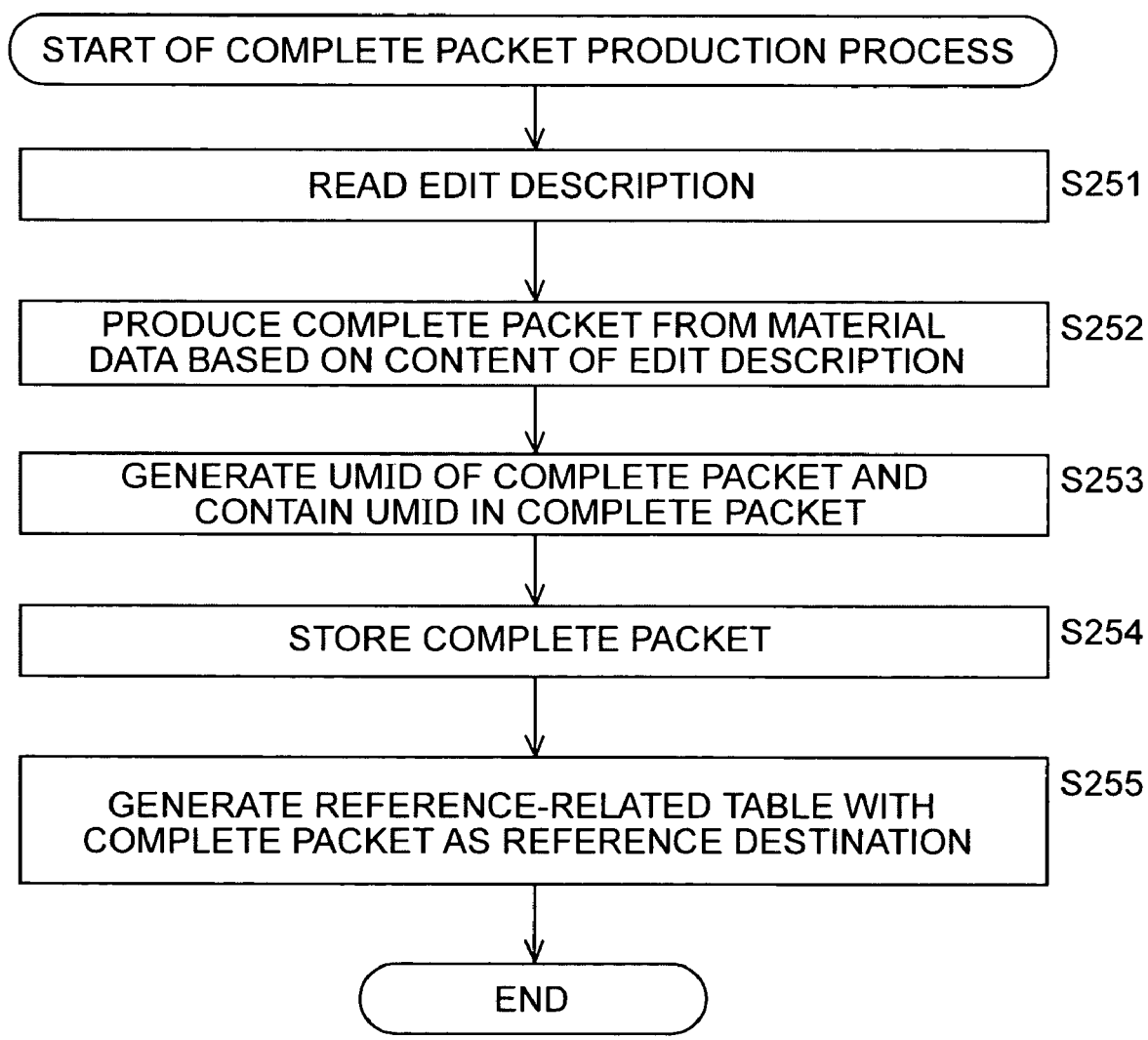
FIG. 30 is a flowchart illustrating a complete packet generation process.

As shown in FIG. 30, the CPU 201 that has started the complete packet production process reads the edit description in step S251. In step S252, the CPU 201 produces the complete packet from the material data based on the edit content of the edit description. In step S253, the CPU 201 generates a UMID of the generated complete packet and adds the UMID to the generated complete packet. In step S253, the CPU 201 supplies the storage unit 213 with the complete packet with the UMID added thereto for storage.

In step S255, the CPU 201 for executing the complete packet producing program 223 produces a reference-related table 411 of FIG. 31 with the generated complete packet as a reference destination. As shown in FIG. 31, a UMID "ZZZZZZZZ" of the complete packet is described as a reference destination UMID and a UMID "LLLLLLLL" of the edit description is described as a reference source UMID in the reference-related table 411 of FIG. 31.

Returning to FIG. 30, the CPU 201 having completed the process in step S255 ends the complete packet production program.

Figure 32:
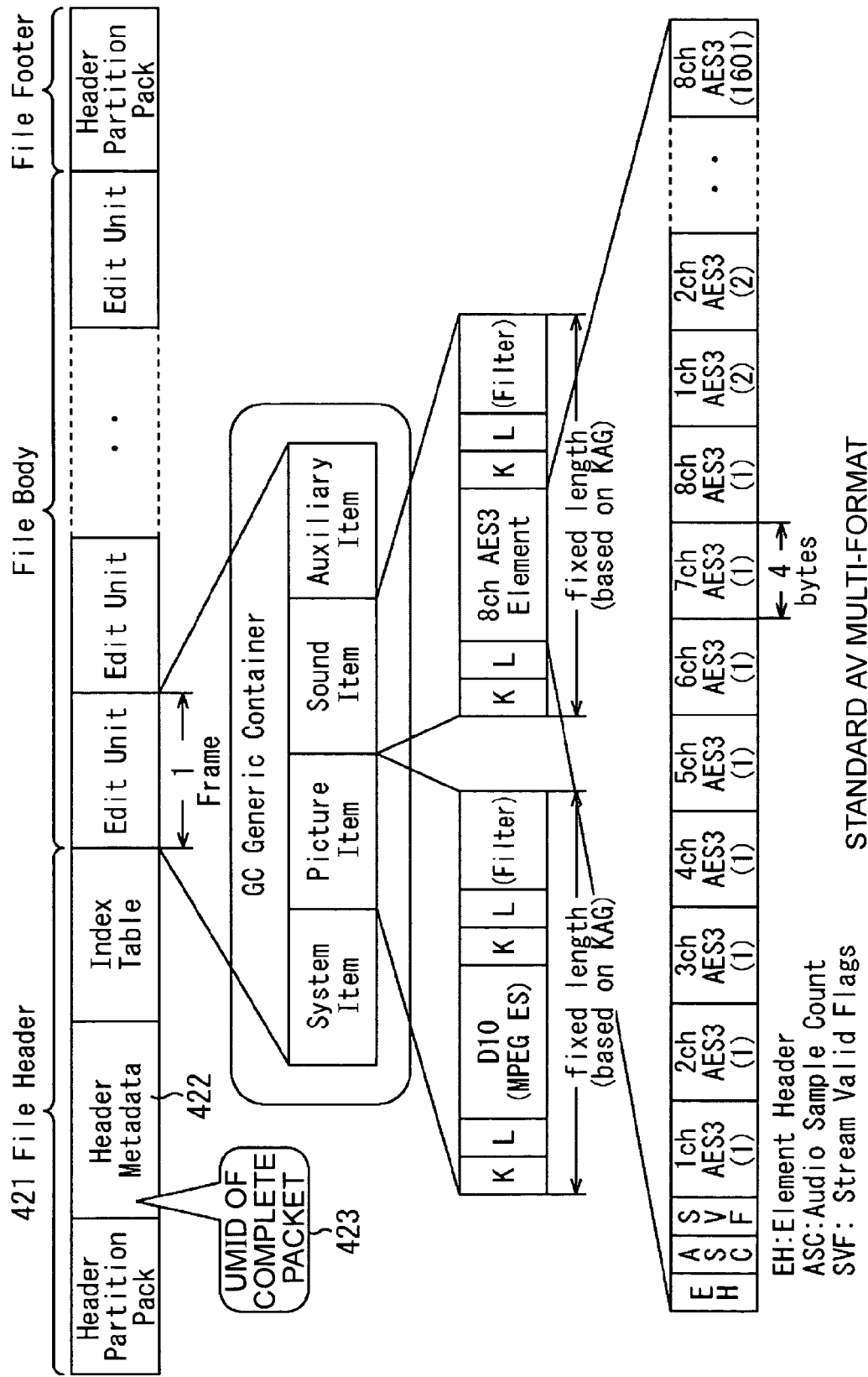
FIG. 32 illustrates the structure of the complete packet.

FIG. 32 diagrammatically illustrates the structure of the data of the complete packet generated in the complete packet production process. As shown in FIG. 32, the data of the complete packet is constructed in a standard audio-visual (AV) multi-format. In the standard audio-visual (AV) multi-format, data is composed of a file header 421, a file body, and a file footer arranged in that order.

FIG. 32 illustrates video data and audio data arranged in the standard AV multi-format in the body. The video data is encoded in the moving picture experts group (MPEG) IMX/ D10 format, and the audio data is arranged in non-compressed audio engineering society (AES) 3 format.

Also arranged in the body are video data and audio data in a variety of formats, such as a digital video (DV).

A header 421 includes a header partition pack, header metadata 422, and a index table in that order from the start thereof. The header partition pack contains data for identifying the header 421, and information representing the form of data arranged in the body, and a file format. The header metadata 422 contains, in addition to a UMID 423 of the above-referenced complete packet (own UMID), a date of producing of the file, and information relating to the data arranged in the body on a per file basis. The index table contains a table representing a location of an edit unit to be arranged in the body as discussed later.

The index table is optional, and may or may not be contained in the header 421. The header 421 can contain a variety of optional data in addition to the index table.

The footer is composed of a footer partition pack. Data identifying the footer is arranged in the footer partition pack.

The body is composed of at least one edit unit. The edit unit has a unit of one frame. AV data and other data of one frame are arranged in the edit unit.

The edit unit contains a system item, a picture item, a sound item, and an auxiliary item arranged from the start thereof.

The system item contains metadata (on a per frame basis) of a frame of video data arranged in the subsequent picture item. The metadata on a per frame basis is a timecode, for example.

The picture item contains video data of one frame. As shown in FIG. 32, the video data in the above-mentioned D10 format is arranged in the picture item.

The video data of one frame is coded in a KLV (Key, Length, and Value) scheme before being arranged in the picture item.

In the KLV structure, a key portion, a length portion, and a value portion are successively arranged in that order from the head thereof. Arranged in the key portion is a label of 16 bytes, in compliance with SMPTE (Society of Motion Picture & Television Engineers) 298M, representing the data arranged in the value portion. A data length of the data arranged in the value is described in the length portion. A data body, namely, the video data of one frame, is arranged in the value portion.

The picture item has a fixed length with the data based on a KAG (KLV alignment grid). To keep the picture item to the fixed length, a filler serving as stuffing data is KLV structured and arranged subsequent to the video data of the picture item.

The fixed length, based on the KAG serving as the data length of the picture item, is an integer multiple of a sector length of an optical disk (for example, 512 bytes or 2 Kbytes). In this case, the picture item becomes highly compatible with optical disks, and read and write processes of the picture item to the optical disk is sped up.

As the picture item is, the system item, the sound item, and the auxiliary item are KLV structured and have a fixed data length based on the KAG.

The audio data of one frame corresponding to the video data arranged in the picture item is equally KLV structured as the picture item is KLV structured.

The sound item contains a plurality of audio data, namely, 8 channel audio data, in a multiplexed form.

A KLV structured value portion of the sound item includes an element header (EH), an audio sound count (ASC), a stream valid flag (SVF), and 8-channel multiplexed audio data arranged in that order from the head thereof.

The 8-channel audio data in the sound item is multiplexed by arranging a first sample, a second sample, . . . of each of the eight channels in one frame. In the bottom portion of FIG. 32, each parenthesized number represents the order of the sample of the audio data.

The element header EH contains data for identifying the element header. The audio sample count ASC contains a sample count of the audio data arranged in the sound item. The stream valid flag SVF is an 8-bit (1-byte) flag where each bit represents whether the audio data corresponding to the bit is valid or invalid. For example, a bit of the stream valid flag SVF is 1 if the audio data of a channel corresponding to that bit is valid, and is 0 if the audio data of the channel corresponding to that flag is invalid.

The auxiliary item represents an area where any data required by a user is arranged.

In the standard AV multi-format, the system item having the metadata arranged on a frame-by-fame basis, the picture item having the video data, the sound item having the audio data, and the auxiliary item having the user data are multiplexed on a per frame basis. Furthermore, the 8-channel audio data is multiplexed on a per sample basis in the sound item.

The complete packet newly produced in the complete packet production process, the reference-related table 411, and the updated edit description are uploaded to the respective servers for registration and table updating as the previously discussed composition table is uploaded. Such a process is identical to that of the composition table and the discussion thereof is omitted herein. The complete packet is uploaded to the complete packet server 52 to be registered in the complete packet database 62.

When the complete packet is produced from the edit list, a UMID of the complete packet is added to that complete packet. Information for referencing the complete packet from the edit description is managed as the reference-related table 66 in the metadata server 53. The UMID of the complete packet and the UMID of the edit list (edit description) are related to each other in one-to-one correspondence. As will be discussed later, the UMID of the reference source (the UMID of the edit list) can be searched for from the UMID of the reference destination (the UMID of the complete packet).

Each terminal easily acquires the UMID of the complete packet corresponding to the edit list based on the UMID of the edit list by using the reference-related table 66 managed by the metadata server 53. Conversely, each terminal easily acquires the UMID of the edit list corresponding to the complete packet using the UMID of the complete packet. In other words, the metadata server 53 easily searches for and provides the UMID of the complete packet corresponding to the edit list from the UMID of the edit list, using the reference-related table 66. Conversely, the metadata server 53 easily searches for and provides the UMID of the edit list corresponding to the complete packet from the UMID of the complete packet. The network system 1 easily establishes a linking relationship among data so that one data is easily searched for from another data. The edit process and the check process are easily performed on data, and the ease of handling data is increased.

Figure 33:
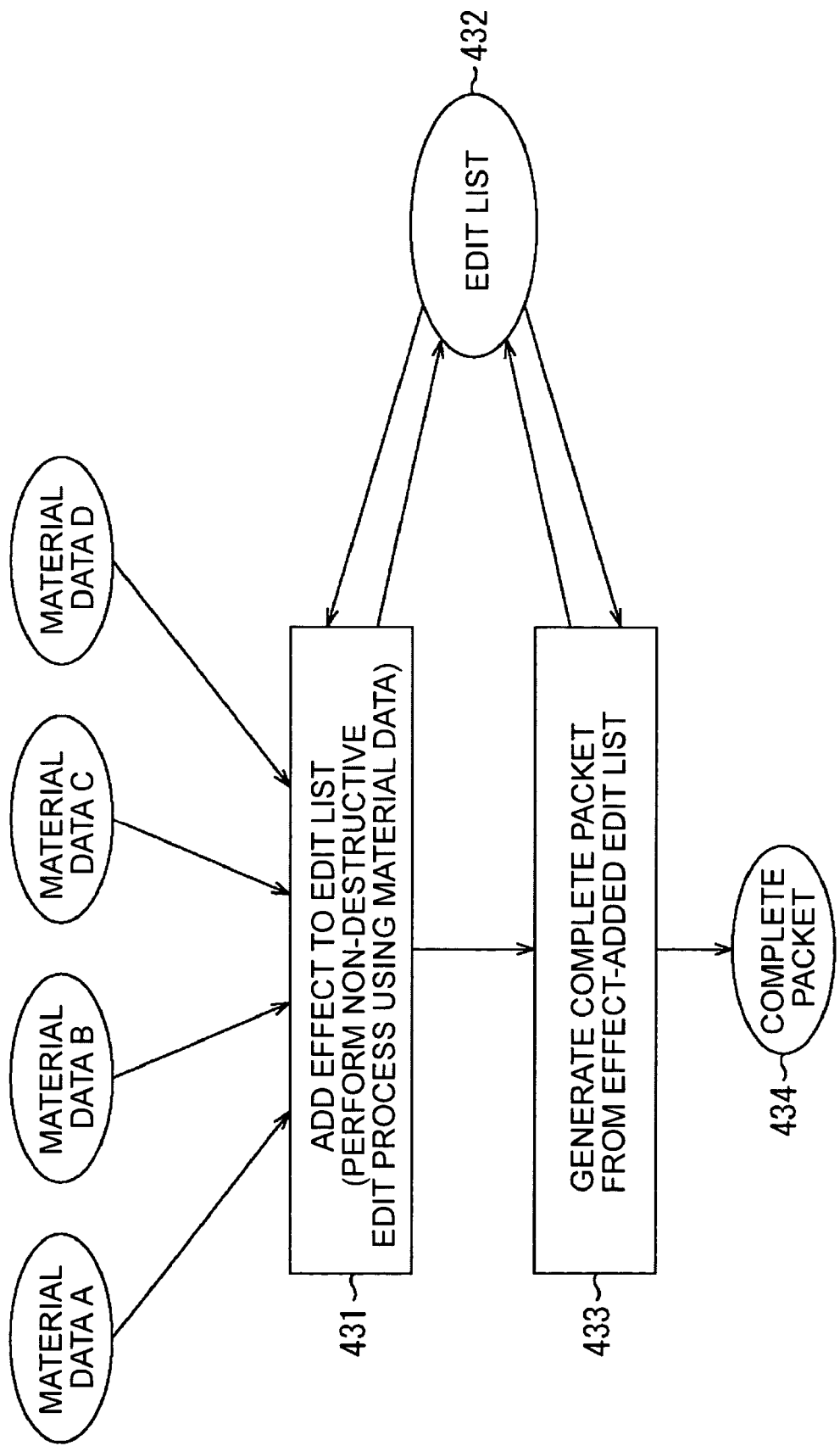
FIG. 33 illustrates a flow of an effect edit process and a complete packet generation process.

In the above discussion, the editing terminal 41 performs the process of adding the effects and the process of producing the complete packet separately as shown in FIG. 33. More specifically, the editing terminal 41 performs a job 431 of adding the effects on the edit list using the material data (material data A through D) and an edit list 432 as discussed with reference to the effect edit process of FIG. 25. The editing terminal 41 then performs a job 433 of generating the complete packet using the edit list generated in the job 431 in the complete packet production program of FIG. 30. The editing terminal 41 thus produces a complete packet 434.

Figure 34:
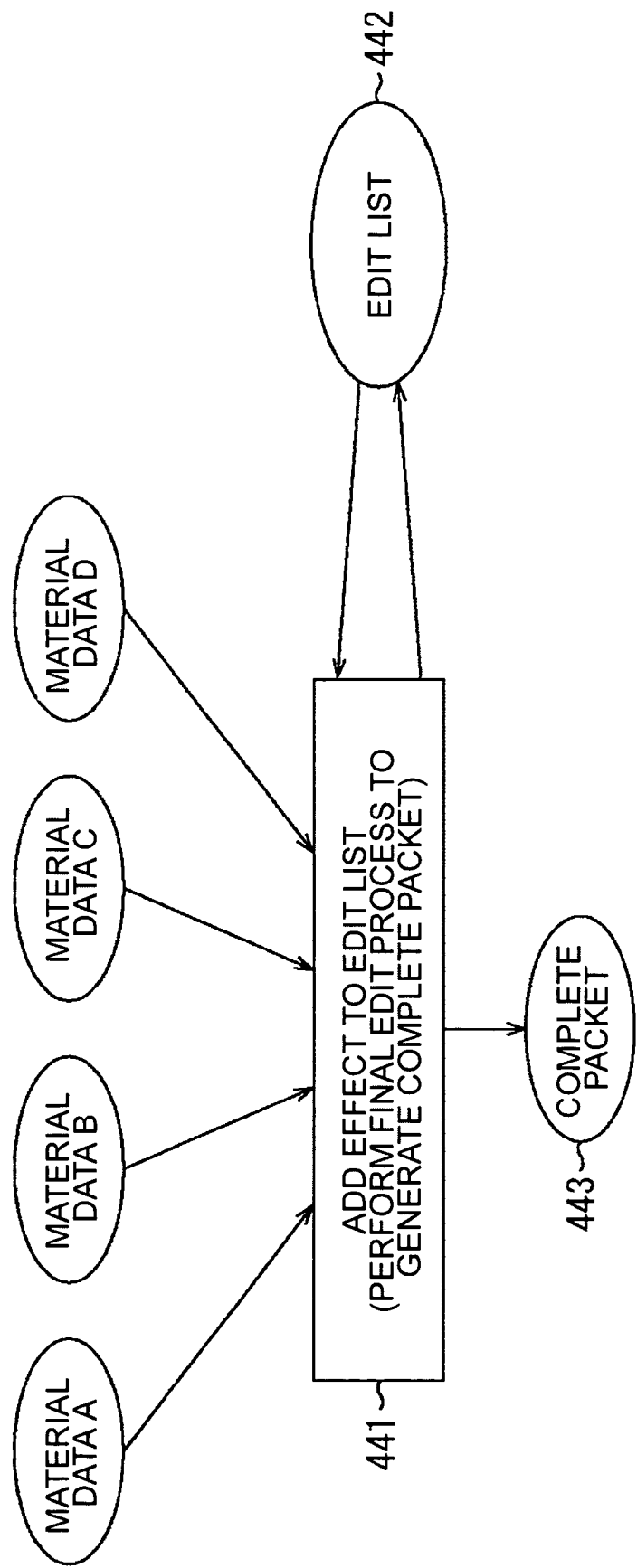
FIG. 34 illustrates another flow of the effect-edit process and the complete packet generation process.

Alternatively, the editing terminal 41 directly edits the material data (material data A through D) in a job 441 as shown in FIG. 34. The editing terminal 41 produces the complete packet using the material data while adding the effects to the edit list. More specifically, the editing terminal 41 performs the effect edit process of FIG. 25 and the complete packet production process of FIG. 30 in a single process, thereby generating a complete packet 443.

After the above-referenced processes, the data are reference-related as shown in FIG. 35.

As shown in FIG. 35, the composition table 451 contains the UMIDs (AAAAAAAA through FFFFFFFF) of the material data 452 in addition to own UMID (PPPPPPPP). Each terminal can easily acquire the material data 452 corresponding to the composition table 451 using the composition table 451. The material data 452 are tagged with own UMIDs (AAAAAAAA through FFFFFFFF). The UMID (PPPPP-PPP) of the composition table 451 and the UMIDs of the material data (AAAAAAAA through FFFFFFFF), in addition to own UMID (MMMMMMMM), are added to the edit list 453 that has been produced based on the composition table 451. Each terminal can thus easily acquire the composition table 451 and the material data 452, corresponding to the edit list 453, using the edit list 453.

The UMIDs of the edit list 453 (AAAAAAAA through FFFFFFFF) and the UMID of the original edit list 453 (MMMMMMMM), in addition to own UMID (LLLLLLLL), are added to the effect-added edit list 454. Each terminal can thus easily acquire the material data 452 and the edit list 453, corresponding to the effect-added edit list 454, using the effect-added edit list 454.

The metadata server 53 produces the reference-related table 66 of FIG. 36 using the reference-related table supplied from each terminal and manages the reference-related table 66. Using the reference-related table 66, the metadata server 53 searches for the UMID corresponding to the UMID supplied from each terminal and then supplies the found UMID to the requesting terminal.

Using the reference-related table 66 managed by the metadata server 53, each terminal acquires the UMID of the composition table 451, the UMID of the edit list 453, and the UMID of the effect-added edit list 454, corresponding to the material data 452, in accordance with the UMID of the material data 452 of FIG. 35. Similarly, using the reference-related table 66 managed by the metadata server 53, each terminal acquires the UMID of the edit list 453 corresponding to the composition table 451 in accordance with the UMID of the composition table 451, and the UMID of the effect-added edit list 454 corresponding to the edit list 453 in accordance with the UMID of the edit list 453.

Using the reference-related table 66 managed by the metadata server 53, each terminal acquires the UMID (ZZZZZZZZ) of the complete packet 455 corresponding to the effect-added edit list 454 in accordance with the UMID of the effect-added edit list 454. Since the UMID of the effect-added edit list 454 and the UMID of the complete packet 455 corresponding to the effect-added edit list 454 are related to each other in one-to-one correspondence. Each terminal thus acquires the UMID of the effect-added edit list 454 corresponding to the complete packet 455 in accordance with the UMID of the complete packet 455 using the reference-related table 66 managed by the metadata server 53.

A process flow of acquiring the UMID using the reference-related table 66 managed by the metadata server 53 is described below with reference to a flowchart of FIG. 37.

Figure 37:
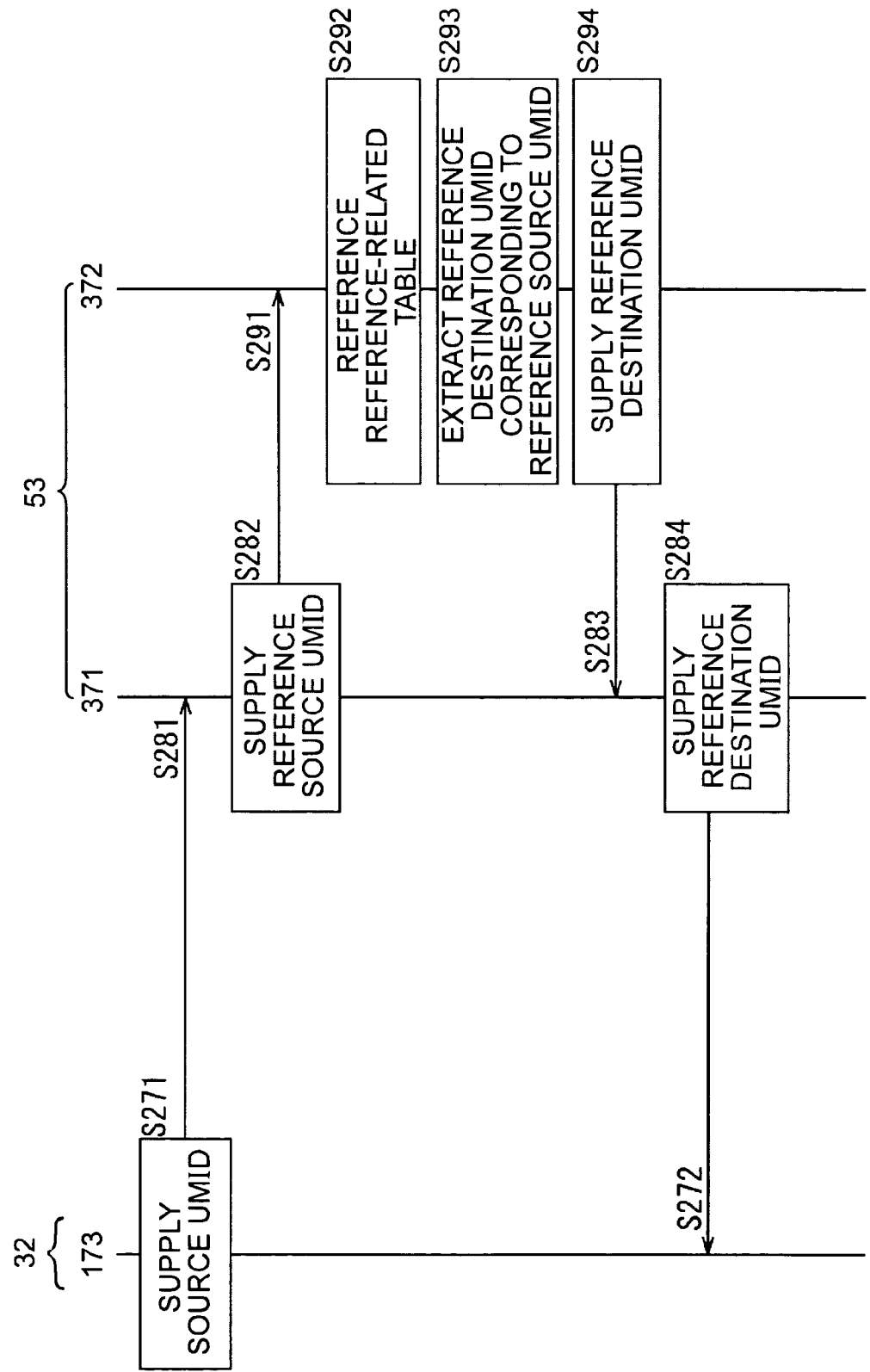
FIG. 37 is a flowchart illustrating the flow of a reference destination UMID acquisition process.

In the flowchart of FIG. 37, the field PC 32 functioning as one terminal acquires the UMID.

A reference source UMID is designated in response to an instruction from the operator. The CPU 151 in the field PC 32 requested to supply the reference destination UMID corresponding to the reference source UMID executes the data acquisition and supply program 173. More specifically, in step S271, the field PC 32 controls the communication unit 164, thereby supplying the reference source UMID to the metadata server 53 via the network 21.

In step S281, the CPU 351 in the metadata server 53 for executing the data acquisition and supply program 371 acquires the reference source UMID. In step S282, the acquired reference source UMID is then supplied to the CPU 351 for executing the reference-related table management program 372. In step S291, the CPU 351 for executing the reference-related table management program 372 thus acquires the reference source UMID. More specifically, the CPU 351 acquires the reference source UMID by executing the data acquisition and supply program 371, and supplies the reference source UMID to the RAM 353 for storage. The CPU 351 executes the reference-related table management program 372, thereby acquiring the reference source UMID from the RAM 353.

Upon acquiring the reference source UMID, the CPU 351 for executing the reference-related table management program 372 proceeds to step S292. The CPU 351 references the reference-related table 66 stored in the storage unit 363. In step S293, the CPU 351 searches for the reference source UMID in the reference-related table 66, extracts and retrieves the reference destination UMID corresponding to the reference source UMID.

After acquiring the reference destination UMID, the CPU 351 for executing the reference-related table management program 372 supplies the reference destination UMID to the CPU 351 for executing the data acquisition and supply program 371. In step S283, the CPU 351 for executing the data acquisition and supply program 371 acquires the reference destination UMID. More specifically, in step S294, the CPU 351 executes the reference-related table management program 372 to supply the reference destination UMID to the RAM 353 for storage. The CPU 351 executes the data acquisition and supply program 371, thereby acquiring the reference destination UMID from the RAM 353 in step S283.

Upon acquiring the reference destination UMID, the CPU 351 for executing the data acquisition and supply program 371 controls the communication unit 364, thereby supplying the reference destination UMID to the requesting field PC 32 in step S284. In step S272, the CPU 151 in the field PC 32 for executing the data acquisition and supply program 173 controls the communication unit 164, thus acquiring the reference destination UMID.

In this way, the field PC 32 acquires the reference destination UMID by supplying the reference source UMID to the metadata server 53. Another terminal, such as the planning terminal 11, can acquire the reference destination UMID from the metadata server 53 as necessary by performing the same process as the field PC 32.

As described above, the UMID of the effect-added edit list (the edit list for use in generating the complete packet) and the UMID of the complete packet are linked to each other in the reference-related table 66 on a one-to-one correspondence basis. To acquire the UMID of the effect-added edit list based on the UMID of the complete packet, each terminal supplies the UMID of the complete packet as the reference destination UMID to the metadata server 53, and then acquires the UMID of the edit list as the reference source UMID using the reference-related table 66 in the metadata server 53.

In such a case, the process of each terminal for determining the reference source UMID from the reference destination UMID is identical to that previously discussed with reference to the flowchart of FIG. 37 except that the reference source UMID interchanged with the reference destination UMID, and the discussion thereof is omitted herein.

In the production of the program (content data), the composition table is produced in the earlier phase of the production, and the generation and the edit process are performed based on the composition table. It is thus contemplated that the data in the production of the program is managed and mutually linked to each other based on the composition table. In view of job efficiency, however, the ease of handling the data can be decreased.

Figure 38:
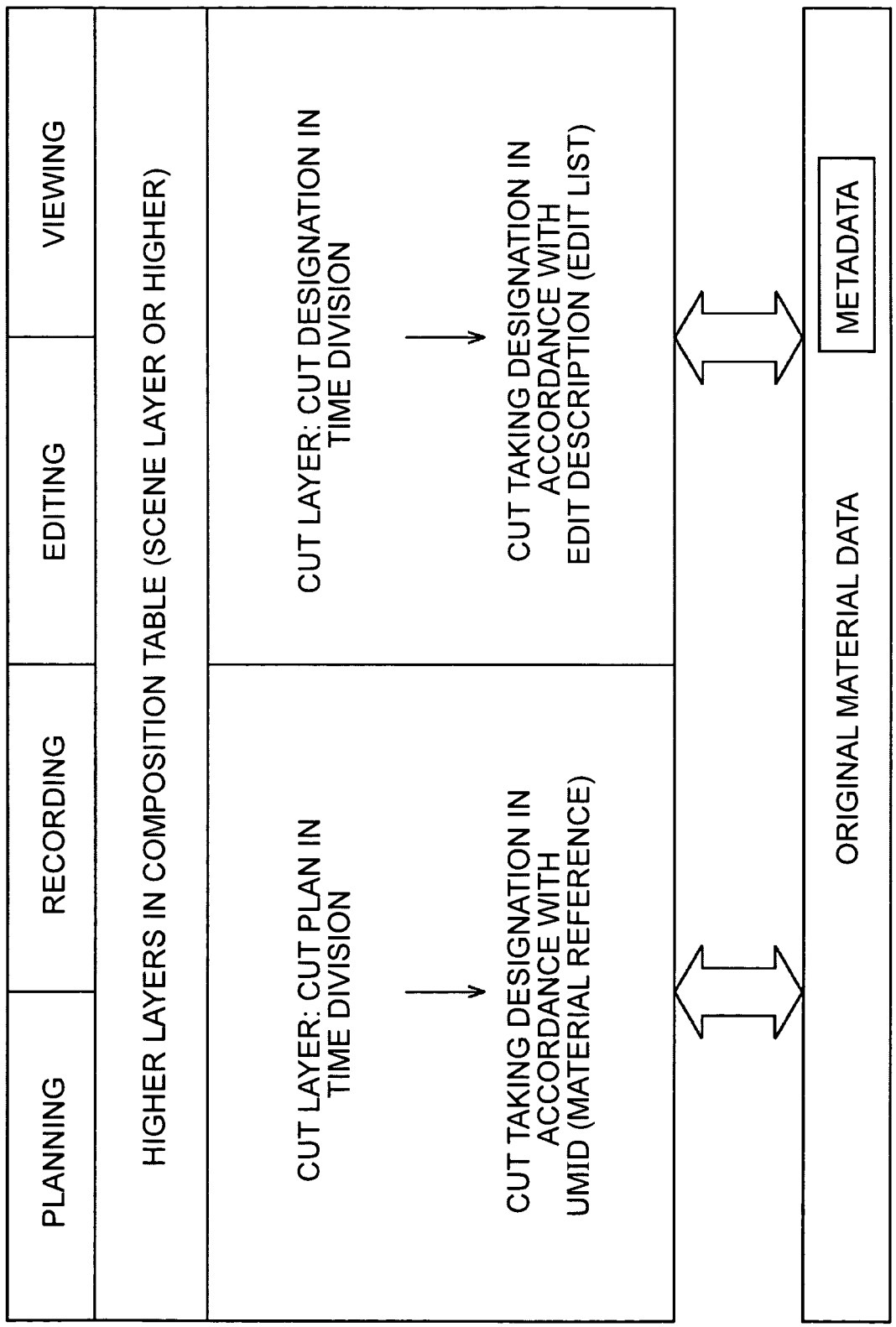
FIG. 38 illustrates a reference method of a cut layer in the composition table.

More specifically, the composition table is layer-structured as previously discussed. As shown in FIG. 38, higher layers than the scene layer (hierarchically higher layers in the composition table), composed of only a description of notes and plans, and not directly related to actual data, are handled in a uniform manner throughout the program production process. However, the manner of using the cut layer directly linked to the take data (material data) is varied as the program production process advances in progress. For example, a cut plan is performed in time division in the planning and recording (material gathering) process, and an operator performs a cut taking designation by referencing the material data using the UMID described in the composition table. In the edit and viewing process, however, the operator performs a cut designation in time division, and thus performs a cut take designation using the edit list (edit description) rather than the composition table.

The composition table is an initial plan, and specifies a rough flow of cuts. The composition table does not take into account the above-referenced effect-added conditions of data, while the complete packet does. If a detailed cut operation is performed in the later phase of the program production, the operator can learn the material data more in detail from the edit list (edit description) containing edit information than from the composition table.

Figure 39:
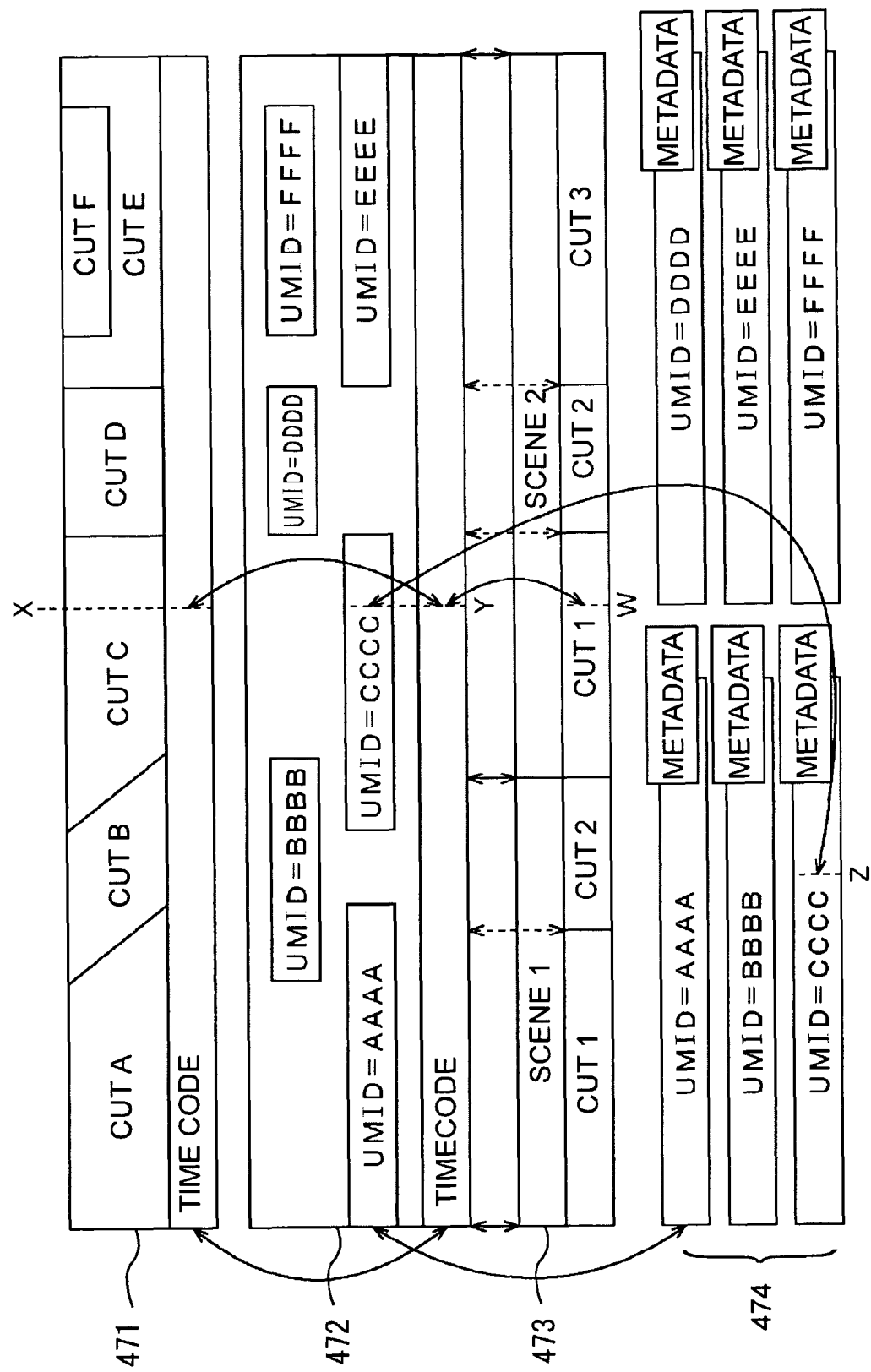
FIG. 39 illustrates a specific reference method performed among data.

A specific process of referencing the material data is described below with reference to FIG. 39. As shown in FIG. 39, each UMID is represented by a four-character string. In practice, each of those UMIDs is identical to the one represented by the eight-character string in FIG. 35, and has 32 byte (or 64 byte) information.

As shown in FIG. 39, a complete packet 471, an edit list 472, a composition table 473, and a material data 474 are generated in the production of the program. Those pieces of data are linked to each other by means of the UMIDs as previously discussed. The operator of the editing terminal 41 views the complete packet 471 and designates a frame of the complete packet 471, and then references a frame of the material data corresponding to that frame of the complete packet 471.

When the operator designates a frame "X" of a cut "C", the editing terminal 41 determines a timecode of the frame "X". In accordance with the timecode, the editing terminal 41 references the edit list 472 in accordance with the timecode, searches for and identifies a frame "Y" corresponding to the frame "X" of the complete packet 471. The editing terminal 41 identifies a UMID "CCCC" of the material data 474 having the frame "Y" of the edit list 472 therewithin, and a timecode of the frame "Y" in the edit list 472. The editing terminal 41 that has identified the UMID references target material data from the material data 474 using that UMID, identifies a frame "Z" of the material data (UMID CCCC) corresponding to the identified timecode, and displays an image of the frame "Z".

Using the edit list 472, the editing terminal 41 easily and precisely presents, to the operator, the frame image of the material data 474 corresponding to the frame image designated in the complete packet 471.

The operator designates a frame in the complete packet 471 to reference the composition table corresponding to the frame. As previously discussed, when the frame "Y" of the edit list 472 corresponding to the frame "X" of the complete packet 471 is identified, the editing terminal 41 references the composition table 473, and determines in accordance with the timecode of the composition table 473 that a frame "W" of the composition table 473 corresponding to the frame "Y" is a frame contained in the "cut 1" of the "scene 2". The editing terminal 41 presents information of the identified "cut 1" of the "scene 2" of the composition table 473 to the operator.

Using the edit list 472, the editing terminal 41 easily and precisely supplies the operator with information of the composition table 473 corresponding to the frame designated in the complete packet 471.

A process of the editing terminal 41 for referencing the material data from the complete packet is described below with reference to a flowchart of FIG. 40.

Figure 40:
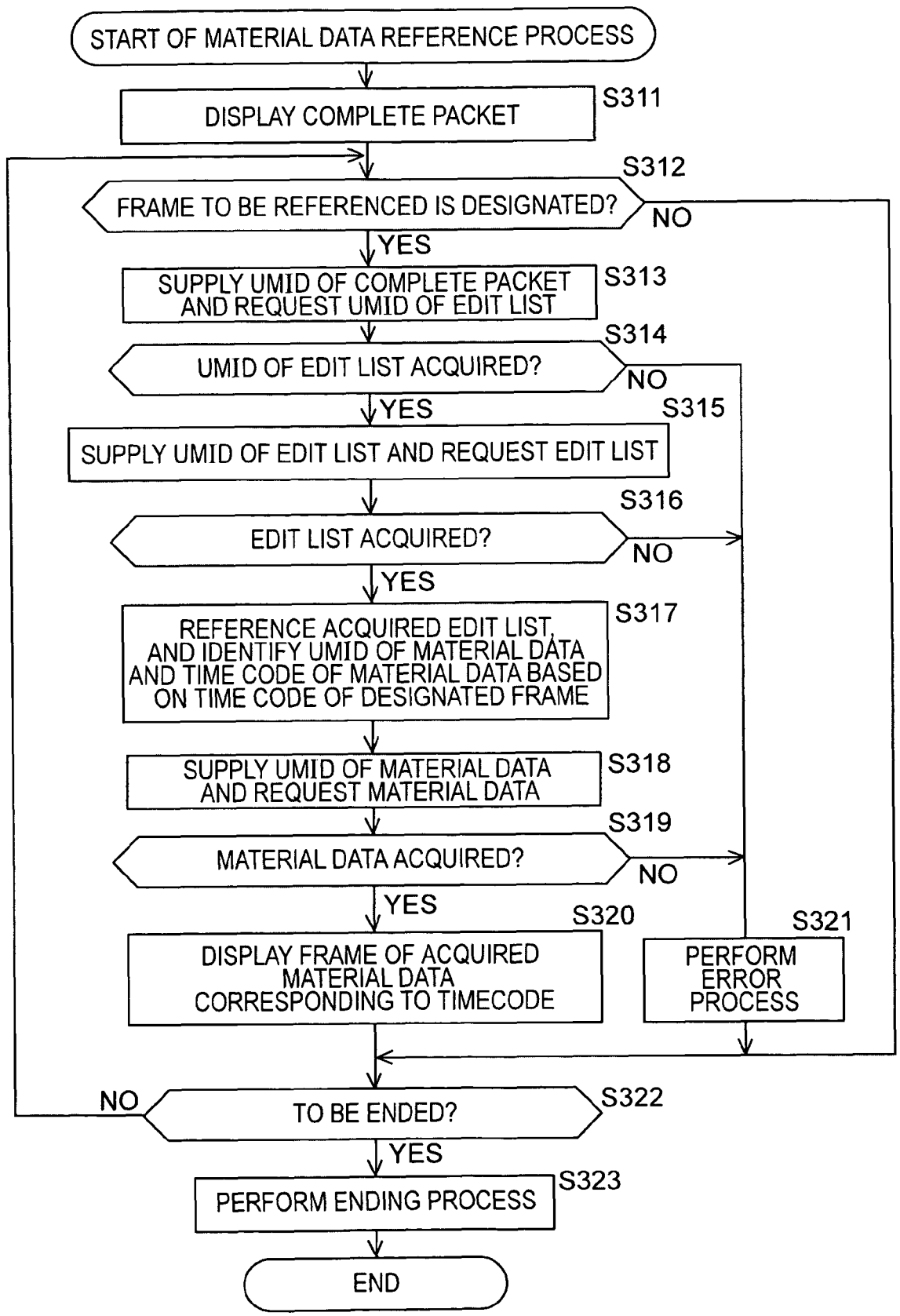
FIG. 40 is a flowchart illustrating a material data reference process.

When the operator of the editing terminal 41 operates the input unit 211 to display the complete packet in a material data reference mode or the like in the above-referenced process, the input/output interface 210 starts a material data reference process illustrated in a flowchart of FIG. 40 by executing a material data reference program 255. For simplicity of explanation, the editing terminal 41 has already acquired a complete packet from the complete packet database 62 in the complete packet server 52.

In step S311, the CPU 201 that has started the material data reference process controls the output unit 212, thereby displaying the complete packet acquired from the complete packet server 52 on a monitor. The CPU 201 controls the input unit 211, thus starting receiving user inputs.

In step S312, the CPU 201 controls the input unit 211, thus determining whether the operator has designated a frame to be referenced. If it is determined that the operator has designated a frame to be referenced, the CPU 201 proceeds to step S313. The CPU 201 controls the communication unit 214, thus supplying the metadata server 53 with the UMID of the complete packet having the designated frame, and requesting the metadata server 53 to supply the UMID of the edit list. In this case, the UMID of the complete packet to be supplied is a reference destination UMID and the UMID of the requested edit list is a reference source UMID. As previously discussed with reference to the flowchart of FIG. 37, the metadata server 53 uses the reference-related table 66 to search for the UMID of the edit list as the reference source UMID corresponding to the UMID of the complete packet as the reference destination UMID, and supplies the UMID of the edit list to the editing terminal 41.

In step S314, the CPU 201 in the editing terminal 41 for performing the material data reference program 255 controls the communication unit 214, thus determining whether the UMID of the requested edit list has been acquired. If it is determined that the UMID of the edit list has been acquired, the CPU 201 proceeds to step S315. The CPU 201 controls the communication unit 214, thus supplying the metadata server 53 with the UMID of the edit list to request the edit list. As with the case of the composition table discussed with reference to the flowchart of FIG. 13, the metadata server 53 searches the edit description database 63 for the edit list requested using the UMID, and supplies the editing terminal 41 with found edit list.

In step S316, the CPU 201 in the editing terminal 41 for executing the material data reference program 255 controls the communication unit 214, thus determining whether the requested edit list has been acquired. If it is determined that the requested edit list has been acquired, the CPU 201 proceeds to step S317. The CPU 201 references the acquired edit list, thereby identifying the UMID of the material data corresponding to the designated frame and the timecode of the material data in accordance with the timecode of the designated frame.

Upon determining the UMID of the material data and the timecode of the material data, the CPU 201 controls the communication unit 214 in step S318 to supply the material data server 51 with the UMID of the material data to request the material data. As with the case of the metadata server 53 for supplying the composition table, previously discussed with reference to the flowchart of FIG. 13, the material data server 51 searches the material data database 61 for the material data requested using the UMID, and supplies the editing terminal 41 with the requested material data.

In step S319, the CPU 201 in the editing terminal 41 for executing the material referencing program 225 controls the communication unit 214, thus determining whether the requested material data has been acquired. If it is determined that the requested material data has been acquired, the CPU 201 proceeds to step S320. The CPU 201 controls the output unit 212, thus displaying the identified timecode of the acquired material data. In this way, the operator can reference a frame image of the material data corresponding to the frame of the designated complete packet. Upon completing step S320, the CPU 201 proceeds to step S322.

If it is determined in step S312 that the frame of the complete packet of the material data to be referenced by the operator has not yet designated, the CPU 201 proceeds to step S322. If it is determined in step S314 that the UMID of the edit list has not been acquired, the CPU 201 proceeds to step S321 to perform an error process. After an error message is displayed, the CPU 201 proceeds to step S322. If it is determined in step S316 that the edit list has not been acquired, or if it is determined in step S319 that the material data has not been acquired, the CPU 201 proceeds to step S321 to perform an error process. Then, the CPU 201 proceeds to step S322.

The CPU 201 determines in step S322 whether to end the material data reference process. If it is determined that the material data reference process is not to be ended, the CPU 201 returns to step S312 to repeat step S312 and subsequent steps. If it is determined in step S322 that the material data reference process is to be ended in response to an instruction from the operator, for example, the CPU 201 proceeds to step S323. The CPU 201 then performs an ending process to end the material data reference process.

With the editing terminal 41 performing the material data reference process, the operator easily references the image of the frame of the material data corresponding to the frame designated in the complete packet. In this way, the operator can easily reference data of a reference destination as long as reference destination data and reference source data are indirectly linked via another data.

The edit list is acquired based on the UMID of the complete packet in a two-step process: namely, the UMID of the edit list is requested in step S313, and the edit list is requested in step S315. The present invention is not limited to this method. The edit list can be requested and acquired directly from the UMID of the complete packet. In such a case, the CPU 351 in the material data server 51 identifies the UMID of the edit list from the UMID of the complete packet using the reference-related table as previously discussed, searches the edit description database 63 for the edit list using the UMID of the edit list, and supplies the editing terminal 41 with the found edit list.

In the above discussion, the operator references the material data based on the complete packet. The present invention is not limited to this method. The material data can be referenced from the edit list, and the edit list can be referenced from the complete packet. In such a case, the CPU 201 in the editing terminal 41 supplies the operator with the target data by performing part of the process of the flowchart of FIG. 40. Conversely, the CPU 201 in the editing terminal 41 references the complete packet or the edit list from the material data by changing the order and advance direction of process steps.

The operator can reference the composition table based on the complete packet. Such a reference process is described below with reference to a flowchart of FIG. 41.

The operator of the editing terminal 41 operates the input unit 211 to display the complete packet in a composition table reference mode. The CPU 201 executes a composition table referencing program 226 to start a composition table reference process shown in a flowchart of FIG. 41. For simplicity of explanation, the editing terminal 41 has already acquired the complete packet to be processed from the complete packet database 62 in the complete packet server 52.

In step S341, the CPU 201 that has started the composition table reference process controls first the output unit 212, thus causing a monitor to display the complete packet acquired beforehand from the complete packet server 52. The CPU 201 then controls the input unit 211, thus starting receiving user inputs.

In step S342, the CPU 201 controls the input unit 211, thereby determining whether the operator has issued an instruction to reference the composition table. If it is determined that the operator has issued the instruction, the CPU 201 proceeds to step S343. The CPU 201 controls the communication unit 214, thus supplying the metadata server 53 with the UMID of the complete packet having the designated frame and requesting the UMID of the edit list. The UMID of the supplied complete packet is a reference destination UMID and the UMID of the requested edit list is a reference source UMID. As previously discussed with reference to the flowchart of FIG. 37, the metadata server 53 uses the reference-related table 66 to search for the UMID of the edit list as the reference source UMID corresponding to the UMID of the complete packet as the reference destination UMID and supplies the editing terminal 41 with the found UMID of the edit list.

In step S344, the CPU 201 in the editing terminal 41 for performing the composition table referencing program 226 controls the communication unit 214 to determine whether the UMID of the requested edit list has been acquired. If it is determined that the UMID of the requested edit list has been acquired, the CPU 201 proceeds to step S345. The CPU 201 controls the communication unit 214, thus supplying the metadata server 53 with the UMID of the edit list to request the edit list. As with the case of the composition table discussed with reference to the flowchart of FIG. 13, the metadata server 53 searches the edit description database 63 for the requested edit list using the UMID, and the supplies the editing terminal 41 with the found edit list.

In step S346, the CPU 201 in the editing terminal 41 for performing the composition table referencing program 226 controls the communication unit 214, thus determining whether the requested edit list has been acquired. If it is determined that the edit list has been acquired, the CPU 201 proceeds to step S347 to determine whether a UMID of another edit list is described in addition to the edit description of the acquired edit list. If it is determined that a UMID of another edit list is described, the acquired edit list is the one that has been generated by editing the other edit list on which that UMID is described. The acquired edit list is thus not directly linked to the composition table. In such a case, the CPU 201 returns to step S345 to perform step S345 and subsequent steps to acquire the other edit list.

By repeating steps S345 through S347, the CPU 201 acquires a first edit list, namely, an edit list linked to the composition table. The UMID of the other edit list is not described but the UMID of the composition table is described in the edit list linked to the composition table. In step S347, the CPU 201 determines that the other edit list is not described, and proceeds to step S348. The CPU 201 controls the communication unit 214, thus supplying the metadata server 53 with the UMID of the composition table described in the edit description to request the composition table. As discussed with reference to the flowchart of FIG. 13, the metadata server 53 searches the composition table database 64 for the composition table requested using the UMID, and supplies the editing terminal 41 with the found composition table.

In step S349, the CPU 201 in the editing terminal 41 for executing the composition table referencing program 226 controls the communication unit 214, thus determining whether the requested composition table has been acquired. If it is determined that the composition table has been acquired, the CPU 201 proceeds to step S350 to display the acquired composition table in whole or in part corresponding to the frame of the designated complete packet. In this way, the operator can reference the composition table corresponding to the frame of the designated complete packet. Upon completing step S350, the CPU 201 proceeds to step S352.

If it is determined in step S342 that the frame of the complete packet of the composition table to be referenced by the operator has not been designated, the CPU 201 proceeds to step S352. If it is determined in step S344 that the UMID of the edit list has not been acquired, if it is determined in step S346 that the edit list has not been acquired, or if it is determined in step S349 that the composition table has not been acquired, the CPU 201 proceeds to step S351 to perform an error process. After displaying an error message or the like, the CPU 201 proceeds to step S352.

In step S352, the CPU 201 determines whether to end the composition table reference process. If it is determined that the composition table reference process is not to be ended, the CPU 201 returns to step S342 to repeat step S342 and subsequent steps. If it is determined in step S352 that the composition table reference process is to be ended in response to an instruction from the operator, for example, the CPU 201 proceeds to step S353. The CPU 201 performs an ending process to end the composition table reference process.

With the editing terminal 41 performing the composition table reference process, the operator can reference the composition table corresponding to the frame designated in the complete packet. In this way, the operator can easily reference data of a reference destination as long as the reference destination data and reference source data are indirectly linked via another data (even if the reference destination data and the reference source data are not directly linked).

The CPU 201 can request and acquire the edit list directly from the UMID of the complete packet. The composition table can be referenced from the edit list, and the edit list can referenced from the complete packet. In such a case, the CPU 201 in the editing terminal 41 supplies the operator with the target data by performing part of the process of the flowchart of FIG. 41. Conversely, the CPU 201 in the editing terminal 41 references the complete packet or the edit list from the composition table by changing the order and advance direction of process steps.

The material data reference process and the composition table reference process can be performed not only by the editing terminal 41 but also another terminal. The network system 1 easily establishes a linking relationship among data so that one data is easily searched for from another data. The edit process and the check process are easily performed on data, and the ease of handling data is increased.

Figure 42:
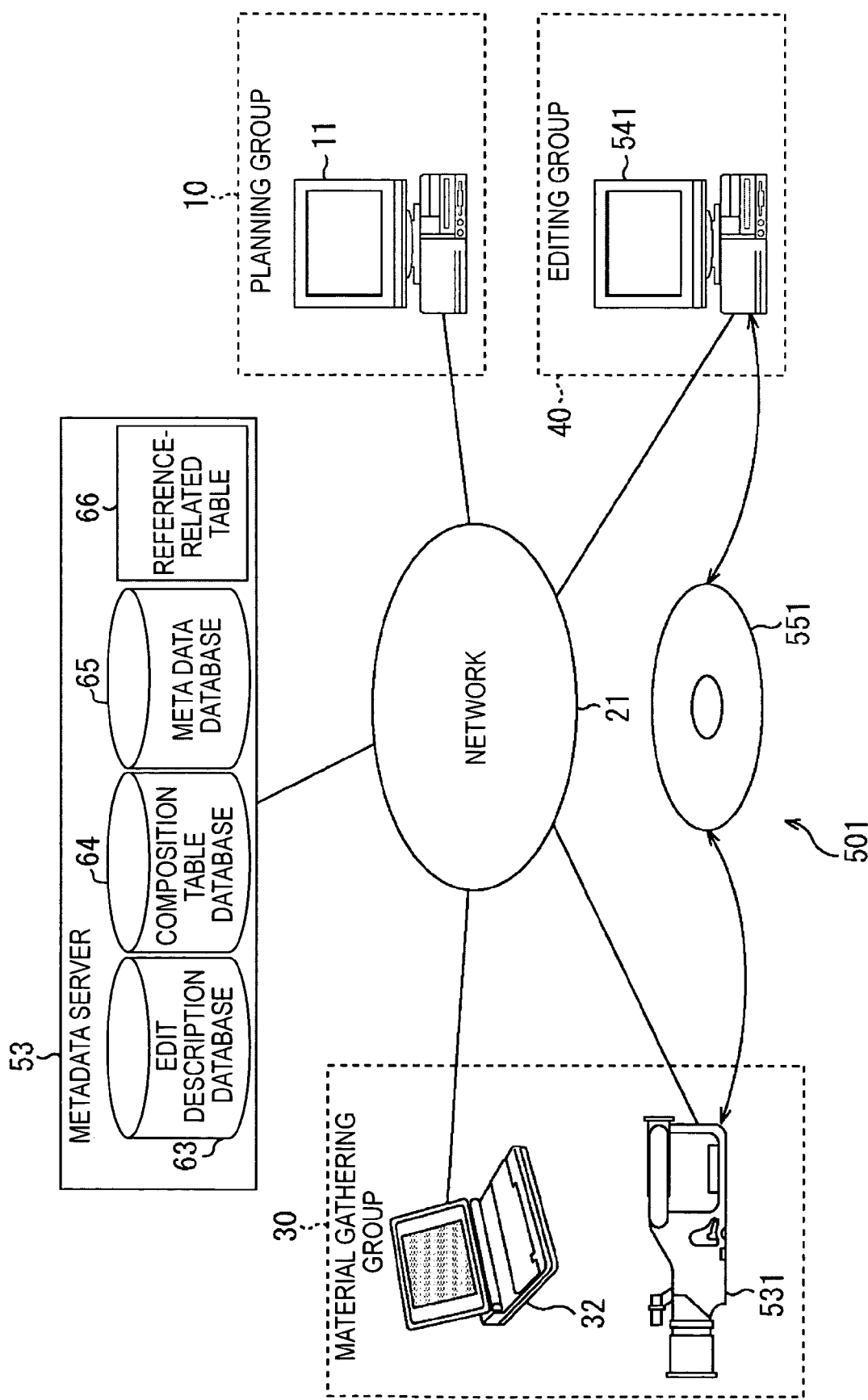
FIG. 42 is a block diagram of another network system in accordance with one embodiment of the present invention.

In the network system 1 of FIG. 1, the material data and the complete packet are managed by the material data server 51 and the complete packet server 52, respectively. The present invention is not limited to this arrangement. As shown in FIG. 42, for example, the operator records the data onto a recording medium such as an optical disk, and carries the recording medium with him from one apparatus to another.

In a network system 501 of FIG. 42, an image pickup device 531 records, onto an optical disk 551, material data obtained through material gathering. After a field PC 32 processes the material data, an operator loads the optical disk 551 having the material data recorded thereon to a drive 215 in the editing terminal 541 of the editing group 40 to supply the editing terminal 541 with the material data.

The data are linked using UMIDs. Regardless of the address of each data, the linking relationship is maintained. As described with reference to the network system 1 of FIG. 1 and the network system 501 of FIG. 42, the above-referenced linking method is applicable to managing a variety of data. For example, the material data or the complete packet can be exchanged between terminals via the network 21 without the intervention of servers. The edit description database 63, the composition table database 64, the metadata database 65, and the reference-related table 66 in the metadata server 53 may be managed by different severs. Alternatively, all or part of those databases may be managed by a single terminal.

Part of the above-referenced apparatuses may be arranged in a separate block or different apparatuses may be integrated into one block. The name and arrangement of each segment in the composition table may be different from those previously described. The layers of the "program", the "episode", the "scene", and the "cut" in the hierarchical layered structure may be flexibly changed.

In the above discussion, the complete packet and the effect-added edit list for generating the complete packet are not tagged with the respective UMIDs in the relationship therebetween. More specifically, the effect-added edit list 454 does not have the UMID of the complete packet 455 and the complete packet 455 does not have the UMID of the effect-added edit list 454, as shown in FIG. 35. When the effect-added edit list 454 is acquired from the complete packet 455 or when the complete packet 455 is acquired from the effect-added edit list 454, each terminal acquires the complete packet 455 using the reference-related table 66 managed by the metadata server 53 as shown in FIG. 36.

Alternatively, in FIG. 35, the complete packet 455 may be tagged with the UMID of the effect-added edit list 454. In such a case, the CPU 201 in the editing terminal 41 generates a UMID of the generated complete packet 455 and attaches the UMID to the complete packet 455 in step S253 while also attaching the UMID of the effect-added edit list 454 to the complete packet 455. As the UMID of the complete packet 455, the UMID of the effect-added edit list 454 is attached to the header metadata 422 of FIG. 32. The UMID of the complete packet 455 as own UMID may be set to be a UMID of a material package indicating the complete packet 455, and the UMID of the effect-added edit list 454 may be set to be a UMID of a file package.

When the effect-added edit list 454 is acquired from the complete packet 455, each terminal acquires the effect-added edit list 454 using the UMID of the effect-added edit list 454 attached to the complete packet 455. When the complete packet 455 is acquired from the effect-added edit list 454, each terminal acquires the complete packet 455 using the reference-related table 66 managed by the metadata server 53 as previously discussed. In this way, each terminal can acquire the effect-added edit list 454 without reverse referencing the reference-related table 66 managed by the metadata server 53 (namely, without searching for the UMID of the reference source form the UMID of the reference destination).

It is also possible to add the effect-added edit list 454 to the header metadata of the complete packet 455 as "dark metadata" for allowing only a particular user to identify the dark metadata.

The above-referenced series of process steps may be performed by one of hardware, software and a combination thereof. If the series of process steps is performed using software, a computer program of a process sequence may be installed from a network or a recording medium to a memory of a computer.

As shown in FIGS. 2 through 8, the recording media include the removable medium 86, the removable medium 126, the removable medium 166, the removable medium 216, the removable medium 266, the removable medium 316 and the removable medium 366, each composed of a magnetic disk (such as a floppy disk), an optical disk (such as a compact-disk read-only (CD-ROM), or digital versatile disk (DVD)), an electro-optical disk (such as Mini-Disk (MD)), or a semiconductor memory, storing the program and supplied separately from the apparatus to a user to provide the program. The recording media also include the ROM 72, the ROM 112, the ROM 152, the ROM 202, the ROM 252, the ROM 302, the ROM 352, and the hard disk contained in each of the storage unit 83, the storage unit 123, the storage unit 163, the storage unit 213, and the storage unit 313, each storing the program and supplied in the apparatus to the user.

The process steps discussed in this specification are sequentially performed in the time series order as stated. Alternatively, the steps may be performed in parallel or separately.

In this specification, the system refers to a system composed of a plurality of apparatuses.

What is claimed is:

1. An information processing apparatus including a processor and a memory for processing first information and second information, each information generated in a production of content data and containing information relating to the content data, the information processing apparatus comprising:
   adding means for adding, to the second information, first linking information linking the first information, and adding, to the second information, identification information of material data to be edited; and
   generating means for generating second linking information that links the second information to the first information,
   wherein the first information comprises unedited material data prior to editing;
   generating means for generating second information comprising a composition table in response to input from a user,
   wherein the composition table serves as a plan for editing the first information and the composition table is linked to the first information and the composition table identifies an in point and an out point of an editing process in the first information,
   wherein an edit list is generated based on the composition table, comprising an edit description of the editing process and is linked to the first information,
   wherein the composition table is acquired based on identification information of the composition table added to the edit list, and
   wherein the first information is left intact.

2. The information processing apparatus according to claim 1,
   wherein the first linking information contains identification information of the first information; and
   the second linking information contains linking information that links identification information of the second information to the identification information of the first information.

3. The information processing apparatus according to claim 2, further comprising:
   storage means for storing the linking information generated by the generating means;
   first acquisition means for acquiring the identification information of the first information; and
   supplying means for extracting the identification information of the second information from the linking information stored in the storage means, based on the identification information of the first information acquired by the first acquisition means, and supplying the identification information of the second information.

4. The information processing apparatus according to claim 3, further comprising:
   second acquisition means for acquiring the linking information; and
   updating means for updating the linking information stored in the storage means using the linking information acquired by the second acquisition means.

5. The information processing apparatus according to claim 1, wherein the second information contains edit information containing an edit content of material data forming the content data, and wherein the first information contains the material data, prior to editing, to be edited in accordance with the edit information.

6. An information processing method of an information processing apparatus for processing first information and second information, each information generated in a production of content data and containing information relating to the content data, the information processing method comprising:
   a step of adding, to the second information, first linking information linking the first information;
   a step of adding, to the second information, identification information of material data to be edited; and
   a step of generating second linking information that links the second information to the first information,
   wherein the first information comprises unedited material data prior to editing;
   generating means for generating second information comprising a composition table in response to input from a user,
   wherein the composition table serves as a plan for editing the first information and the composition table is linked to the first information and the composition table identifies an in point and an out point of an editing process in the first information,
   wherein an edit list is generated based on the composition table, comprising an edit description of the editing process and is linked to the first information,
   wherein the composition table is acquired based on identification information of the composition table added to the edit list, and
   wherein the first information is left intact.

7. A program stored on a removable computer recording medium that for causing a computer to perform an information processing for processing first information and second information, each information generated in a production of content data and containing information relating to the content data, the program comprising:
- a step of adding, to the second information, first linking information linking the first information;
- a step of adding, to the second information, identification information of material data to be edited; and
- a step of generating second linking information that links the second information to the first information,
- wherein the first information comprises unedited material data prior to editing;
- generating means for generating second information comprising a composition table in response to input from a user,
- wherein the composition table serves as a plan for editing the first information and the composition table is linked to the first information and the composition table identifies an in point and an out point of an editing process in the first information,
- wherein an edit list is generated based on the composition table, comprising an edit description of the editing process and is linked to the first information,
- wherein the composition table is acquired based on identification information of the composition table added to the edit list, and
- wherein the first information is left intact.

* * * * *